US012016046B2

(12) United States Patent
Stephens et al.

(10) Patent No.: US 12,016,046 B2
(45) Date of Patent: Jun. 18, 2024

(54) SYSTEM AND METHOD FOR ALLOCATING COMMUNICATION LINKS

(71) Applicant: OCADO INNOVATION LIMITED, Hatfield (GB)

(72) Inventors: Paul Richard Stephens, Hatfield (GB); Fraser Murray Edwards, Hatfield (GB); Montague Fraser Barlow, Hatfield (GB); Adam Nikolai Green, Hatfield (GB); David Sharp, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 16/902,630

(22) Filed: Jun. 16, 2020

(65) Prior Publication Data
US 2021/0037535 A1 Feb. 4, 2021

Related U.S. Application Data

(63) Continuation of application No. 15/316,430, filed as application No. PCT/EP2015/062587 on Jun. 5, 2015, now Pat. No. 10,805,933.

(30) Foreign Application Priority Data

Jun. 5, 2014 (GB) .................................... 1410025

(51) Int. Cl.
*H04W 72/0446* (2023.01)
*H04L 67/125* (2022.01)
(Continued)

(52) U.S. Cl.
CPC .......... *H04W 72/54* (2023.01); *H04L 67/125* (2013.01); *H04W 4/90* (2018.02); *H04W 28/18* (2013.01);
(Continued)

(58) Field of Classification Search
CPC ............. H04W 72/08; H04W 72/0446; H04W 72/0453; H04W 4/005; H04W 4/90;
(Continued)

(56) References Cited

U.S. PATENT DOCUMENTS

| 4,704,716 A | 11/1987 | Bowers et al. |
| 5,615,227 A | 3/1997 | Schumacher, Jr. et al. |

(Continued)

FOREIGN PATENT DOCUMENTS

| EP | 2595441 A1 | 5/2013 |
| GB | 2391433 A | 2/2004 |

(Continued)

OTHER PUBLICATIONS

Olexandr et al., "Slot allocation model and data burst scheduling in downlink WiMAX technology," 2013 IEEE XXXIII International Scientific Conference Electronics and Nanotechnology (ELNANO), Kiev, Ukraine, 2013, pp. 455-459 (Year: 2013).*

(Continued)

*Primary Examiner* — Un C Cho
*Assistant Examiner* — Lalita W Pace
(74) *Attorney, Agent, or Firm* — BUCHANAN INGERSOLL & ROONEY PC

(57) ABSTRACT

A communication system for communication between one or more terminal units includes: a communication manager that is configured to define and manage one or more adjustable communication links for efficient bandwidth utilization, wherein the one or more communication links are adjustable by the communication manager adjusting the bandwidth of each of the one or more communication links, the frequency bands utilized by each of the one or more communication links, and the latency for each of the one or more communication links.

36 Claims, 29 Drawing Sheets

(51) Int. Cl.
| | |
|---|---|
| *H04W 4/90* | (2018.01) |
| *H04W 28/18* | (2009.01) |
| *H04W 72/54* | (2023.01) |
| *H04W 4/06* | (2009.01) |
| *H04W 4/70* | (2018.01) |
| *H04W 84/04* | (2009.01) |
| *H04W 84/12* | (2009.01) |

(52) U.S. Cl.
CPC .......... *H04W 72/0446* (2013.01); *H04W 4/06* (2013.01); *H04W 4/70* (2018.02); *H04W 84/042* (2013.01); *H04W 84/12* (2013.01)

(58) Field of Classification Search
CPC ..... H04W 28/18; H04W 28/20; H04W 28/22; H04W 4/06; H04W 84/042; H04W 84/12; H04W 4/70; H04W 4/02; H04W 28/16; H04W 72/042; H04W 72/54; H04L 67/125
See application file for complete search history.

(56) References Cited

U.S. PATENT DOCUMENTS

| | | | |
|---|---|---|---|
| 6,501,785 | B1 | 12/2002 | Chang et al. |
| 6,879,808 | B1* | 4/2005 | Nations .............. H04B 7/18523 455/12.1 |
| 7,035,644 | B1 | 4/2006 | Maruyama |
| 7,155,236 | B2 | 12/2006 | Chen et al. |
| 7,260,079 | B1* | 8/2007 | Chapman .............. H04W 28/20 370/252 |
| 9,521,653 | B2 | 12/2016 | Zhu et al. |
| 9,572,167 | B1 | 2/2017 | Oroskar et al. |
| 2003/0103477 | A1 | 6/2003 | Doi et al. |
| 2005/0065770 | A1 | 3/2005 | Karaoguz et al. |
| 2005/0197680 | A1 | 9/2005 | Delmain et al. |
| 2006/0251041 | A1 | 11/2006 | Pajukoski et al. |
| 2006/0285515 | A1 | 12/2006 | Julian et al. |
| 2007/0202903 | A1 | 8/2007 | Ge et al. |
| 2008/0081655 | A1 | 4/2008 | Shin et al. |
| 2008/0176577 | A1* | 7/2008 | Bourlas .............. H04W 72/1257 455/454 |
| 2008/0219145 | A1 | 9/2008 | Sundaresan et al. |
| 2009/0010198 | A1 | 1/2009 | Boariu et al. |
| 2009/0117859 | A1 | 5/2009 | Smith et al. |
| 2009/0147737 | A1 | 6/2009 | Tacconi et al. |
| 2009/0164638 | A1 | 6/2009 | Jang et al. |
| 2009/0257392 | A1* | 10/2009 | Hosein ................. H04W 72/048 370/329 |
| 2010/0023622 | A1 | 1/2010 | Kim et al. |
| 2010/0189069 | A1 | 7/2010 | Sahinoglu et al. |
| 2010/0226268 | A1 | 9/2010 | Tao et al. |
| 2010/0296478 | A1 | 11/2010 | Hogenmueller et al. |
| 2011/0261791 | A1 | 10/2011 | Lamm et al. |
| 2012/0002541 | A1 | 1/2012 | Lee et al. |
| 2012/0008590 | A1 | 1/2012 | Novak et al. |
| 2012/0063373 | A1 | 3/2012 | Chincholi et al. |
| 2012/0263060 | A1* | 10/2012 | Suzuki .............. H04W 72/0473 370/254 |
| 2013/0041948 | A1 | 2/2013 | Tseng |
| 2013/0272213 | A1 | 10/2013 | Manssour |
| 2013/0317642 | A1 | 11/2013 | Asaria et al. |
| 2013/0344823 | A1 | 12/2013 | Almgren et al. |
| 2014/0010186 | A1 | 1/2014 | Cordeiro |
| 2014/0072306 | A1* | 3/2014 | Sridhar ............... H04J 14/0275 398/79 |
| 2014/0119321 | A1 | 5/2014 | Wang et al. |
| 2014/0365258 | A1 | 12/2014 | Vestal et al. |
| 2015/0131452 | A1 | 5/2015 | Choi et al. |
| 2015/0289157 | A1 | 10/2015 | Lundqvist et al. |
| 2017/0086181 | A1 | 3/2017 | Briggs |
| 2017/0126366 | A1 | 5/2017 | Kusano |
| 2017/0150527 | A1 | 5/2017 | Duval et al. |

FOREIGN PATENT DOCUMENTS

| | | |
|---|---|---|
| KR | 20110107242 A | 9/2011 |
| WO | 03051007 A1 | 6/2003 |
| WO | 2007024936 A2 | 3/2007 |
| WO | 2009022749 A2 | 2/2009 |
| WO | 2013119942 A1 | 8/2013 |
| WO | 2014075937 A1 | 5/2014 |
| WO | 2014090684 A1 | 6/2014 |
| WO | 2014195901 A1 | 12/2014 |
| WO | 2014203126 A1 | 12/2014 |
| WO | 2015019055 A1 | 2/2015 |

OTHER PUBLICATIONS

Examination Report dated Nov. 22, 2017, by the British Intellectual Property Office in British Patent Application No. GB1509793.4 (4 pages).
International Preliminary Report on Patentability (PCT/IB373) dated Dec. 6, 2016, by the International Bureau of WIPO for International Application No. PCT/EP2015/062587, 6 pages.
International Search Report (PCT/ISA/210) dated Apr. 14, 2016, by the European Patent Office as the International Searching Authority for International Application No. PCT/EP2015/062587.
Written Opinion (PCT/ISA/237) dated Apr. 14, 2016, by the European Patent Office as the International Searching Authority for International Application No. PCT/EP2015/062587.
Martins, "Reducing Communication Delay Variability for a Group of Robots," A Dissertation Presented to the Faculty of the Daniel Felix Ritchie School of Engineering and Computer Science, University of Denver, Nov. 2013, pp. 1-65 (Year: 2013).
Rybski , et al., "Effects of Limited Bandwidth Communications Channels on the Control of Multiple Robots," Proceeding of the 2001 IEEE/RSJ, International Conference on Intelligent Robots and Systems, Maui, Hawaii, Oct. 29-Nov. 3, 2001, pp. 369-374 (year: 2001).
Office Action dated Jun. 21, 2021, by the Canadian Patent Office in corresponding Canadian Patent Application 2,950,976. (6 pages).
Office Action (Notification of Reason for Refusal) dated Mar. 26, 2021, by the Korean Patent Office in corresponding Korean Patent Application No. 10-2017-7000228, and an English Translation of the Office Action. (6 pages).
The United Arab Emirates Examination Report dated Jun. 23, 2020, by the United Arab Emirates Patent Office in corresponding United Arab Emirates Application No. P1235/2016. (6 pages).
The United Arab Emirates Search Report dated Jun. 23, 2020, by the United Arab Emirates Patent Office in corresponding United Arab Emirates Application No. P1235/2016. (4 pages).
N. Le et al., "A New QoS Resource Allocation Scheme Using GTS for WPANs", Wireless Pers Commun, Aug. 30, 2012. (21 pages).
J. Nieminen et al., "Delay-throughput Analysis of Multi-channel MAC Protocols in Ad hoc Networks", Springer, EURASIP Journal on Wireless Communications and Networking, Dec. 31, 2011. (15 pages).
Office Action dated Dec. 23, 2020, by the Korean Patent Office in corresponding Korean Patent Application No. 10-2017-7000228, and a partial English Translation of the Office Action. (7 pages).
Office Action (Patent Examination Report 1) dated Jun. 23, 2020, by the New Zealand Patent Office in corresponding New Zealand Patent No. 758679. (2 pages).
Office Action (Communication) dated Oct. 8, 2021, by the European Patent Office in corresponding European Patent Application No. 19155835.2. (6 pages).
Office Action (Notification of Reason for Refusal) dated Aug. 21, 2021, by the Korean Patent Office in corresponding Korean Patent Application No. 10-2021-7021366, and an English Translation of the Office Action. (6 pages).
Office Action dated Apr. 21, 2022, by the Canadian Patent Office in corresponding Canadian Patent Application No. 2,950,976. (4 pages).
Office Action (Request for the Submission of an Opinion) dated Jul. 19, 2022, by the Korean Patent Office in corresponding Korean Patent Application No. 10-2022-7005668, and an English Translation of the Office Action. (8 pages).

(56) References Cited

OTHER PUBLICATIONS

Office Action dated Feb. 20, 2023, by the Canadian Patent Office in corresponding Canadian Patent Application No. 2,950,976. (4 pages).
Office Action dated Feb. 27, 2023, by the Korean Patent Office in corresponding Korean Patent Application No. 10-2022-7005668, and a machine English Translation of the Office Action. (8 pages).
Office Action dated Aug. 30, 2023, by the Indian Patent Office in corresponding Indian Patent Application No. 201617041676. (4 pages).
Office Action dated Aug. 30, 2023, issued in the corresponding Indian Patent Application No. 201617041676. (4 pages).
Office Action (Notice of Allowance) dated Jun. 10, 2023, by the Korean Patent Office in corresponding Korean Patent Application No. 10-2022-7005668, and a partial English Translation of the Office Action. (4 pages).
AutoStore Logistic Technical presentation, Youtube video: https://www.youtube.com/watch?v=iyVDMp2bL9c, Aug. 26, 2009, 1 page.
Notice of Opposition against EP3152956 of Ocado Innovation Limited, Dec. 19, 2019, 42 pages.
Ongoing Opposition Proceedings against EP3152956—Ocado Innovation Ltd., Apr. 8, 2021, 15 pages.
Opposition against European Patent 3152956 of Ocado Innovation Limited, Jul. 10, 2020, 21 pages.
Office Action dated Jul. 22, 2023, issued in the corresponding Chinese Patent Application No. 202011278742.2, 7 pages only.
Martini, Andreas, "Systemvergleich Innovativer Konzepte der automatischen Kleinteillagerung", Jul. 2011, 115 pages.
Wulfraat, Marc, "Swisslog Autostore: An In-Depth Review of Automated Split Case Picking Technology for Distribution Centers", MWPVL International http://www.mwpvl.com/html/swisslog_autostore_review.html, Apr. 2012, 16 pages.

* cited by examiner

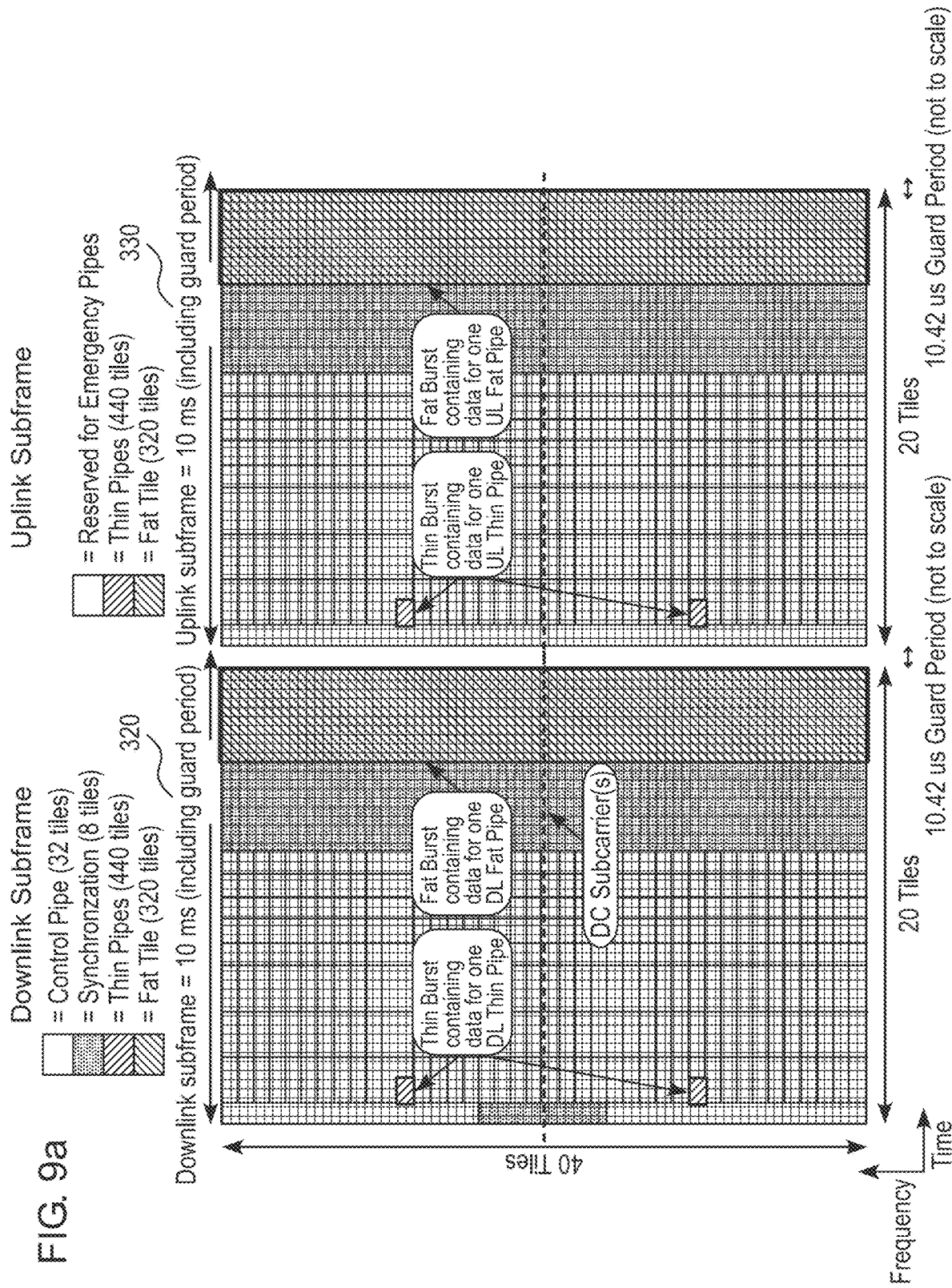

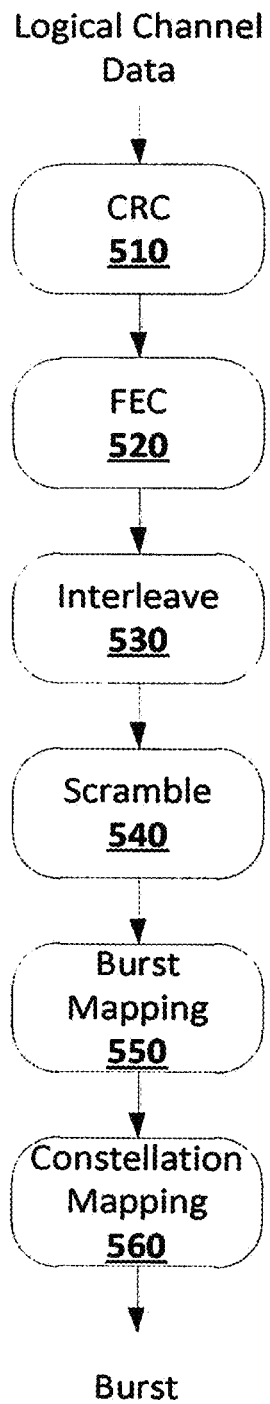
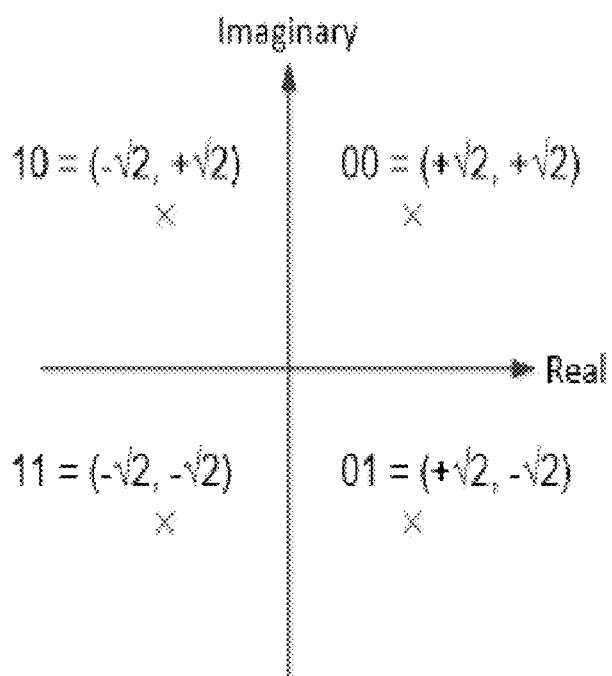
FIG. 10a
FIG. 10b

FIG. 18

Estimated Uplink Max Signal Level

| | | |
|---|---|---|
| Frequency | 5800.00 MHz | |
| Tx Power | 6.50 dBm | The transmitter must produce at least this power |
| Testing tolerance | 0.00 dB | Power setting tolerance |
| Tx Antenna Gain | 0.00 dBi | Assuming 0dBi |
| | | 10dBm/MHz and we are -3.5dB down for 450kHz assuming we are using uplink power control. |
| EIRP | 6.50 dBm | Transmitting at least this but no more than 6.5 |
| Range | 1.00 m | Assumed closet distance |
| Mean Path Loss | -47.71 dB | Assumed Line of Site |
| Fading/Diversity Gain/Other Interference | 0.00 dB | Assumes no fading |
| Receiver Antenna Gain | 18.00 dBi | Assumes highest gain on boresight |
| Received Signal Level | -23.21 dBm | At antenna connector |

FIG. 19
Estimated Uplink Minimum Signal Level

| | | |
|---|---|---|
| Frequency | 5800.00 MHz | |
| Tx Power | 6.50 dBm | The transmitter must produce at least this power |
| Testing tolerance | -1.50 dB | Power setting tolerance |
| Tx Antenna Gain | 0.00 dBi | Assuming 0dBi |
| | | 10dBm/MHz and we are -3.5dB down for 450kHz assuming we are using uplink power control. |
| EIRP | 5.00 dBm | Transmitting at least this but no more than 6.5 |
| Range | 135.00 m | Assumed at the corner of the grid |
| Mean Path Loss | -90.31 dB | Assumed Line of Site |
| Fading/Diversity Gain/Other Interference | -10.00 dB | Assumes -10dB down after MRC |
| Receiver Antenna Gain | 9.00 dBi | Assumes the minimum BS antenna gain |
| Received Signal Level | -86.31 dBm | |
| Thermal Noise | -174.00 dBm/Hz | |
| Bandwidth | 56.53 dBHz | 450kHz Bandwidth |
| Noise Figure | 8.00 dB | Estimate |
| Noise power | -109.47 dBm/Hz | |
| Required CNR | 8.50 dB | From Mathcad calculation |
| Receiver sensitivity | -100.97 dB | Approximately, receiver must receive this |
| Achieved CNR | 23.16 dB | |
| Margin | 14.66 dB | |

Base Station Receive Chain

Version 0.0 / Fraser Edwards
*DRAFT under Development*

| | Connector | BPF | Tx/Rx Switch | LNA 1 MGA 30929 | LNA 2 MGA 30929 | BPF | Splitter (for Radar) (Rx) Mixer | Amplifier | IP Filter | IQ Mixer | Amplifier | Lowpass | |
|---|---|---|---|---|---|---|---|---|---|---|---|---|---|
| Individual Stage Values | | | | | | | | | | | | | |
| Stage gain min tolerance | -1.0 | -1.5 | -1.5 | 7.5 | -1.5 | -4.0 | 5.0 | 9.0 | 4.0 | 7.0 | -5.0 | 4.0 | |
| Stage gain NORMAL | -1.0 | -1.0 | -0.5 | 8.0 | -1.0 | -4.0 | 6.0 | 10.0 | 5.0 | 8.0 | -4.0 | 4.0 | |
| Stage gain max tolerance | -1.0 | -0.8 | -0.4 | 8.5 | -0.8 | -4.0 | 7.0 | 11.0 | 6.0 | 9.0 | -3.0 | 4.0 | |
| Stage NF min tolerance gain | -1.0 | 1.5 | 1.5 | 2.5 | 1.5 | 4.0 | 11.7 | 6.0 | 11.0 | 6.0 | 5.0 | 6.0 | |
| Stage noise figure NORMAL | -1.0 | 1.0 | 0.6 | 2.0 | 1.0 | 4.0 | 11.7 | 6.0 | 11.0 | 6.0 | 1.0 | 6.0 | |
| Stage NF max tolerance gain | -1.0 | 0.8 | 0.4 | 1.6 | 0.8 | 4.0 | 11.7 | 6.0 | 11.0 | 6.0 | -3.0 | 6.0 | |
| Stage OIP3 min tolerance gain | 100.0 | 100.0 | 35.0 | 35.0 | 100.0 | 100.0 | 24.0 | 25.0 | 14.0 | 24.0 | 100.0 | 20.0 | |
| Stage OIP3 NOMINAL | 100.0 | 100.0 | 35.0 | 35.0 | 100.0 | 100.0 | 26.0 | 25.0 | 15.0 | 24.0 | 100.0 | 20.0 | |
| Stage OIP3 max tolerance gain | 100.0 | 100.0 | 35.0 | 35.0 | 100.0 | 100.0 | 26.0 | 25.0 | 16.0 | 24.0 | 100.0 | 20.0 | |
| Approx. stage P1dB min tol gain | 100.0 | 100.0 | 22.0 | 22.0 | 100.0 | 100.0 | 11.0 | 10.0 | 20.0 | 20.0 | 100.0 | 20.0 | |
| Approx. stage P1dB NOMINAL | 100.0 | 100.0 | 22.0 | 22.0 | 100.0 | 100.0 | 11.0 | 10.0 | 20.0 | 20.0 | 100.0 | 20.0 | |
| Approx. stage P1dB max tol gain | 100.0 | 100.0 | 22.0 | 22.0 | 100.0 | 100.0 | 11.0 | 10.0 | 20.0 | 20.0 | 100.0 | 20.0 | |
| Cumulative Stage Values | | | | | | | | | | | | | |
| Cum gain min tolerance | -1.0 | -1.5 | -3.0 | 4.5 | 10.5 | 20.5 | 51.5 | 24.5 | 16.5 | 27.5 | 22.5 | 26.5 | |
| Cum gain NOMINAL | -1.0 | -1.0 | -1.5 | 6.5 | 13.5 | 26.5 | 19.5 | 29.5 | 21.5 | 32.5 | 28.5 | 32.5 | |
| Cum gain max tolerance | -1.0 | -0.8 | -1.2 | 7.3 | 15.0 | 29.0 | 22.0 | 33.0 | 28.5 | 37.5 | 34.5 | 38.6 | |
| Cum NF min tolerance gain | 1.0 | 2.5 | 3.7 | 5.9 | 6.2 | 7.4 | 7.4 | 7.4 | 7.6 | 7.7 | 7.7 | 7.7 | |
| Cum NF NOMINAL | 1.0 | 3.0 | 2.4 | 4.1 | 4.3 | 5.3 | 5.3 | 5.3 | 5.4 | 5.4 | 5.4 | 5.5 | |
| Cum NF max tolerance gain | 1.0 | 1.8 | 2.1 | 3.5 | 3.6 | 4.4 | 4.4 | 4.4 | 4.5 | 4.5 | 4.5 | 4.5 | |
| Cum OIP3 min tolerance gain | 100.0 | 96.5 | 39.0 | 34.7 | 32.7 | 20.3 | 23.8 | 24.3 | 16.3 | 18.6 | 13.6 | 15.6 | |
| Cum OIP3 NOMINAL | 100.0 | 96.5 | 39.0 | 31.7 | 33.3 | 21.7 | 24.8 | 24.6 | 14.6 | 19.7 | 15.7 | 16.8 | |
| Cum OIP3 max tolerance gain | 100.0 | 96.6 | 39.0 | 34.8 | 33.6 | 20.7 | 26.9 | 24.7 | 14.2 | 20.8 | 17.8 | 17.8 | |
| Cum IIP3 min tolerance gain | 101.0 | 97.7 | 42.0 | 30.2 | 22.2 | -0.2 | 0.3 | -0.2 | -7.4 | -0.9 | -8.9 | -10.9 | |
| Cum IIP3 NOMINAL | 101.0 | 97.5 | 40.5 | 26.2 | 19.8 | -4.9 | 5.3 | -4.9 | -10.8 | -12.8 | -12.8 | -15.7 | |
| Cum IIP3 max tolerance gain | 101.0 | 97.4 | 40.2 | 27.5 | 18.6 | -8.3 | 3.9 | -8.3 | -13.9 | -16.7 | -16.7 | -20.7 | |
| Signal Levels & Headroom | | | | | | | | | | | | | |
| | *Antenna Connector Signal Level* | | | | | | | | | | | | |
| Cumulative level min tolerance gain | -107.0 | -108.0 | -109.5 | -111.0 | -103.5 | -97.5 | -87.5 | -92.5 | -91.5 | -87.5 | -80.5 | -85.5 | -81.5 |
| Cumulative level NOMINAL | -107.0 | -108.0 | -109.0 | -109.5 | -101.5 | -93.5 | -94.5 | -88.5 | -83.5 | -88.5 | -83.5 | -79.5 | -75.5 |
| Cumulative level max tolerance gain | -107.0 | -108.0 | -108.8 | -109.2 | -100.7 | -92.2 | -93.0 | -79.0 | -85.0 | -79.5 | -73.5 | -69.5 | |
| Cumulative level min tolerance gain | -23.0 | -24.0 | -25.5 | -27.0 | -19.5 | -13.5 | -12.0 | -8.5 | -7.5 | -3.5 | 3.5 | 2.5 | |
| Cumulative level NOMINAL | -23.0 | -24.0 | -25.0 | -25.5 | -17.5 | -9.5 | -10.5 | -1.5 | -1.5 | -4.5 | 8.6 | |
| Cumulative level max tolerance gain | -23.0 | -24.0 | -24.8 | -25.2 | -16.7 | -8.2 | -9.0 | 5.0 | 1.5 | 13.5 | 10.5 | 14.6 | |
| Headroom min tolerance gain | 124.0 | 125.5 | 54.0 | 34.5 | 113.5 | 19.5 | 9.5 | 107.5 | 16.5 | 101.5 | 17.5 | |
| Headroom NOMINAL | 124.0 | 125.0 | 52.5 | 31.5 | 110.5 | 15.5 | 4.5 | 104.5 | 11.5 | 95.5 | 11.5 | |
| Headroom max tolerance gain | 124.0 | 124.8 | 52.2 | 38.7 | 30.2 | 109.0 | 13.0 | 1.0 | 101.5 | 6.5 | 69.5 | 5.5 | |

| | Voltage on a 200 Ohm Load |
|---|---|
| | 0.04 mVrms |
| | 0.08 mVrms |
| | 0.15 mVrms |
| | 596.31 mVrms |
| | 1189.91 mVrms |
| | 2374.19 mVrms |

FIG. 20

Version 0.0 / Fraser Edwards
DRAFT under Development

| Output signal | Level | BPF | Switch | Power Detect | PA | PA Driver | LO & Image Reject | Mixer | Temp Comp Attenuator | Amp | IF Filter | Amp |
|---|---|---|---|---|---|---|---|---|---|---|---|---|
| Individual Stage Values | | | | | | | | | | | | |
| Stage gain min tolerance | dB | -3.0 | -1.5 | -1.0 | 9.0 | 9.0 | -3.0 | 0.0 | -6.0 | 14.0 | -6.0 | 9.0 |
| Stage gain NORMAL | dB | -2.3 | -1.0 | -0.5 | 10.0 | 10.0 | -2.3 | 0.0 | -6.0 | 15.0 | -6.0 | 10.0 |
| Stage gain max tolerance | dB | -2.0 | -0.4 | -0.4 | 10.5 | 10.5 | -2.0 | 0.0 | -6.0 | 16.0 | -6.0 | 11.0 |
| Stage NF min tolerance NORMAL | dD | 3.0 | 1.5 | 1.0 | 7.0 | 3.5 | 3.0 | 12.0 | 6.0 | 10.0 | 10.0 | 0.0 |
| Stage noise figure NORMAL | dB | 2.3 | 1.0 | 0.5 | 7.0 | 3.5 | 2.3 | 12.0 | 6.0 | 10.0 | 10.0 | 8.0 |
| Stage NF max tolerance gain | dB | 2.0 | 0.4 | 0.4 | 7.0 | 3.5 | 2.0 | 12.0 | 6.0 | 10.0 | 10.0 | 8.0 |
| Stage OIP3 min tolerance gain | dBm | 100.0 | 37.0 | 100.0 | 35.0 | 25.0 | 100.0 | 20.0 | 100.0 | 25.0 | 100.0 | 20.0 |
| Stage OIP3 NOMINAL | dBm | 100.0 | 37.0 | 100.0 | 35.0 | 25.0 | 100.0 | 20.0 | 100.0 | 25.0 | 100.0 | 20.0 |
| Stage OIP3 max tolerance gain | dBm | 100.0 | 37.0 | 100.0 | 35.0 | 25.0 | 100.0 | 20.0 | 100.0 | 25.0 | 100.0 | 20.0 |
| Approx. stage P1dB min tol gain | dBm | 100.0 | 27.0 | 100.0 | 18.0 | 15.0 | 100.0 | 10.0 | 100.0 | 15.0 | 100.0 | 10.0 |
| Approx. stage P1dB NOMINAL | dBm | 100.0 | 27.0 | 100.0 | 18.0 | 15.0 | 100.0 | 10.0 | 100.0 | 15.0 | 100.0 | 10.0 |
| Approx. stage P1dB max tol gain | dBm | 100.0 | 27.0 | 100.0 | 18.0 | 15.0 | 100.0 | 10.0 | 100.0 | 15.0 | 100.0 | 10.0 |
| Cummulative Stage Values | | | | | | | | | | | | |
| Cum gain min tolerance | dB | 20.5 | 23.5 | 25.0 | 26.0 | 17.0 | 8.0 | 11.0 | 11.0 | 17.0 | 3.0 | 9.0 |
| Cummulative gain NOMINAL | dB | 26.9 | 29.2 | 30.2 | 30.7 | 20.7 | 10.7 | 13.0 | 13.0 | 19.0 | 4.0 | 10.0 |
| Cum gain max tolerance | dB | 31.2 | 33.2 | 33.6 | 34.0 | 23.5 | 13.0 | 15.0 | 15.0 | 21.0 | 5.0 | 11.0 |
| Cum NF min tolerance | dB | 11.3 | 11.3 | 11.3 | 11.3 | 11.3 | 11.2 | 11.2 | 10.8 | 10.8 | 8.7 | 8.0 |
| Cummulative NF NOMINAL | dB | 10.7 | 10.7 | 10.7 | 10.7 | 10.7 | 10.6 | 10.6 | 10.3 | 10.3 | 8.6 | 8.0 |
| Cum NF max tolerance gain | dB | 7.1 | 7.1 | 7.1 | 7.1 | 7.1 | 7.1 | 7.0 | 16.6 | 16.6 | 2.3 | 0.0 |
| Cum OIP3 min tolerance gain | dBm | 22.0 | 25.1 | 26.9 | 27.9 | 19.8 | 12.4 | 15.4 | 17.2 | 23.2 | 14.0 | 20.0 |
| Cummulative OIP3 NOMINAL | dBm | 25.3 | 27.6 | 29.1 | 29.6 | 21.1 | 13.3 | 15.6 | 17.5 | 23.5 | 14.0 | 20.0 |
| Cum OIP3 max tolerance gain | dBm | 26.8 | 28.8 | 29.9 | 30.3 | 21.6 | 13.8 | 15.8 | 17.8 | 23.8 | 14.0 | 20.0 |
| Cum IIP3 min tolerance gain | dBm | 1.6 | 1.6 | 1.9 | 1.9 | 2.8 | 4.4 | 4.4 | 6.2 | 6.2 | 11.0 | 11.0 |
| Cummulative IIP3 NOMINAL | dBm | -1.6 | -1.6 | -1.1 | -1.1 | 0.4 | 2.6 | 2.6 | 4.5 | 4.5 | 10.0 | 10.0 |
| Cum IIP3 max tolerance gain | dBm | -4.4 | -4.4 | -3.7 | -3.7 | -1.9 | 0.8 | 0.8 | 2.8 | 2.8 | 9.0 | 9.0 |
| Signal Levels & Headroom | | | | | | | | | | | | |
| | | Antenna Connector Signal Level | | | | | | | | | | |
| Cummulative level min tolerance gain | dBm | 10.5 | 13.5 | 15.0 | 16.0 | 7.0 | -2.0 | 1.0 | 1.0 | 7.0 | -7.0 | -1.0 |
| Cummulative level NOMINAL | dBm | 16.9 | 19.2 | 20.2 | 20.7 | 10.7 | 0.7 | 3.0 | 3.0 | 9.0 | -6.0 | 1.0 |
| Cummulative level max tolerance gain | dBm | 21.2 | 23.2 | 23.6 | 24.0 | 13.5 | 3.0 | 5.0 | 5.0 | 11.0 | -5.0 | 9.0 |
| Headroom min tolerance gain | dB | 89.5 | 13.5 | 85.0 | 2.0 | 8.0 | 102.0 | 9.0 | 99.0 | 8.0 | 107.0 | 11.0 |
| Headroom NOMINAL | dB | 83.1 | 7.8 | 79.8 | -2.7 | 1.3 | 99.3 | 7.0 | 97.0 | 6.0 | 106.0 | 10.0 |
| Headroom max tolerance gain | dB | 78.8 | 3.8 | 76.4 | -6.0 | 1.5 | 97.0 | 5.0 | 95.0 | 4.0 | 105.0 | 9.0 |

FIG. 21

SYSTEM AND METHOD FOR ALLOCATING COMMUNICATION LINKS

FIELD

The invention relates to systems and methods for communication. More particularly but not exclusively, the invention provides improved systems and methods for radio or wireless communications where communications are provided between one or more devices.

BACKGROUND

Wireless communications and networks may be used advantageously in a variety of different settings to provide communications infrastructure, arranged using a number of topologies and strategies that would otherwise not be possible and/or inconvenient using wired networks alone. Wireless communications may be utilized in conjunction with wired communications.

A challenge facing wireless networks when providing effective and consistent communication is limited spectrum bandwidth. Spectrum is limited both by natural constraints (e.g. desirable and undesirable characteristics for signals in certain frequency ranges) and also by legal/regulatory reasons (e.g. certain bands of frequency are allocated towards particular uses by a government or regulatory body).

Various techniques to allocate spectrum usage, in various dimensions, such as time, frequency, etc., and the ability to combine/separate signals may be utilized to use limited spectrum bandwidth more efficiently. In most arrangements, a wireless network is configured to provide a protocol for sharing, allocating and reusing the spectrum bandwidth.

These protocols may also be designed with consideration for a number of environmental factors, and may also be scalable given that these protocols are often used in conjunction with dynamic systems where the number of devices may vary over time, and communication needs may also vary over time. For example, devices may enter the network, leave the network, record data, send updates, receive configuration files, receive instructions, etc. Further issues may include the density of the devices within a physical area and the need for simultaneous communications.

Environmental factors may include, for example, issues with spectral noise, interference, signal degradation, wave absorption/blocking/reflection, multipath fading, and limited availability of spectrum.

Furthermore, in systems where there may be a number of devices, the system may be designed to, for example, account for devices joining/exiting the network, allocate/resize various transmission pathways needed by various devices, broadcast messages across a number of devices, account for devices malfunctioning or otherwise being out of communication, redundancy requirements, etc.

The system may also be configured in consideration of potential networking issues, such as signal latency, packet loss, out of order data packets, communication link congestion, packet collision, etc.

While there are existing technologies/protocols available, such as the IEEE 802.11 standard/Wi-Fi™, and wireless cellular communications (2G, 3G, Universal Mobile Telecommunications System (UMTS), Long-Term Evolution (LTE), etc.), these technologies/protocols may have disadvantages that limit their application in various scenarios.

Further, these technologies/protocols existing may often be limited to frequency bands that are highly regulated, may often be used by external devices for communications (e.g. external traffic and noise), may have undesirable signal characteristics (e.g. inability to penetrate walls, lack of bandwidth, low bit rate, antenna size, transmission power, beam density), among others.

A drawback of utilizing existing wireless cellular communications infrastructure and/or technologies is that there may be high costs involved with the provisioning of service. Devices may be required to be adapted for access into these networks, which may be controlled by third party telecommunications companies, and may also be adapted poorly for the particular use scenarios contemplated. The provisioning of services may also be cost prohibitive, especially if a large number of devices is involved. Further, the existing wireless cellular communications infrastructure may be poorly adapted for a densely packed, large number of devices that are engaged in frequent communications, especially if communication links are established on a dynamic and/or ad-hoc basis (e.g. the number of available communication links could be overloaded during periods of high demand). A loss of communications could lead to consequences such as increased overhead/redundancy, collisions of devices, lack of coordination, etc.

It may be potentially advantageous to be able to operate on different frequency bands to those utilized by existing technologies/protocols, using a variety of telecommunications schemes and technologies that may, for example, provide for improved resiliency/redundancy, increased scalability, lower latency, improved bandwidth, reduced regulatory requirements, reduced infrastructure requirements, better signal characteristics, reduced noise and/or other differences.

The existing technologies/protocols may also be designed for other uses, which may result in undesirable topologies and/or characteristics. For example, existing technologies/protocols may utilize distributed coordination functions as opposed to point coordination functions (which, in most circumstances, may not be supported by the WiFi™ interoperability standards) in the media access control (MAC) layer, which impacts how information is transmitted across a given communication link and how traffic is coordinated. The distributed coordination function, while useful for certain applications, provides asynchronous data transmission, which may be better suited for delay insensitive data.

WiFi typically handles up to 64 or up to 256 terminals per base station. It may not be well equipped to handle applications such as those with hundreds, or even thousands of terminals/devices, such as those contemplated in some embodiments.

WiFi typically has a range of 100 m, radially from the base station. A system may need to have a longer range, depending on the particular application and implementation.

WiFi networks degrade more as terminals are added due to contended access to the medium (rather than using dedicated frequency and time slots). Contended access can become problematic when a terminal is in range of a base station but is not in range of other terminals that are themselves in range of the base station.

A terminal might transmit, not realising that another terminal is transmitting simultaneously, and the transmission may then encounter issues such as collisions, latency, packet loss, etc.

WiFi can include a point coordination function feature to provide non-contended access using a round-robin approach; however, this is not commonly available from leading vendors and may be limited to about half the available bandwidth.

A point coordination function design may be potentially advantageous for communications in an environment where there are a large number of densely packed devices that need to communicate in a manner that is delay sensitive (e.g. real-time or near-real time instructions, particularly where the control and coordination of activities is important).

Another consideration may be how the protocol handles network contention, where one or more devices contend for network access. A potential advantage with a point coordination function design is the ability to utilize contention free traffic schemes, where, for example, an access point coordinates communications with devices such that there may not be simultaneous transmissions (e.g. the access point provides each device a specific time, or frequency, or time, where it has the right of way for communications). Contention free traffic schemes may be potentially useful in establishing communication priorities and/or avoiding various network issues, such as packet collisions, latency, etc.

Communications networks may be used to exchange information of different sizes, priority and/or importance, such as monitoring and diagnostic information, control information, data, configuration information, movement information, environmental information, and the information may be time-sensitive, not time-sensitive and/or scheduled, depending on the application.

SUMMARY

It is desirable to provide a communications system that provides effective communications for one or more devices.

In some aspects, a communication system for communication between one or more terminal units is provided, comprising a communication manager that is configured to define and manage one or more adjustable communication links for efficient bandwidth utilization, wherein the one or more communication links are adjustable by the communication manager adjusting the bandwidth of each of the one or more communication links, the frequency bands utilized by each of the one or more communication links, and the latency for each of the one or more communication links.

In some aspects, a communication system is provided where the bandwidth of the one or more communication links can be adjusted by adjusting one of at least one parameter associated with the one or more communication links, including frequency usage, tile characteristics, multiplexing/de-multiplexing techniques, timing and code usage.

In some aspects, a communication system is provided where the tile characteristics include at least one of pilots and forward error correction.

In some aspects, a communication system comprises one or more base stations.

In some aspects, a communication system comprises one or more base station controllers.

In some aspects, a communication system is provided wherein the one or more communication links is comprised of: one or more low bandwidth communication links configured for communication between the base station and the plurality of terminal units; and one or more high bandwidth communication links configured for communication between the base station and the plurality of terminal units.

In some aspects, a communication system is provided wherein the one or more low bandwidth communication links is configured for communication within a predetermined latency range.

In some aspects, a communication system is provided wherein the zero or more high bandwidth communication links are configured for communication within a variable latency range.

In some aspects, a communication system is provided wherein the number of the one or more low bandwidth communication links and the zero or more high bandwidth communication links can be adjusted during a start-up process of the one or more base stations.

In some aspects, a communication system is provided wherein the number of the one or more low bandwidth communication links and the zero or more high bandwidth communication links can be adjusted in real-time or near real-time to respond to requirements for communication between the at least one base station and the plurality of terminal units.

In some aspects, a communication system is provided wherein a data packet sent by a terminal unit of the one or more terminal units through the one or more low bandwidth communication links is transmitted at least twice, as a first data burst and a second data burst.

In some aspects, a communication system is provided wherein the first data burst and the second data burst occupy one or more different frequencies.

In some aspects, a communication system is provided wherein the one or more communication links are utilized as emergency communication links.

In some aspects, a communication system is provided wherein transmission of information to the one or more terminal units continues regardless of whether there is control information to be sent.

In some aspects, a communication system is provided wherein the one or more communication links include at least one contention-free communication links.

In some aspects, a communication system is provided wherein the transmission of information to the one or more terminal units is utilized for maintenance and troubleshooting.

In some aspects, a communication system is provided wherein dynamic frequency techniques are utilized in optimising communication links' characteristics.

In some aspects, a communication system is provided wherein dynamic frequency techniques are utilized by the one or more base stations and are handled by one or more dedicated radio frequency chains.

In some aspects, a communication system is provided that utilizes broadband coordinated multiple access schemes for command and control of large scale material handling equipment in a logistics warehouse.

In some aspects, a communication system is provided wherein the material handling equipment includes one or more autonomous guided vehicles in the logistics warehouse, which may incorporate one or more of the one or more terminal units.

In some aspects, a communication system is provided wherein the coordinated multiple access scheme is across multiple timeslots on multiple OFDM sub-carriers.

In some aspects, the communication manager (a) analyzes current demands for network access, and (b) applies a series of rules for determining dynamically particular network communication link parameters for providing efficient bandwidth utilization based on the current demands for network access.

In some aspects, a communication system is configured to implement one or more techniques for improving the chances of successful transmission and/or receipt of communications. Some wireless networks require a network "handshake" in order to establish communications between two or more devices, and enable these devices to establish the network protocol to be used to establish a network session between them. These type of network sessions generally provide reliable communications, for example in regards to achieving minimal packet loss. However, these communications also generally utilize a significant amount of network bandwidth.

In some aspects, the communication system does not utilize handshakes or a network protocol such as those typically used in establishment of a dedicated communication link. This, in part, may provide more efficient utilization of bandwidth.

In some aspects, the communication system may utilize one or more techniques to improve the successful transmission or receipt of communications. The system may be configured, for example, to transmit data more than once, resending data over different communication links, resending data over different non-adjacent communication links, and/or using a scheme to acknowledge successful receipt of data. In other words, the present invention achieves efficient bandwidth utilization in part by using duplication of network communications in a strategic manner.

In some aspects, a data packet sent by a terminal unit of the plurality of the terminal units through one or more low bandwidth communication links is transmitted at least twice, at least as a first data burst and a second data burst.

In some aspects, the communication system is configured to employ frequency diversity techniques on downlink and/or uplink communications.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practised and carried out in various ways. Also, it is to be understood that the phraseology and terminology employed herein are for the purpose of description and should not be regarded as limiting.

DESCRIPTION OF THE DRAWINGS

The invention will now be described, by way of example only, with reference to the diagrammatic drawings in which FIG. 1 provides an example block diagram indicating devices that may interoperate with the system, according to some embodiments of the invention.

FIG. 9a shows a sample frame structure showing, subframes and tiles according to some aspects of the invention.

FIG. 10a shows a sample logical channel encoding, according to some aspects of the invention.

FIG. 10b shows a symbol mapping in Quadrature Phase Shift Keying (QPSK) according to some aspects of the invention.

FIG. 18 shows estimated maximum uplink signal level for a single thin pipe, according to some aspects of the invention.

FIG. 19 shows estimated minimum uplink signal level for a single thin pipe, according to some aspects of the invention.

FIG. 20 shows a receiver block and level diagram according to some aspects of the invention.

FIG. 21 shows a sample transmitter block and level diagram according to some aspects of the invention.

DETAILED DESCRIPTION

1.1 System Overview

Disclosed in some embodiments is a communication system that may be configured to provide communications between one or more network connected devices or terminals, one or more base stations and/or one or more base station controllers.

The one or more base stations controllers may be implemented for example as a network manager for managing communications in a network environment.

The elements that may be transmitting or receiving data may generically be referenced as devices, which would include at least the terminals, base stations and base station controllers indicated above but may also be any other element capable of transmitting or receiving data.

The communication system, in a variety of embodiments, may be operable such that the one or more terminals are able to communicate with one another, or may be operable such that the one or more terminals are able to communicate with one or more centralized systems, the centralized systems including one or more base stations and/or one or more base station controllers, and/or one or more network managers. In various embodiments of the invention, the system may be operable to provide communications in a point-to-point arrangement, a point-to-multipoint arrangement, and/or a multipoint-to-multipoint arrangement.

Figure 1:
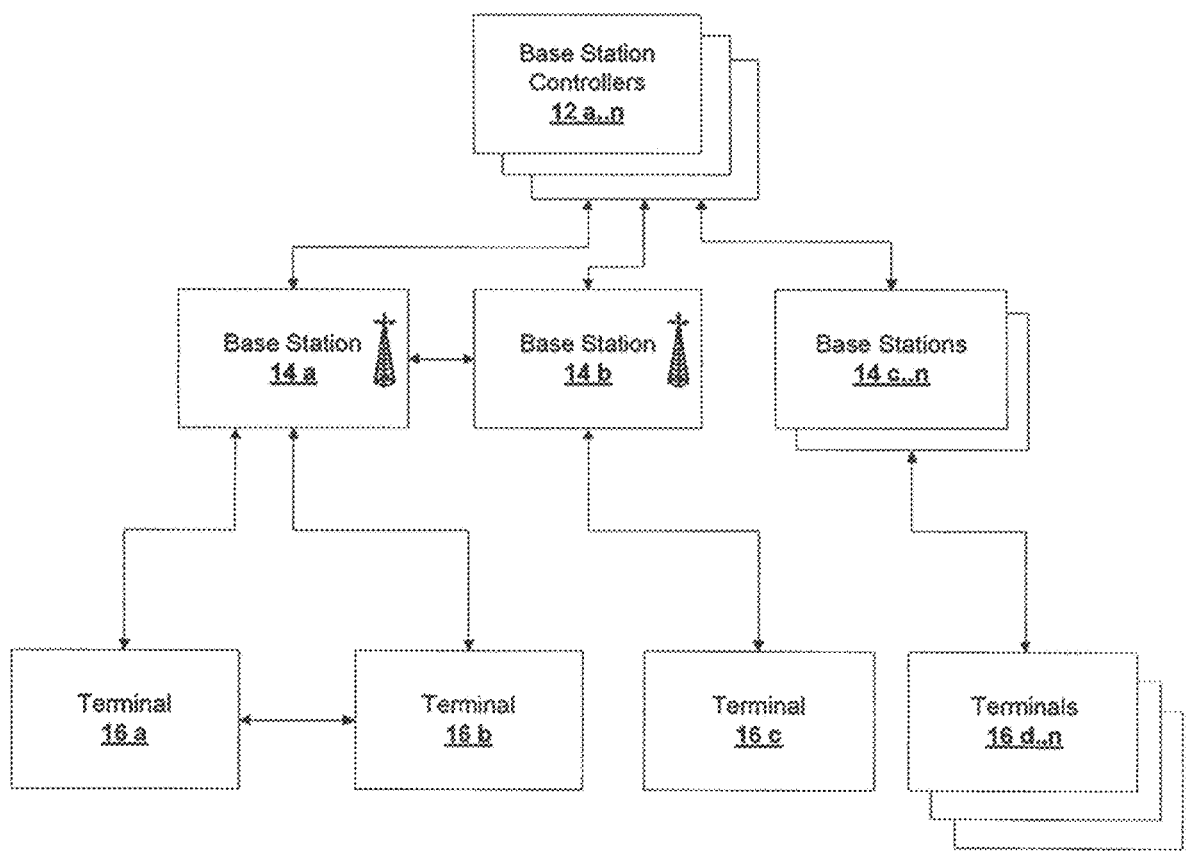

Referring to FIG. 1, an example block diagram is provided indicating various devices that may be operable with the communication system, according to some embodiments of the invention. The system may be operable with any devices that communicate with one another, but the devices shown in FIG. 1 provide illustration of some embodiments of the invention where the system is used to provide communications for one or more base station controllers 12 $a$ . . . $n$, one or more base stations 14 $a$ . . . $n$, one or more terminals 16 $a$ . . . $n$. In other embodiments of the invention, there may be more, different, and/or less devices interoperating with the system.

As indicated in FIG. 1, the communication links are not necessarily established in a hierarchical fashion. Communication links may be formed also between devices that perform similar functions, such as between terminals 16 $a$ and 16 $b$, base stations 14 $a$ and 14$b$ or base station controllers 12 $a$ . . . $n$. The communication links may be implemented using various wired/wireless media or technologies, and may be comprised of one or more communication links.

The system may, in some embodiments, operate through a variety of transmission media. The system, in various embodiments, may communicate using, for example, electromagnetic waves (radio waves, microwaves, infrared, light, laser, lidar, terahertz radiation), sound, or any transmission medium that may be utilized for wireless communications. The system may further be operable in one or more transmission media.

The communication system may be configured to enable communications by provisioning and allocating one or more communication links for communications by devices. The communication system may also be configured to utilize various technologies and/or arrangements to use the limited spectrum bandwidth more efficiently. Each link may be provisioned based on various factors, such as using various frequency ranges, timeslots, tiles, etc. Each of these links may have the same or different characteristics, such as bandwidth, latency, traffic congestion, modulation scheme, etc.

Frequencies used by various communication links may or may not be adjacent to one another, depending on the particular embodiment and configuration.

In some embodiments, the frequency ranges may be selected and the system may operate such that the system operates within regulatory standards and may co-exist with other users of communications frequencies, such as television broadcasters, mobile telephones, etc. These standards may vary from jurisdiction to jurisdiction. There may be requirements to co-exist "politely" with other users of spectrum.

The communication links may be used for transmitting or receiving information, and one or more communication links may also be utilized for emergency, monitoring or diagnostic purposes. In some embodiments of the system, the system may be configured to adapt to interference or other issues, by, for example, changing communication links for communications, resizing communication links, applying filters, employing error checking, employing spatial/frequency techniques etc.

A potential advantage of having one or more communication links that may be allocated, repurposed and/or re-sized is that the system may benefit from increased flexibility in ease of use and deployment, with a further potential advantage when scaling up/down existing deployments.

In some embodiments of the system, the capacity of the system may be altered by altering tile characteristics, such as pilots, forward error correction, etc., for various reasons, such as taking into consideration the characteristics (physical and spectral) of the environment.

The system may be designed for indoor and/or outdoor use.

1.2 Environment

Specific environments, according to some embodiments of the invention, will be discussed further in this specification. The following is a broad description of the environments that the system may operate in, according to some embodiments of the invention.

The system may be utilized to provide communication links between one or more terminals, one or more base stations and/or one or more base station controllers. As indicated earlier, the system could be used between various devices that need to communicate. The communications, for example, could be in any combination of the above devices, such as communications between terminals, between terminals and base stations, base stations and base station controllers, etc.

In some example embodiments of the invention, the system is utilized to provide communication links between a number of terminals from a central system or controller. The central system or controller may, for example, provide instructions to the one or more terminals and/or receive information (such as status, position, etc.) from the one or more terminals.

The system may operate as part of a larger system or facility, and elements of the system may also interoperate with other devices that may require communication links. For example, the system may operate within a warehouse or assembly line, where in addition to terminals, there may be human workers or other machines/devices operating.

The system may, in some embodiments, interoperate with these other elements. For example, the system may provide communication links that a warehouse management system could utilize, or an inbound/outbound truck could utilize. As such, the communication links need not be limited to terminals, base stations and/or base station controllers in some embodiments.

Communications between various devices interoperating with the system may be conducted in various directions, such as transmission of data (uplink) and receiving data (downlink), and these communications may occur at different times, at the same time, or overlapping time frames.

As further explained elsewhere in this disclosure, one aspect of the invention is a novel network communication link access method, and an associated communication system, that includes using frames and time slots in a novel and innovative way to communicate data across one or more networks. Frames are commonly used to divide data such as a data stream; and then frames can be further sub-divided into time slots. Frames and associated time slots are used in a number of different shared medium networks to manage access to network resources from a plurality of network-connected devices.

Frames, in the context of this specification, may be used to describe the period of time in which devices have an opportunity to transmit and receive, as opposed to the concept of frames in the computer networking context.

The present invention includes a novel and innovative approach to communication link access methods that provide efficient utilization of available bandwidth suitable for high density environments, where for example a relatively large number of network-connected devices share available bandwidth, or relatively frequent data communications are required.

Communication signals between various devices may be analog or digital, or a combination of analog and digital signals. The signals may be baseband signals, and/or passband signals, and intermediate signals, in some embodiments, may be used. The use of and/or conversion to/from intermediate signals may be potentially advantageous for performing operations on signals in frequency ranges that are better suited for a particular operation.

Given that the system may operate in environments with differing physical and spectral characteristics, the system, in some embodiments, may be configured accordingly to operate in these environments. For example, the system may operate in an environment where walls may be of a thickness that impedes transmission of signals of a particular frequency range. In this scenario, one or more appropriate frequency ranges may be selected for operation which may be able to penetrate these walls.

In some embodiments, the devices may apply spatial diversity of antennas to help address environmental issues, such as the ability to communicate around corners, etc. Techniques using frequency diversity, frequency hopping, etc., may also be utilized.

In some embodiments, the devices operating with the system may have their communications means synchronized in time, or within a suitable range of times. The synchronization may be, for example, relative to that of a particular master clock.

1.3 Terminals

Specific terminal types, according to some embodiments of the invention, will be discussed further in this specification. The following is a broad description of terminals that may interoperate with the system. The system may provide communication links for one or more terminals. These terminals may be devices that provide various functionality or perform various tasks, and have capabilities for transmission and/or receipt of data.

The one or more terminals, in some embodiments, may be mobile and move around relative to the environment, or the one or more terminals may be stationary. When a terminal is mobile and moves around the environment, the terminal may be able to switch communication links when the system detects that the terminal has moved to a particular area, such as to the edge of a particular area serviced by a particular base station. This process may be known as a "hand off".

The one or more terminals may have other connections for communications, such as wired connections, and may be able to communicate through any of these connections.

The one or more terminals may also have one or more onboard sensors to provide information related to the terminals and/or related to the environment. The one or more terminals may also comprise onboard non-transitory computer readable media to store various information, and/or one or more processors to provide various computing functions.

The one or more terminals may be configured to utilize communication links within one or more communication links, and may further be configured to move between communication links.

The one or more terminals may be also be configured to communicate with one another and/or listen to the communications of another one of the one or more terminals where the other one terminal is communicating with another device, for example, a base station.

The one or more terminals may be configured to perform a set of instructions if communication links have been severed or are degraded. For example, one or more terminals may be configured to use failover communication links, stop their actions, attempt re-establishing a link after a period of time, changing communication links, activating an indicator to indicate that the terminal is not in contact, etc. In some embodiments, the one or more terminals may instructed to complete a controlled stop, which may include, for example, finding an appropriate place to stop, gradually reducing speed, placing objects down, etc.

In some embodiments, the one or more terminals may have the capability to measure signal quality/strength and/or transmit information indicating the same to other devices.

In some embodiments, the one or more terminals may utilize intermediate signals which may be converted to baseband signals prior to being digitized.

In some embodiments, the one or more terminals may each have one or more communication links allocated for its use. These communication links may be dedicated links, dynamically allocated links, etc. A potential advantage of having an allocated communication link is that in combination with sensed network metrics, it may be ascertainable where there may be issues with communications. In some embodiments, the data may be transmitted via one or more duplicate communication links.

For illustrative, non-limiting purposes, example terminals may include wearable devices, transporting devices, devices carried around by individuals, the devices having limited transmission or reception capabilities, and/or autonomous robots operating within a facility having one or more processors and one or more non-volatile computer readable media to store information.

1.4 Base Stations

Specific base station types, according to some embodiments of the invention, will be discussed further in this specification. The following is a broad description of base stations that may interoperate with the system.

In some embodiments, there may be one or more base stations that provide communication links with the one or more terminals. The base stations in some embodiments, may be configured to communicate with one another.

The one or more base stations may be a transceiver that provides links for particular areas, tuned to one or more communication links for communications. The one or more base stations may be configured and/or operated as various types, for example, base stations may be configured to broadcast signals, provide communication links for communicating with terminals, communicating with other base stations, repeating signals from other sources, etc. The one or more base stations may be stationary or mobile.

According to various embodiments, the one or more base stations may operate on one communication link or more than one communication link. Further, there may be more than one base station for a particular communication link.

The one or more base stations may be configurable to operate in different communication links, change communication links, etc.

The one or more base stations may also utilize other technologies, such as noise filtering, frequency analysis of nearby frequencies, coordination with other base stations, etc., to avoid interference with other uses on the same communication link.

The one or more base stations may also communicate with other devices using wired or wireless means. The one or more base stations may also be organized as a pool of base stations. The one or more base stations may be configured to be in various modes, such as active, standby or system monitoring modes. The one or more base stations may be operable to send messages to all the devices operating within its range.

In some embodiments, the one or more base stations may operate in conjunction with one or more base station controllers. The one or more base stations may be operated according to logic and instructions provided by external devices, the one or more base station controllers, etc.

In some embodiments, the one or more base stations may be operated in a fashion similar to those in typical cellular networks, e.g. having fixed-location transceivers that avoid operating using frequency ranges used by adjacent base stations. A potential advantage of such an arrangement is the ability to reuse frequencies over a particular geographic area.

In some embodiments, base stations may be utilized in a master slave configuration, where one or more base stations may be configured to act as master base stations, and one or more base stations may be configured as slave base stations. A potential advantage of these embodiments could be the ability to have failovers and minimize service interruptions.

In some embodiments, the one or more base stations may be configured to utilize intermediate signals, with the intermediate signals being used for digitization.

1.5 Base Station Controllers

Specific base station controllers, according to some embodiments, will be discussed further in this specification. The following is a broad description of base station controllers that may interoperate with the system.

One or more base station controllers may interoperate with the system. The one or more base station controllers may provide means to control the one or more base stations, the control providing, for example, allocation of communication links, sizing of communication links, controlling handovers when devices travel in/out of range of a particular base station, combine/separate various signals (e.g. as a concentrator), etc.

In some embodiments, the one or more base station controllers may be implemented as one or more distributed computing devices, which may further be configured for increased redundancy. The base station controllers may also be configured to provide fault-resolution capabilities, and/or load balancing, etc.

2.0 Communications System

The following provides an illustrative, non-limiting description of an arrangement of the system, according to some embodiments. Communication links may be utilized as communications "pipes", and various communication links may be grouped together to form different groupings of "pipes" that may have common characteristics such as low latency, bandwidth, etc.

The communications system may be operable to utilize various multiplexing/de-multiplexing schemes to combine/separate multiple signals over a limited, shared medium.

These schemes may be implemented by utilizing various techniques such as, but not limited to, time division, frequency division, quadrature amplitude modulation and/or code division, individually or in combination. For example, orthogonal frequency-division multiplexing (OFDM) may be utilized.

These techniques may be used to provide variable bandwidth communication links ("pipes") as described further in the section below.

2.1 Pipe Sizing

In some embodiments, the system may be operable to provide one or more low bandwidth communication links and/or one or more high bandwidth communication links. The bandwidth of the communication links may be modified, for example, by allocating selective frequencies and time tiles, according to various bandwidth utilization strategies. The one or more low bandwidth communication links and one or more high bandwidth communication links may have other characteristics, such as different latency characteristics, noise, or signal degradation.

The above description is merely provided as a non-limiting, illustrative example, and it should be understood that there may be various implementations, such as only having one or more low bandwidth communication links, or just one or more high bandwidth communication links, or one or more communication links of various bandwidth.

The distinction in bandwidth/latency/other characteristics between communication links may be potentially advantageous in providing a choice of communication links for use by a terminal or any other device, so that an appropriate communication link can be utilized for a particular communication or type of communication.

The system may not be limited to simply having low and high bandwidth communication links, the communication links may be configured and grouped such that there are a range of bandwidth options available. For example, there may be an emergency band, a set of low bandwidth communication links, a set of medium bandwidth communication links, and/or a set of high bandwidth communication links.

In some embodiments, the system may be configured to adjust the sizing of the communication links, or groups of communication links. For example, the system may be configured to increase/decrease the bandwidth of a high bandwidth communication links or a low bandwidth communication links. Resizing communication links may be potentially advantageous to adapt to changing communications needs.

The communication links, according to some embodiments, may also have different characteristics, such as latency or congestion. It may be advantageous, in some situations, to provide low-latency links, such as for applications that may require near-real or real-time connections, such as the sending of instructions and/or sensory information.

For the purposes of this specification, and to provide illustrative, non-limiting descriptions, low bandwidth communication links may be referred to as "thin pipes", and high bandwidth communication links may be referred to as "fat pipes". In some embodiments, the system is not limited to simply having "thin pipes" and "fat pipes", but should be understood as having a multitude of different sized communication links.

The use of different bandwidth communication links may provide greater efficiency to the operation of the system, especially given limited bandwidth, as different network operations have different bandwidth and transmission characteristic needs.

For example, providing a set of instructions to a terminal in an initial configuration may be advantageously conducted through a fat pipe, whereas sending instructions to or receiving information from a terminal may be advantageously conducted through a thin pipe. The thin pipe could further have a fixed latency. In this example scenario, a fat pipe may be used to transmit "bursts" of data where large amounts of data transfer are preferable.

In such an arrangement, a potential advantage may be that a larger number of thin pipes may be available for allocation to many terminals, while a smaller number of fat pipes may be available for allocation to some terminals.

The various pipes may be used in various directions, e.g. a fat pipe may be used for uplink or downlink data transfer, and similar, a thin pipe may be used for uplink or downlink data transfer.

2.2 Pipe Allocation and Adjustments

In some embodiments, the system may be configured to allocate bandwidth to one or more groups of sizes of communication links. As a non-limiting, illustrative example, a frequency range, which may be defined using a various multiplexing techniques, may be utilized for example to provide a set of 1000 low bandwidth communication links and 10 high bandwidth communication links.

The ratio/number/size of groups of bandwidth communication links may be dynamically changed by the system. For example, the system may provide 20 fat pipes and 500 thin pipes at a particular time, but then provide 10 fat pipes and 1000 thin pipes at another time.

Where the number of pipes is reduced, the system may be configured to manage the re-allocation of pipes to terminals where those terminals no longer have pipes.

The system, in some embodiments, may also change the sizing of various communication links and/or create new groups various communication links (e.g. the establishment of one or more super-fat pipes, or one or more super-thin pipes).

2.3 Pipe Duplication

In some embodiments, information may be sent in duplicate over two or more different pipes. The pipes may be chosen such that the pipes are not adjacent in frequencies, or further, may be in different frequency ranges.

A potential advantage of such an implementation is a reduced chance of signal interference, signal degradation and/or signal loss as the signal is sent in different frequency bands.

The devices may further be configured to communicate using pipes associated with two or more base stations.

2.4 Pipes for Downlink and Uplink

In some embodiments, symmetrical or asymmetrical pipes may be utilized for downlink or uplink. Where symmetrical pipes are utilized, a thin pipe may be provided for use for downlink data and another thin pipe may be utilized for uplink data. Where asymmetrical pipes are utilized, a thin pipe may be provided for use for downlink data and a fat pipe may be provided for use with uplink data. Suitable arrangements may be selected based upon the communications needs the system is supporting. For example, if a terminal is providing a batch of information on a fat pipe, the terminal may also be receiving near real-time instructions on a thin pipe.

2.5 Transmission Techniques to Improve Reliability

In some embodiments, the system may be configured to provide communications using various techniques that potentially improve the successful transmission or receipt of communications. The system may be configured, for example, to transmit data more than once, resending data over different communication links, resending data over different non-adjacent communication links, and/or using a scheme to acknowledge successful receipt of data, etc.

The system may be operated in a manner similar to connection-oriented protocols, where particular arrangements may be utilized in an attempt to establish the guaranteed arrival of data in a particular order. In these arrangements, various techniques may be utilized, such as handshaking, flow control, acknowledgements, etc. For example, data may be provided in an arrangement similar to data provided under the transmission control protocol (TCP).

The system may be operated in a manner similar to connectionless protocols, where data is provided independent of other data (e.g. similar to the user datagram protocol [UDP]).

The data provided by the system may contain various elements of information, arranged as one or more data packets. The data provided by the system may, in some embodiments, contain additional information, such as header information, that may be utilized to provide additional information for tracking, routing, checksum, order, error checking, etc.

Where devices are configured to be able to communicate with two or more base stations, the devices may further be configured to communicate to two or more different base stations.

3.0 Description of Some Sample Embodiments

The following sections under heading 3 provide an illustrative, non-limiting description of some embodiments, in particular, description of specific methodologies and technologies that may be used in implementing these embodiments. There may be other embodiments and other variations, and various steps may be added, modified or omitted.

The choice of base technology to implement the system can be based on using an available programmable baseband modulator/demodulator: For example, the baseband device may be an Octasic™ device or any other suitable device.

The operating parameters can vary.

In some embodiments, the operating parameters, such as, centre frequency, maximum bandwidth, occupied bandwidth, orthogonal frequency division multiplexing fast Fourier transform length, active subcarriers, subcarrier spacing, maximum fat pipe bursts, and/or multi-frame period may be interrelated and can be chosen based on an existing set of standards or specifications. It is to be appreciated that variations of operating parameters are possible.

For example, a multi-frame period can be chosen to trade off number of terminal units with connection latency.

A number of subcarriers may be chosen, for example, a choice of 600 subcarriers, each of 15 kHz bandwidth, may be found to provide a fundamental band width of 9 MHz, which may be found to suitably fit into a 10 MHz channel spacing. It should be understood that these constants or values are for illustrative purpose only and not meant to be limiting.

It is to be understood that the technology choices disclosed herein are not meant to be limiting, but rather are for illustrative purposes.

3.1 Band of Operation & Channelization

Sample frequency bands are provided, but it should be understood that a variety of bands may be utilized and may be subject to change depending on various factors, such as signal characteristics, regulation, etc.

The upper sub band of 5470 to 5725 MHz may be utilized, according to some embodiments, as the frequency range may be found to permit a higher transmitter power than a lower frequency sub band, 5150 to 5350 MHz. In some embodiments, the system may also operate in the lower frequency sub band, or any other suitable frequency ranges.

The radio frequency communication links may be selected to be 10 MHz apart and the modulated signal may produce an occupied bandwidth (99%) of power no less than 9 MHz and no more than 10 MHz. The modulated signal may consist of 600×15 kHz subcarriers.

3.2 Adjacent Communication Link Reuse

In one embodiment, it may be preferable that adjacent (e.g. adjacent in frequency) communication links to a main communication link not be used in an area immediately adjacent to the main communication link in use. As indicated above, there may be interference issues that would otherwise arise, among others.

Figure 3:
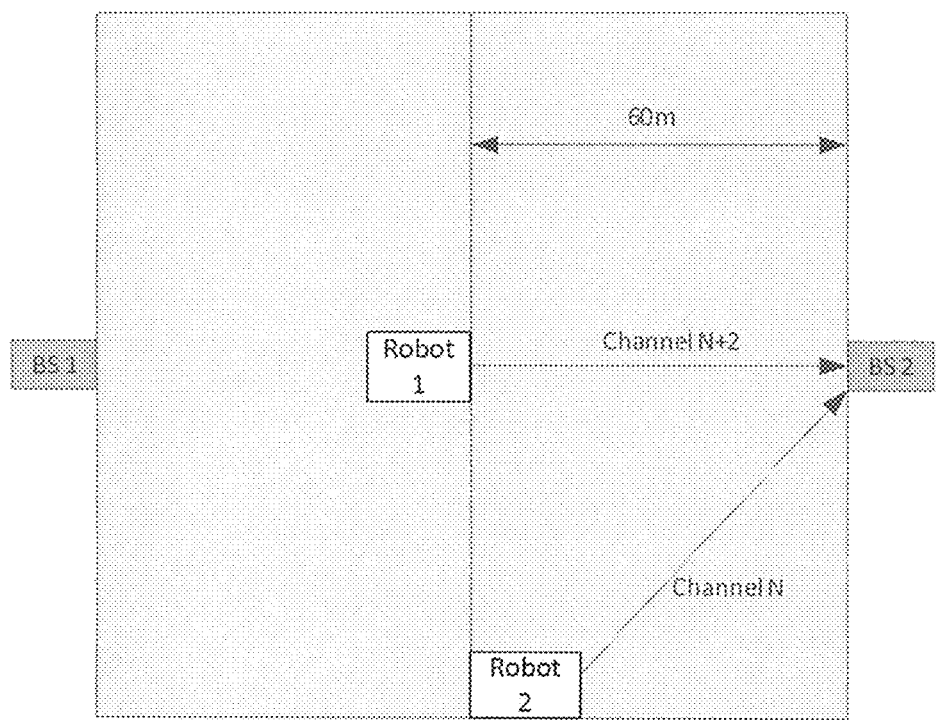
FIG. 3 provides a sample adjacent channel scenario, according to some aspects of the invention.

Referring now to FIG. 3 which demonstrates an adjacent communication link scenario. The example communication link scenario is provided in the context of an implementation where various robots are utilized in a facility to perform various tasks. These robots act as one or more terminals that receive/transmit information to one or more base stations using some embodiments.

It may be assumed that robot1 (connected to base station1) is also in line of sight of base station2 with no fading; it is transmitting maximum power to its own base station1.

The signal arriving at base station2 for a fat pipe may be selected to have S1=−54 dBm. Assume further that the robot2 signal is arriving at base station2 just above sensitivity of −88 dBm. The noise floor in base station2 is about −96.5 dBm and any residual signal from robot1 should be of the order 10 dB below the base station2 noise floor.

In this scenario, the base station2 receiver may need to reject the communication link N+2 by at least −54−(−106.5)= 52.5 dB, which may be possible by applying a combination of analog and digital filtering.

The issue above may potentially be alleviated by configuring the system to choose to place either base station1 or base station 2 in the middle of the environment, rather than at the edge, but this may not always be physically possible.

3.3 Logical and Physical Communication Links

Figure 4:
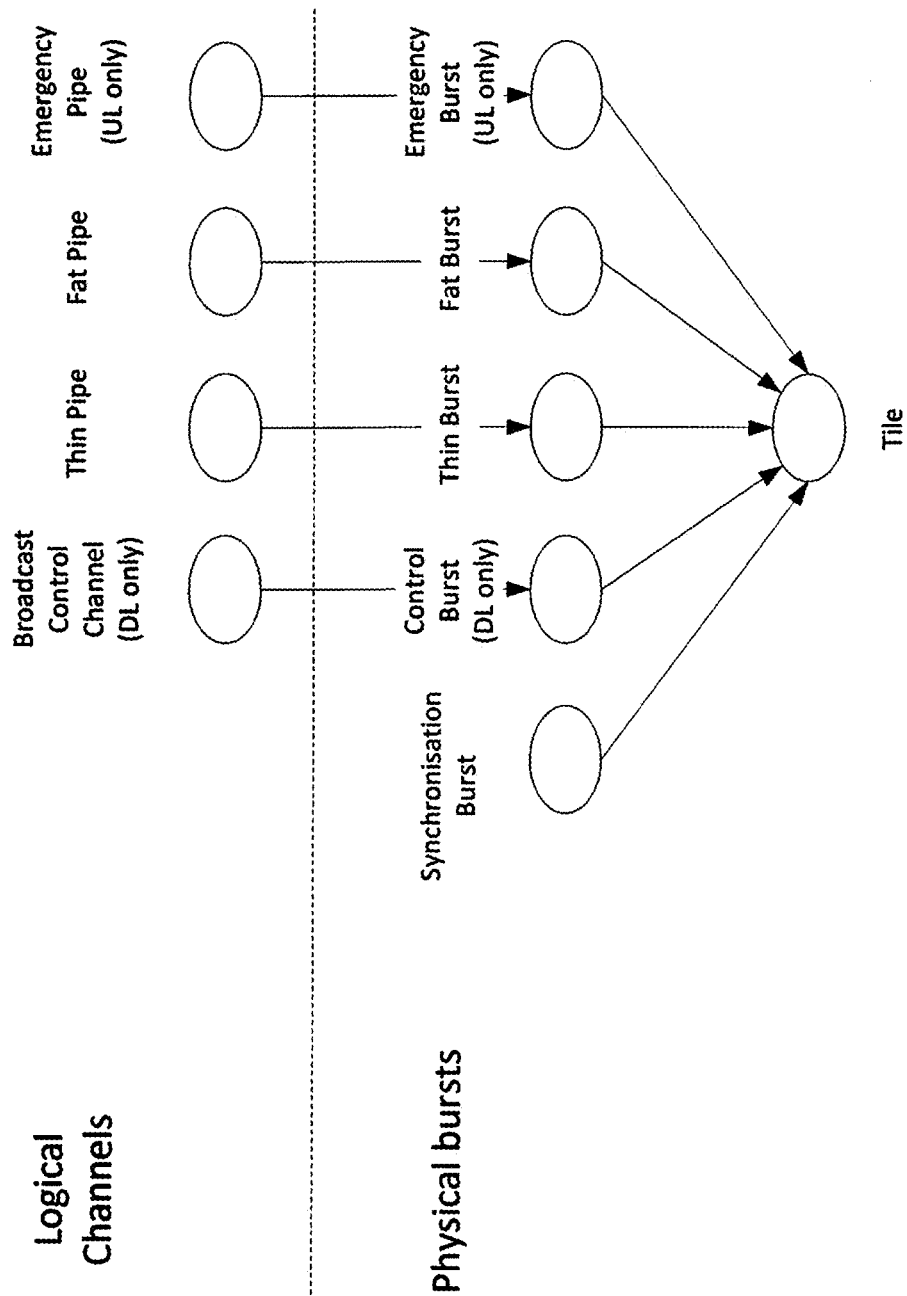
FIG. 4 illustrates a sample logical burst and physical channel relationship diagram, according to some aspects of the invention.

FIG. 4 illustrates an exemplary logical burst and physical channel relationship, according to some embodiments. Similar to that described above, the example scenario illustrated in the figure is provided in the context of an implementation where various robots are utilized in a facility to perform various tasks. These robots act as one or more terminals that receive/transmit information to one or more base stations using some embodiments.

The uplink direction can be defined as the direction from robot to base station and the downlink direction can be defined as the direction from base station to robot.

An emergency communication link can be used to provide an uplink alarm for conditions where there may be emergency situations, such as the robot sensing a potential physical signal path disruption. The emergency communication link may be a fallback communication link for robots to use in these situations.

In some embodiments, the emergency communication link can include higher communication resiliency.

The broadcast communication link can be used to send downlink base station identity data to all the robots (all robots receive the broadcast communication link all the time).

The thin pipe can be used to send downlink commands to the robot and send uplink position and status data.

The fat pipe can be used to send large amounts of data for any suitable purpose in either direction. An example use of the fat pipe may be a video signal from an inspection device.

3.4 Operating Parameters

The following section provides non-limiting, sample descriptions of some embodiments. In particular, the implementation of thin pipes and fat pipes is discussed, and specific implementation choices are described. It should be understood that choices for implementation may vary; specific steps may be in various orders, added, omitted and/or modified.

In one embodiment, there may be two types of data connections, a thin pipe (narrow band) and a fat pipe (wide band).

In one embodiment, a symmetrical thin pipe and symmetrical fat pipe may be implemented. In another embodiment, the fat pipe may be asymmetric to accommodate the need to stream downlink data whilst listening on the uplink for the presence of radar.

3.4.1 Thin Pipe

Referring now to FIG. 5a, FIG. 7, FIG. 8 and FIGS. 9a and 9b, a thin pipe connection can be based on a 100 ms super frame (also referred to as a multi-frame) made up of five 20 ms frames. This 20 ms frame can be split into a 10 ms downlink or receive sub frame and a 10 ms uplink or transmit sub frame.

The 10 ms sub frame can be split into twenty 0.5 ms time slots and the 0.5 ms time slot can be further split into 7 quadrature phase shift key (QPSK) constellations or symbols of which 5 are used to carry data and 2 are used as pilot symbols.

As indicated earlier in the specification, in some embodiments, the base stations may be operated in a master slave configuration.

An occupied bandwidth (e.g. 9 MHz) can be split into 40 frequency blocks of 225 kHz bandwidth each. Each frequency block may consist of 15×15 kHz sub carriers. Each slave narrow band connection can use 2 frequency blocks over a 0.5 ms time slot. Across the 9 MHz occupied band width and in a 0.5 ms timeslot 20 slaves can operate simultaneously.

There can be 20 timeslots in a 10 ms frame, including one timeslot used for downlink broadcast, leaving 19 timeslots for uplink and 19 for downlink connections in a frame. This means there can be 380 possible connections per frame and there are 5 frames in a 100 ms super frame so a single 10 MHz channel can support 1900 thin pipe communication links. The raw data rate in a thin pipe can be thus 2 (QPSK)×5×15 (subcarriers)×2 (blocks)×10 (super frames)= 3000 bits/s.

Thin pipe data bursts are further described elsewhere in this disclosure.

In addition to the thin pipe connection, the base station may transmit a broadcast communication link on the first 0.5 ms time slot to all robots. The thin pipe can be a symmetrical connection in terms of the bandwidth.

3.4.2. Fat Pipe

Figure 5A:
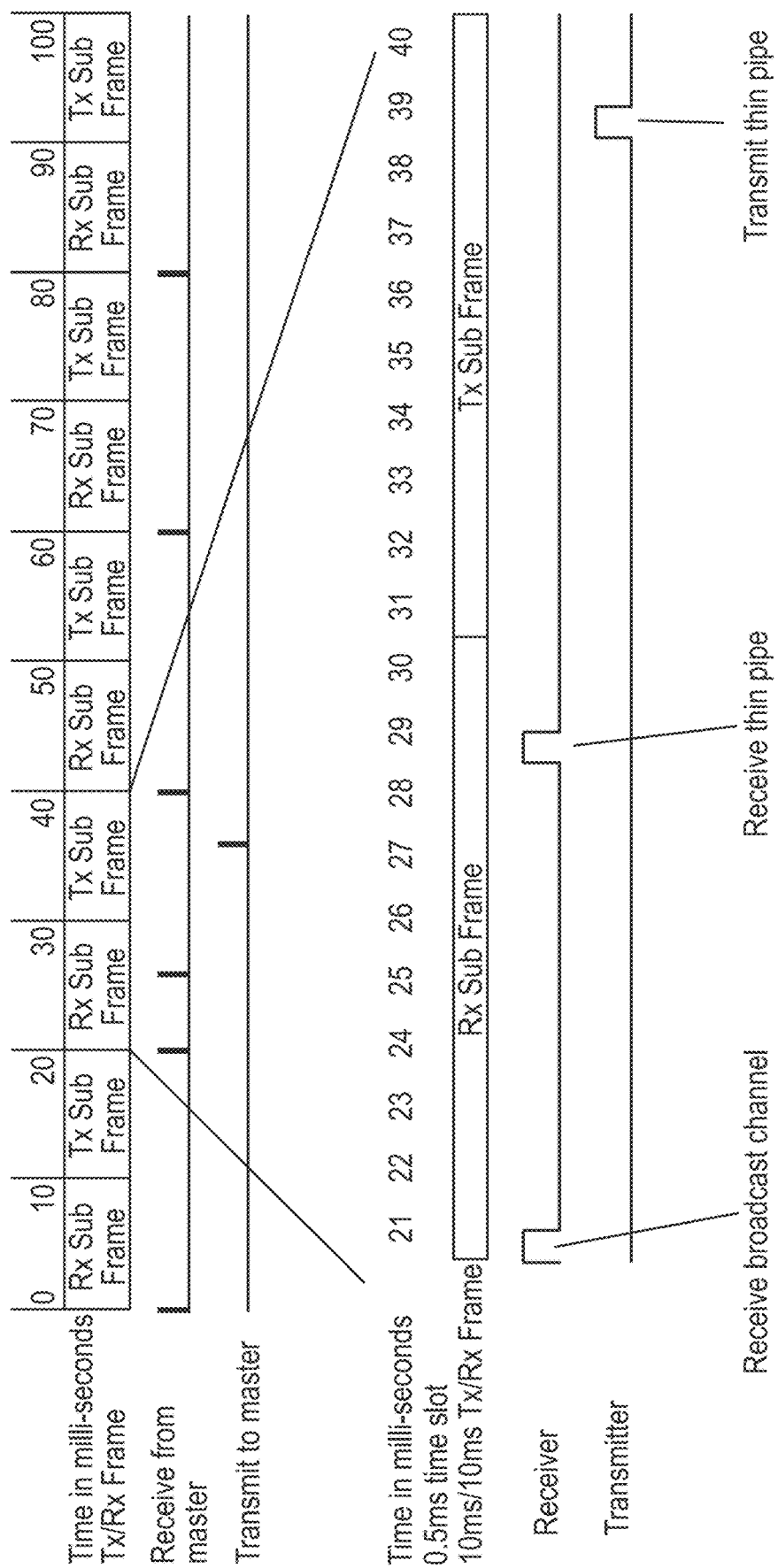
FIG. 5a illustrates a sample thin pipe, according to some aspects of the invention.
Figure 5B:
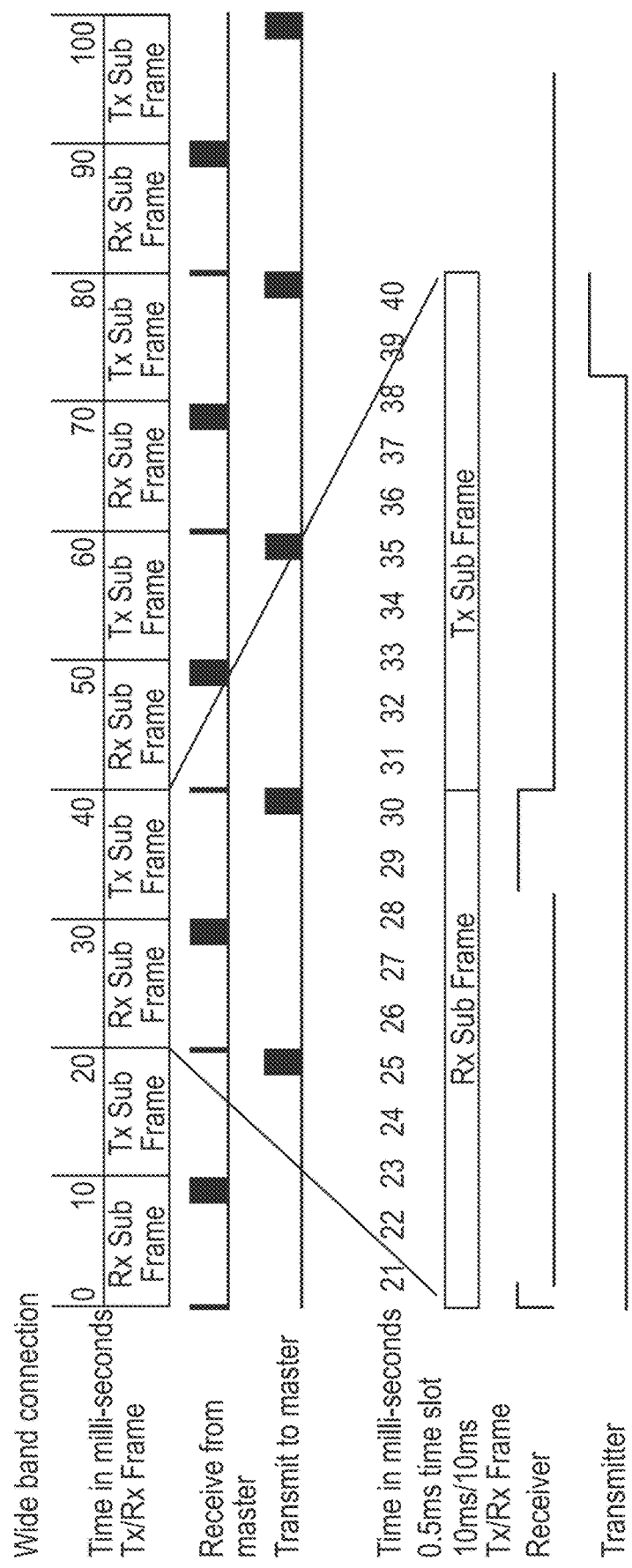
FIG. 5b illustrates a sample fat pipe, according to some aspects of the invention.

Referring now to FIG. 5b, a fat pipe connection may be based also on the 100 ms super frame but for this case 4 slots of 0.5 ms and across all 40 frequency blocks and on all five sub frames (equivalent to 4×20×5=400 thin pipes) are assigned to a single robot. This may allow for a scenario of 4 fat pipes (16 time slots×40 frequencies). After using 1 time slot for the broadcast, about 300 thin pipes (3 timeslots×20 frequencies×5 frames) can operate simultaneously with the four fat pipes. The raw data rate on a fat pipe may be equivalent to 400 thin pipes of 3 kbits/s or 1.2 Mbits/s.

It is to be appreciated that the number of thin pipe connections in a fat pipe connection may vary.

In one embodiment, a number of time slots for a fat pipe may be based on the ratio of the number and/or bandwidth of thin pipe to fat pipe. The ratio may be adjusted on demand by the one or more base stations and/or one or more base station controllers. The one or more base stations may be managed centrally by one or more base station controllers.

In another embodiment, in the context of a new logistic warehouse, for a small number of robots and during a commissioning or initial phase, the fat pipe may be used to pull data from the robots/push data to the robots for configuration purposes. As the robots move into production, this requirement may no longer apply and so the ratio of thin pipes to fat pipes may be adjusted to reduce the number of fat pipes and, in turn, to increase the capacity on the thin pipe.

Fat pipe data bursts are further described elsewhere in this disclosure.

3.4.3 Configurable Ratio of Paths Between Thin Pipe and Fat Pipe

Figure 9B:
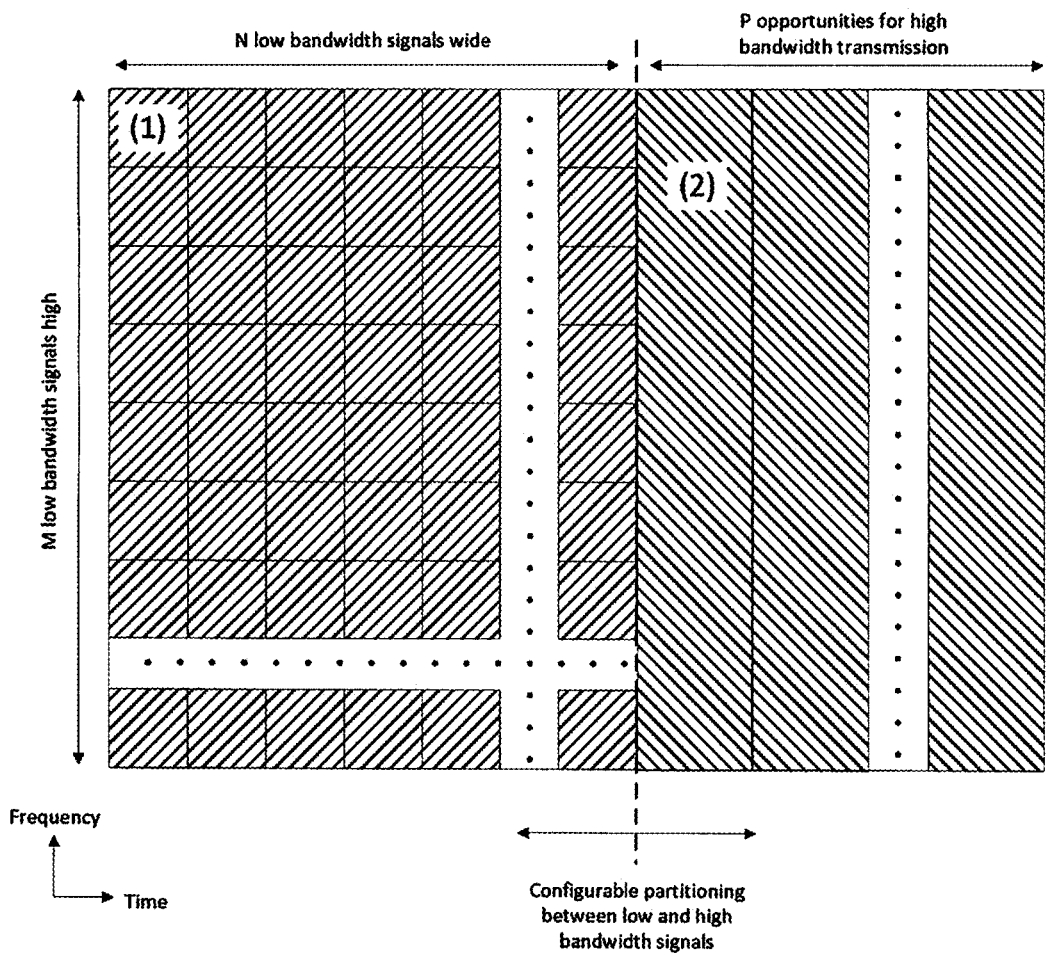
FIG. 9b shows a sample subframe structure showing thin pipe(s) and fat pipe(s), according to some aspects of the invention.

Referring now to FIGS. 9a and 9b, illustrating some embodiments, there may be a configurable or adjustable ratio between the number of lower bandwidth communication links and the number of higher bandwidth communication links. The base station can be configured (or directed for example by a network manager) to assign and re-assign the frequency and/or time frame of thin pipes and fat pipes in one or more sub-frames in real-time or near real-time.

In other words, the number of tiles assigned to thin pipes Nt and fat pipes Nf may be adjusted accordingly based on the needs of the communication system and other related factors.

3.5 Receiver Signal Diversity

The system may be configured to employ spatial diversity on either/both uplink and downlink with the antennas of any device being placed a distance apart to help address structural parameters of the implementation environment, such as, to permit the signals to operate around construction pillars that may be present in certain implementation environments. The distance between antennas may vary.

In some embodiments, a distance of approximately 50 cm may be found to be potentially advantageous to mitigate various environmental effects, such as vertical steel structural pillars.

3.6 Frequency Diversity & Hopping

The system may be configured to employ frequency diversity on the downlink and/or the uplink.

The thin pipe uplink and downlink transmission can use a plurality of tiles carrying the same data on different frequencies in the 10 MHz communication link.

In some embodiments, two tiles occupying different frequencies can be used for each data packet in an uplink or downlink transmission. In another embodiment, four tiles occupying different frequencies can be used for each data packet in an uplink or downlink transmission.

The tile frequencies can hop from frame to frame on a hopping sequence as described herein. The hopping can occur for example inside the 10 MHz communication link occurs as part of the baseband digital signal presented to the analog part of the radio.

If two tiles are used for each data transmission in an uplink or downlink, the two tiles frequencies can be symmetrical or asymmetrical, and centered around the 0 Hz (baseband) point. The middle subcarrier may or may not be used.

The frequency hopping as applied to a single robot/terminal may indicate that the frequency can change every 100 ms, therefore with 20 frequencies across which to hop, the complete sequence can be covered in 2 seconds by cycling through the frequencies available the effects of multipath fading may be countered. It may be useful to counter any deep, permanent nulls in a particular location.

It will be appreciated that frequency pairs symmetric about a centre frequency may be allocated to the same terminal unit so that any energy leakage from +f into −f and vice versa occurs at the location of the terminal unit such that less unwanted interference occurs compared to allocating +f and −f to different terminal units.

Furthermore, the terminal units may be at different distances from the same base station, with the result that a leaked signal into −f from a terminal unit close to the base station may interfere strongly with the actual −f signal from a terminal unit far from the base station (similarly for leakage into f).

3.6 System Latency

The system may encounter latency as communication signals are transmitted/received from one device to another. These latency issues may arise for various reasons, and some of these are described below. The system, in some embodiments, may be configured to take into account these latency issues. Some latency issues may be predictable, other latency issues may occur as a result of various environmental changes or factors.

In some embodiments, latency may be reduced by using a smaller multi-frame (e.g. 4×20 ms frames for 80 ms). In such an implementation, there may be less thin pipe and lower bandwidth fat pipe available.

For example, the round trip data latency can be less than 200 ms. The contributions to latency may for example result from:

Over Ethernet from a main control system to base stations

Processing in the base stations

Base station to terminal

Terminal to base station, including processing received signal and creating the transmit signal in the terminal (the processing in the terminal may occur in the 10 ms between receiving a thin pipe in the receive subframe and transmitting a thin pipe on the adjacent transmit subframe).

Over Ethernet from the base station to the main control system.

In one aspect the frame structure used may be configured such that a downlink command that just misses its downlink time slot will be transmitted 100 ms later and its uplink response will then be in the uplink transmit sub frame 10 ms later.

The estimated delays are shown in the table below. The table is a sample table provided according to some embodiments, where terminals are represented by robots and the system may interoperate with a robot control system and base stations.

TABLE 1

Sample Estimated Signal Round
Trip Delay from Control System and Back

| Source of Delay | Estimated Magnitude |
|---|---|
| Control System to Base Station | <5 ms |
| Base Station Processing | <5 ms |
| Base Station to Robot/Terminal | <100 ms |
| Robot/Terminal to Base Station | 10 ms |
| Base Station to Control System | <5 ms |
| Total | <125 ms |

3.7 System Integrity

In some embodiments, an integrity test of the round trip communication link may be provided, either at some point when the system is operational or at the induction stage.

An induction bay may be an area where a terminal is inducted/provisioned for use, or items are brought into a facility.

This can be separate from any other type of testing such as a manufacture or development test.

When a terminal is in an induction bay for example, a check can be performed to check that its communication link is operational with the system. If the position of the induction bay is known relative to the base station, the approximate received signal strength indicator (RSSI) value for both uplink and down link connections may be known. This combined with a bit error rate (BER) threshold test, to check the condition of the physical/media access control layers, individually or in combination with a message test may be used to provide this integrity check.

Whilst the terminal is mobile, a similar test to the above could be made. An additional requirement can be that there is an RSSI map of the environment against which signal strength can be checked. This can be made available from an environmental survey.

3.8 Contention-Free Communication Links

In some embodiments, the system can be configured to provide at least one contention-free lower bandwidth communication link and at least one separate contention-free higher bandwidth communication link. The system may be configured to avoid contention through open outcry transmissions and hence maximize the usable radio spectrum.

In these embodiments, the system may reduce conflicts as a result of the thin pipe normal modes and duplication modes.

In some embodiments, contention may be used in part, for example, for emergency communications.

Below is a table of exemplary air interface constants. The values provided are for illustrative purpose only and are not meant to be limiting.

| Constant | Value(s) | Units | Description |
|---|---|---|---|
| $F_c$ | Varies | Hz | Carrier frequency |
| $N_{dtt}$ | 20 | — | Number of downlink tiles in time |
| $N_{utt}$ | 20 | — | Number of uplink tiles in time |
| $N_{tf}$ | 40 | — | Number of uplink tiles in frequency |
| $N_{fpm}$ | 5 | — | Number of frames per multiframe |
| $T_{mp}$ | 100 | ms | Multiframe period |
| $T_{fp}$ | 20 | ms | Frame period |
| $T_{fgp}$ | 10.41 | us | Frame guard period |

3.9 Exemplary System Parameters

This section summarizes exemplary key parameters of the air interface in a number of tables:
- Spectrum usage: How the band is used
- Framing: How the uplink and downlink are duplexed and timed
- Encoding: How the data is mapped on the spectrum and framing

3.9.1 Exemplary Spectrum Usage

TABLE 2

Parameters relating to Spectrum usage

| Parameter | Value |
|---|---|
| Wireless standard | Custom OFDM/Orthogonal Frequency-Division Multiple Access (OFDMA) |
| Downlink modulation scheme | OFDM |
| Uplink modulation scheme | OFDMA |
| Frequency band | 5470 MHz to 5725 MHz |
| Centre frequencies | (5477.5 + N × 10) MHz where N = 0, 24. |
| Maximum bandwidth | 10 MHz (system may run in a subset of this) |
| Occupied bandwidth | Approx. 9 MHz of 10 MHz channel |
| OFDM FFT Length | 1024 |
| Active subcarriers | 600 (excluding a gap around DC) |
| Subcarrier spacing | 15 kHz |
| Modulation (on subcarriers) | QPSK |
| Cyclic Prefix Length | 72 samples |
| OFDM symbol rate | 14,000/second |
| Spectral mask | See specification EN301893 v.1.7.1, clause 4.5.2 & FCC Part 15 |
| Duplexing | Time division Duplex (TDD) |

3.9.2 Framing

TABLE 3

Parameters relating to Framing

| Parameter | Value |
|---|---|
| DL:UL subframe ratio | 1:1 (fixed); this value may vary |
| Frame period | 20 ms (complete Time Division Duplex frame) |
| Minimum frames per multiframe | 1 |
| Maximum frames per multiframe | 5 |
| Frame guard period | Approx. 10 us |
| Subframe guard period | Approx. 10 us |
| Base station to base station synchronisation | Better than 1 us |

3.9.3 Encoding

TABLE 4

Parameters relating to Encoding

| Parameter | Value |
|---|---|
| Forward error correction | Convolutional (Viterbi decode) |
| Coding rates | 1/2, 1/3 |
| Thin pipe frequency hopping | Intra-frame |
| Maximum fat pipe bursts | 4 per subframe |

3.9.4 Time Division Duplex (TDD) Frame Structure

The following describes a sample time-division duplex frame structure, according to some embodiments.

Each base station handles a single 10 MHz frequency channel split over time into multiframes (each Tsp) each split into Nfps frames (each Tfp), each split into two subframes (downlink and uplink), each split into tiles (composed of pilot symbols and data symbols) on to which physical bursts are mapped, which carry logical communication links.

OFDM Symbols Each OFDM symbol may consist of 1024 time domain samples (where 1024 is the length of the fast Fourier transform (FFT) used) prefixed with a Cyclic Prefix (CP) of 72 samples to reduce inter-symbol interference from multipath effects.

Figure 6:
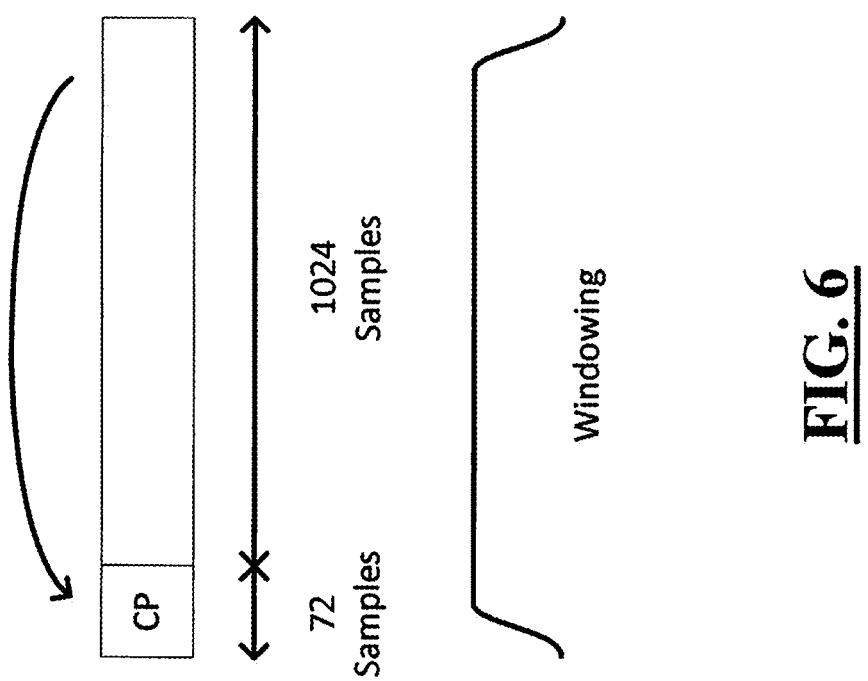
FIG. 6 illustrates a sample orthogonal frequency-division multiplexing (OFDM) symbol, according to some aspects of the invention.

The OFDM symbol is shown in FIG. 6, together with the windowing that may be applied to reduce adjacent channel power (ACP), according to some embodiments.

Various functions may be used as window functions, according to various embodiments. For example, a raised cosine window function may be used at the start and finish of the burst.

Each OFDM symbol in the time domain may be mapped onto a set of subcarriers in the frequency domain by passing the symbol through a inverse fast Fourier transform (iFFT).

Tile Format

Figure 7:
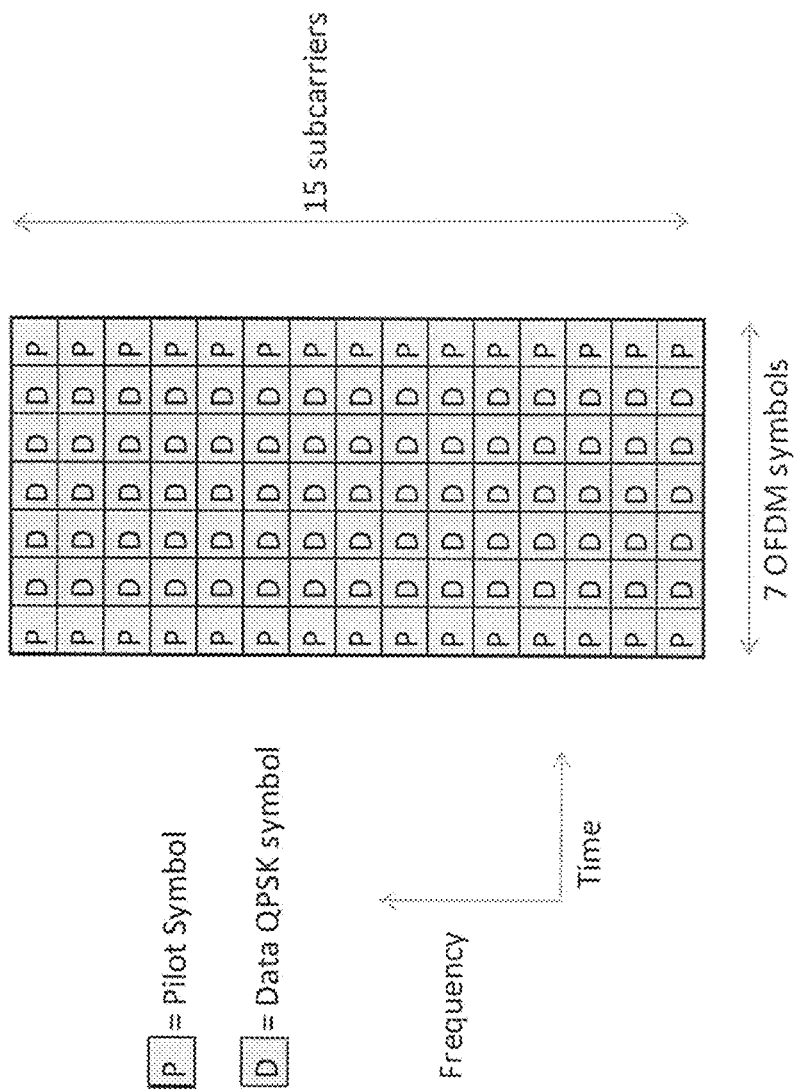
FIG. 7 illustrates a sample tile format, according to some aspects of the invention.

In one aspect, referring now to FIG. 7, a sample tile format is shown that can be used as part of a frame structure or managing data communications across one or more networks.

In one aspect, each of the occupied subcarriers in the output of the iFFT contains either a pilot symbol or a data symbol, according to some embodiments. These symbols may be grouped over time and frequency into a structure called a tile. The tile may be the smallest unit of a subframe which can be occupied or not occupied.

The tile may be a useful unit of communication because the digital signal processing, encoding, and decoding (forward error correction, scrambling, estimation, equalization, etc.) can be optimized to work for the tile size. A burst may span several tiles.

Tiles may be specified as follows:
Each tile contains a mixture of raw data bits and pilots.
Each tile spans 7 OFDM symbols in time ('7 symbols wide')
Each tile spans 15 subcarriers in frequency ('15 subcarriers high')
Pilots are provided in every subcarrier to ease channel estimation in the receiver. Pilots occupy the first and last OFDM symbols of the tile.
Pilots may be utilized to see the distortion in amplitude and phase and use this distortion to see what happened. The model of the medium may be used to decode unknown symbols using a defined sequence of operations.
Pilots may be predefined sequences; there may be more than one possibility for a pilot sequence.
The set of tiles spanning all occupied subcarriers over 7 OFDM symbols are referred to as a slot.

Multiframes

A single TDD frame 310*a*, 310*b* period of the system can be set to Tfp=20 ms, which is typical of TDD systems and trades parameters such as speed of acquisition (e.g. frequency clock correction), overhead in framing and so on. However, it is to be appreciated that the frame period may also be set to some other value (e.g. 30 ms or 50 ms), with or without other technical limitations.

If each terminal only requires a thin burst signal transmission and signal receipt every 100 ms and it is desirable to maximize the supported terminals per base station, Nfps frames can be grouped into a multiframe (also referred to as super frame) of period Tsp=100 ms. Once per multiframe a terminal can receive one thin burst and transmit one thin burst.

Figure 8:
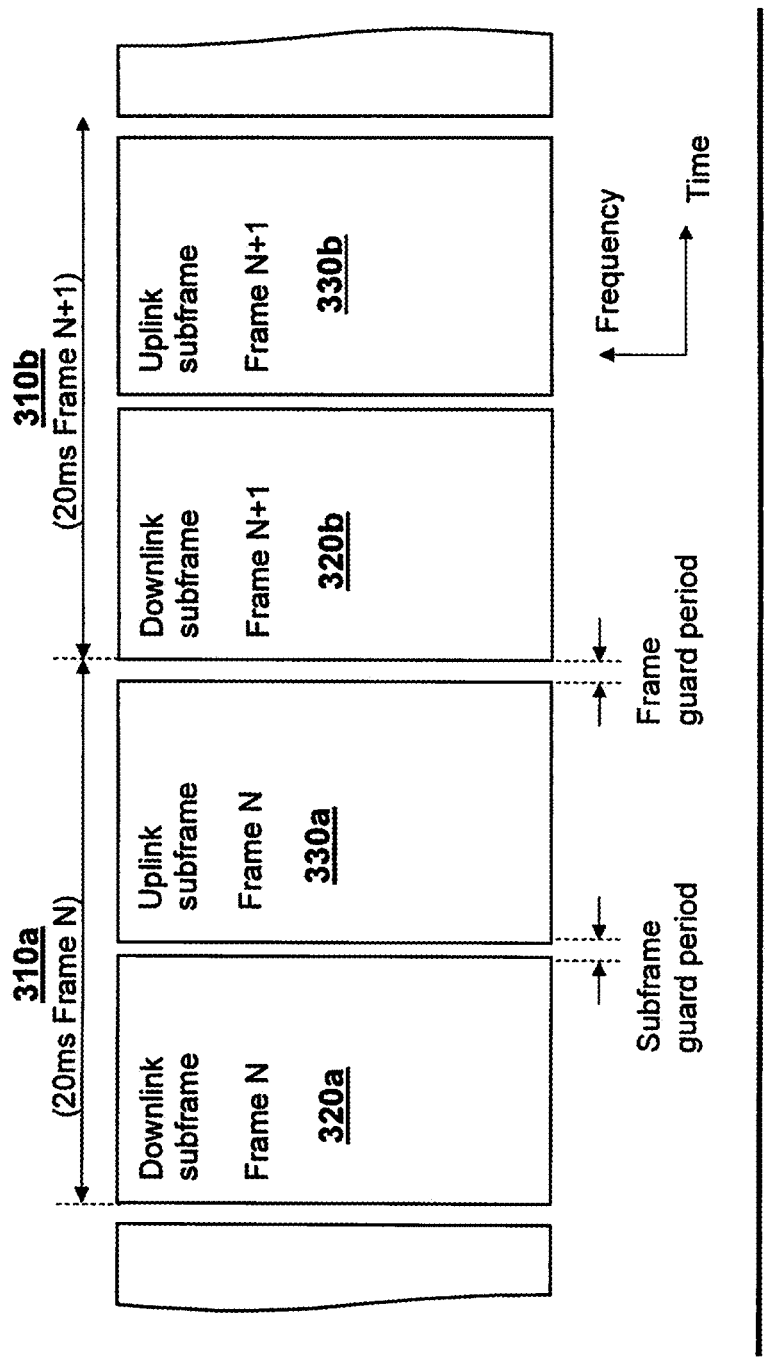
FIG. 8 illustrates a sample time division duplexing (TDD) frame structure, according to some aspects of the invention.

TDD multiplexing of downlink and uplink Downlink sub-frames 320*a*, 320*b* and uplink sub-frames 330*a*, 330*b* can be duplexed into a TDD frame 310*a*, 310*b* structure as shown in the FIG. 8.

The ratio between downlink 320*a*, 320*b* and uplink subframes 330*a*, 330*b* periods can be fixed at 1:1, for example, or may vary.

In another embodiment, the ratio between downlink and uplink subframes lengths can be fixed at a ratio other than 1:1.

Optional guard periods between the subframes and frames can allow settling time for the radio switching from transmit to receive and vice versa.

Subframe Structure

Referring now to FIGS. 9*a* and 9*b*, each subframe can be 20 tiles 'wide' in time, and can be 40 tiles 'high' in frequency. The DC subcarrier is unused, with an equal and integer number of tiles sitting above and below the DC subcarrier in frequency.

Downlink and uplink subframe formats are very similar, with the exception being a synchronization signal at the start of only the downlink subframe. Otherwise, the entire subframe is broken down into tiles. Tiles are grouped into bursts which can be one of several different types depending on the type of data contained in them. Bursts are described in more detail below. The exact layout of the subframe can be configured by changing the number of 'thin' and 'fat' bursts. FIG. 9*a* shows the structure of a frame when the uplink and downlink subframes have each been configured to support two 'fat' pipes, and Normal Mode Thin Pipes are in use. FIG. 9*b* shows a sample subframe structure showing thin pipe(s) and fat pipe(s) according to some aspects.

Table 5 below demonstrates types of data bursts and respective location in frame according to one embodiment.

TABLE 5

Burst Type Summary

| Burst used for | Location in frame | Further comments |
| --- | --- | --- |
| Synchronisation | Central 8 tiles in first slot of downlink subframe | Used by the terminals to synchronise to the base station signal |
| Broadcast | Remaining tiles of first slot of downlink subframe | Contains broadcast information for all terminals. Robustly encoded to be less susceptible to interference. |
| Thin pipe | Either:<br>[Normal mode] A pair of tiles in both downlink and uplink subframes. Slot is fixed for a thin pipe (second slot onwards), frequency hops each multiframe<br>or<br>[Duplicate mode] Two pairs of tiles on both downlink and uplink subframes, with one pair duplicating the tiles used in Normal mode, in some embodiments, the tiles may be in different timeslots | Each thin pipe contains data to or from one specific terminals. |

TABLE 5-continued

Burst Type Summary

| Burst used for | Location in frame | Further comments |
|---|---|---|
| Fat pipe | Typically 4 full slots at the end of subframe, but the location may vary depending on the embodiment. | Fat pipes provide a higher data throughput than thin pipes and are allocated to individual terminals dynamically as required. |
| Emergency uplink | Groups of tiles in the first slot of the uplink subframe | Provides a contention based mechanism for a terminal to communicate with the base station when it fails to communicate via a Thin Pipe. Robustly encoded like the Broadcast burst to reduce susceptibility to interference. |

Communication Link Mapping

The physical layer can provide a number of logical communication link types to higher layers.

As previous described, FIG. 4 shows how the logical communication links can be mapped to burst types, each of which encode the data as a set of tiles, according to some embodiments.

All of the data-baring communication links can be encoded and mapped to bursts in the following steps per FIG. 10, according to some embodiments.

Cyclic Redundancy Check (CRC)

At step 510, a CRC can be used to detect errors for various communication link types. The length of the CRC may be, for example, 24-bits. The CRC may be appended to the communication link data.

Other error checking codes or techniques may also be applied, according to various embodiments.

Forward Error Correction (FEC)

At step 520, a Forward Error Correction (FEC) code may be used to correct errors in received data.

In some embodiments, the system is configured to apply a FEC with a convolutional code of rate 1/2, with a constraint length of 9. The generator functions used are:

$G_0$=561 (octal)
$G_1$=753 (octal)

For each input bit, the output of G0 then G1 is output from the encoder.

"Tail-biting" is used, so the encoder should be initialized with the last 8 bits of the input data.

In some embodiments, a 1/3 rate convolutional code can be used on control and emergency bursts.

The generator function may then be $G_0$=557 (octal), $G_1$=663 (octal), $G_2$=711 (octal)

Spreading Blocks Over Time

In some embodiments, the system may be configured such that blocks may be spread over time to add redundancy and/or to improve the chance of recovering information over time.

For example, an interleaver may be used. At step 530, a block interleaver can be used to spread the encoded bits throughout the burst, gaining frequency and time diversity. Frequency diversity, time diversity, and/or spatial diversity may be used address the system requirements. In further example, the interleaver may interleave in steps of 67 bits.

System Monitoring

The system may be configured to further monitor/detect attempts to interfere with the system, for example, attempts to intercept signals, to provide false signals, signal jamming, denial of service attacks, etc.

Scrambler

At step 540, after interleaving, the system may be configured to scramble data to "whiten" the data, which may reduce the peak to average power of the output signal in the event that similar data may be transmitted throughout the subframe.

For example, the scrambling sequence may be obtained from a length-31 pseudo random bit sequence (PRBS).

The scrambler can be reinitialized at the start of the data for each communication link using a combination of the following parameters:

A seed value of 0×3715
Base station ID (BSID)
Pipe ID
Slot number

The BSID can be set to zero for a Control burst, as until this has been decoded, the terminal may not know the BSID.

The Slot number used for a fat burst can be the lowest number slot occupied by the burst.

PBRS polynomials may be, in some embodiments, $G(x)=x^{15}+x^{14}+1$.

Burst Mapping

At step 550, the mapping of the burst data to tiles is specific to each communication link type, so is described with each communication link elsewhere in this disclosure.

Constellation Mapping

At step 560, bits can be mapped to Quadrature Phase Shift Keying (QPSK) symbols as shown in FIG. 10b.

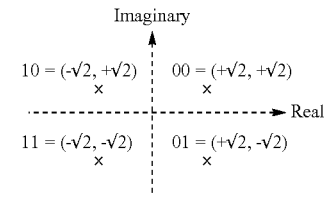

Thin Pipe

Purpose

In some embodiments, the purpose of the thin pipe is to provide a set of communication links with a given set of transmission characteristics.

For example, once per multiframe, each terminal receives and transmits one burst for thin pipe communications. The thin pipe may be configured by the system to provide a potentially guaranteed and/or low latency communications pipe to/from each terminal.

Mapping to Tiles and Frequency Hopping

Tiles higher in frequency than the DC subcarrier can be labelled with frequency indices 1 to 20 (increasing frequency).

Tiles lower in frequency than the DC subcarrier can be labelled with frequency indices −1 to −20 (decreasing frequency).

A thin pipe burst (downlink or uplink) can occupy a pair of tiles with various frequency indices (e.g. +/−X) in a fixed timeslot or slot (time position). This means that the spectrum occupied by a thin pipe can be symmetric about DC (easy demands on the radio for image rejection).

On each successive multiframe, X is drawn from the next position in a looping sequence: 9, 19, 10, 20, 1, 11, 2, 12, 3, 13, 4, 14, 5, 15, 6, 16, 7, 17, 8, 18, 9, 19, 10, 20, 10, 11, 2, 12, . . . .

In one embodiment, a hopping sequence may be derived from a random number generator. There may be many possible hopping sequences. The generation of a hopping sequence may be obtained using any suitable technology.

Thin pipes in the same slot may read with a different offset into the sequence. For example the frequency indices of tiles for two terminals (Terminal A, Terminal B) might be as follows:

Terminal A: . . . {−5,+5}, {−15,+15}, {−6,+6}, {−16,+16} . . . .

Terminal B: . . . {−19,+19}, {−1,+1}, {−11,+11}, {−2,+2} . . . .

Communication Link Encoding

The thin pipe packet from the MAC may be encoded, in some embodiments, as described in the earlier section on encoding. Communication link specific parameters are:

FEC rate—1/2

Duplicate Mode

Figure 11B:
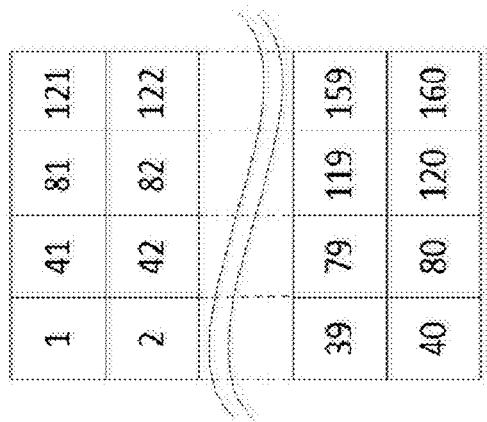
FIG. 11b shows a burst data mapping to tiles according to some aspects of the invention.
Figure 11A:
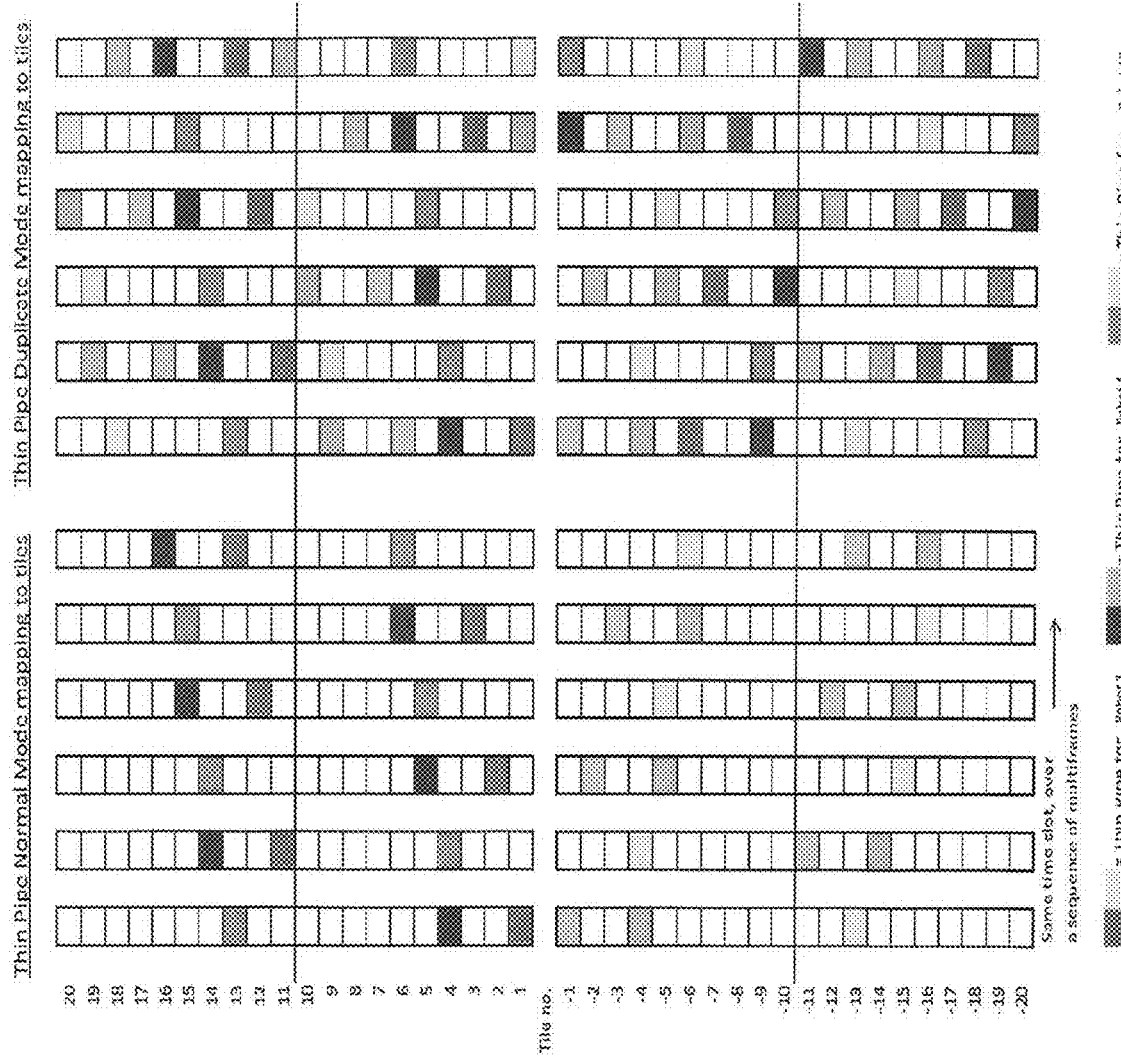
FIG. 11a shows a sample thin pipe and thin pipe duplicate mode example hopping sequence, according to some aspects of the invention.

Referring now to FIG. 11a, a thin pipe duplicate mode can be used, for example by selecting same at terminal configuration, according to some embodiments. Duplicate mode may be contrasted against a normal set of thin pipes, which may be referred to as normal mode.

The configuration may halve the number of terminals supported per base station but may have the potential benefit of reducing packet error rate.

Duplicate mode can be enabled for unusually difficult frequency environments, and may thus be advantageous in such environments.

According to some embodiments, the mode may be used for all or none of the base stations and terminals.

Frequency diversity techniques may be used, for example, to avoid problems with fading, etc.

A potential advantage is enhanced reliability; the combination of frequency hopping, time diversity and spatial diversity techniques may be helpful for resilience against a frequency environment where signal fading is an issue.

In both downlink and uplink subframes, the duplicate mode copies the signal transmitted in the two normal thin pipe tiles into an additional two tiles at different frequencies; effectively, one duplicate mode thin pipe transmission occupies the space two normal mode thin pipe transmissions would use, with additional (i.e., twice) frequency diversity than thin pipe normal mode operation.

A configuration of the system in duplicate mode may provide two potential benefits:

More resilience to fading; the probability of sufficiently deep fades over all 4 occupied tiles defeating the FEC is lower than the probability of deep fades over 2 tiles; and 3 dB improvement in Signal to Noise Ratio (SNR) from (maximum ratio) combining the two copies of the transmission.

The normal mode tile with the higher frequency is copied to a lower frequency and vice versa.

Fat Pipe

Purpose

In some embodiments, the system may be configured to provide fat pipes that can be used to provide one or more high throughput communication links to a limited number of terminals.

The number of fat pipes supported in a subframe may be configurable. Each fat burst can use 4 whole slots, so the maximum number of fat pipes supported in a subframe is 4. The implementation may be conducted at both the terminal and/or base station.

Mapping to Tiles

Burst data may be mapped to tiles in the pattern shown in FIG. 11b, according to some embodiments:

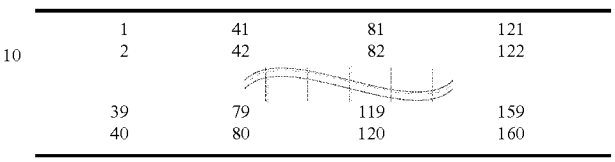

| 1 | 41 | 81 | 121 |
| 2 | 42 | 82 | 122 |
| 39 | 79 | 119 | 159 |
| 40 | 80 | 120 | 160 |

As shown in FIG. 11b, interleaving has already spread data throughout the burst for frequency and time diversity, so the tile mapping may not be required to do this.

As the burst fills all the occupied subcarriers, frequency hopping may not be used, according to in some embodiments.

Broadcast Control Communication Link

Purpose

The broadcast control communication link may contain broadcast data for all terminals, and also may contain messages targeted at an individual terminal (e.g. a response to an emergency pipe message). It can be transmitted on the downlink.

Mapping to Tiles

In some embodiments, the system may be configured such that the broadcast control burst may be located in the first slot of the downlink subframe. The number of tiles required and the mapping algorithm may be 32, and the middle 8, in some embodiments may not be used for broadcast.

Communication Link Encoding

In some embodiments, the system may be configured such that the broadcast control communication link is more robustly encoded that the thin pipe. The encoding may be similar to that of the fat pipe.

The system may be configured to broadcast on every frame, which may imply that there will be 5 times in a particular superframe.

Emergency Pipe

Purpose

The emergency pipe may be a contention based mechanism for a terminal which cannot receive data through thin pipes, for the terminal to attempt to communicate with a base station over a more robust communication link. It can be transmitted on the uplink.

Mapping to Tiles

In some embodiments, the emergency pipe may be located in the first slot of the uplink subframe. There may be one or more emergency pipes supported.

Communication Link Encoding

In some embodiments, the system may be configured such that the emergency pipe, like the broadcast control communication link, is more robustly encoded that the thin pipe. The encoding may be similar to that of the fat pipe.

Downlink Synchronisation Signal

A downlink synchronisation signal may be utilized by the system in some embodiments. The downlink synchronisation signal may serve two purposes:

Provides a known and 'easy to find' signal which allows a terminal to establish the existence of a base station Allows a terminal to synchronise in time and frequency to system framing Physical Layer (PHY) Measurements Various measurements may be taken by devices, such as terminals and base stations. Measurements may include peak noise and unused tiles.

For terminals/base stations, these measurements may include transmission power, frequency offset, mean noise in unused tiles, peak noise in unused tiles, mean noise in unused tiles across a number (such as 4) consecutive tiles.

Per tile, the digital signal processor may be configured to measure:
Power level
Signal to noise ratio (SNR)

4.0 Description of Some Embodiments in a Facility with Robots

The following section provides a non-limiting, illustrative description of some embodiments. In particular, the embodiment may be provided within the context of a warehouse facility with one or more robots which may be considered as one or more terminals. Movements of the robots may be enabled across various paths, some of which may intersect. For example the warehouse facility may include bins arranged for example in a grid-like structure, where robots move within the warehouse facility to perform various tasks. Other non-robot devices may also be terminals for the context of this section. For example, a human could carry around a terminal for communicating.

The warehouse facility may include a relatively large number of terminals, and the communication system enables the various communications required for the various robots to perform these tasks.

A communication system, according to some embodiments may be configured to provide a bandwidth efficient radio control system for robots/terminals that operate on an X, Y grid of a defined size, for example, of approximate 60×120 meters. Each grid can have many hundreds of robots and there can be several grids in a warehouse. The layout, sizing, and configuration of a grid may vary and there are many possible implementations.

For example, according to some embodiments, the system can be configured using a base station, providing point to multipoint communications using Time Division Duplex (TDD) to separate the uplink and downlink and Time Division Multiplex (TDM) and Frequency Division Multiplex (FDM) to subdivide the time frequency space to allow for a number of narrow bandwidth connections between the base stations and the terminals/robots.

The base station transmitter can use additional puncturing in the Tx sub frame for radar detection (e.g. listen for energy, and/or signal detection).

The below descriptions of elements in the facility may indicate robots, but it should be understood that many descriptions apply more broadly to encompass communications between any terminals and other devices.

As an example, a single base station may be configured to operate over a single grid (60×120 m).

An installation or a set of grids may consist of many single grid systems.

There may be roaming between the grids, and the terminals/robots may move about. For example, a terminal may receive a roam request from a first base station requesting the robot to roam to an area covered by a second base station; the robot may optionally come to a halt. Next, the robot may lock frequency, automatic gain control settings and uplink power control settings to the second robot. The second base station may have already received the robot's information from a base station controller, it can then communicate with the robot, and the robot can then function again under the ambit of the second base station's coverage.

In some embodiments, robots may be configured to do various actions, such as temporarily stopping, or releasing a communication link and then re-establishing a new communication link between roaming between base stations.

Uplink power control may be used to deal with the near far problem. The near-far problem is a condition in which a receiver captures a strong signal (from a nearby wireless terminal) and thereby makes it difficult for the receiver to detect a weaker signal (from a far away wireless terminal).

Figure 2:
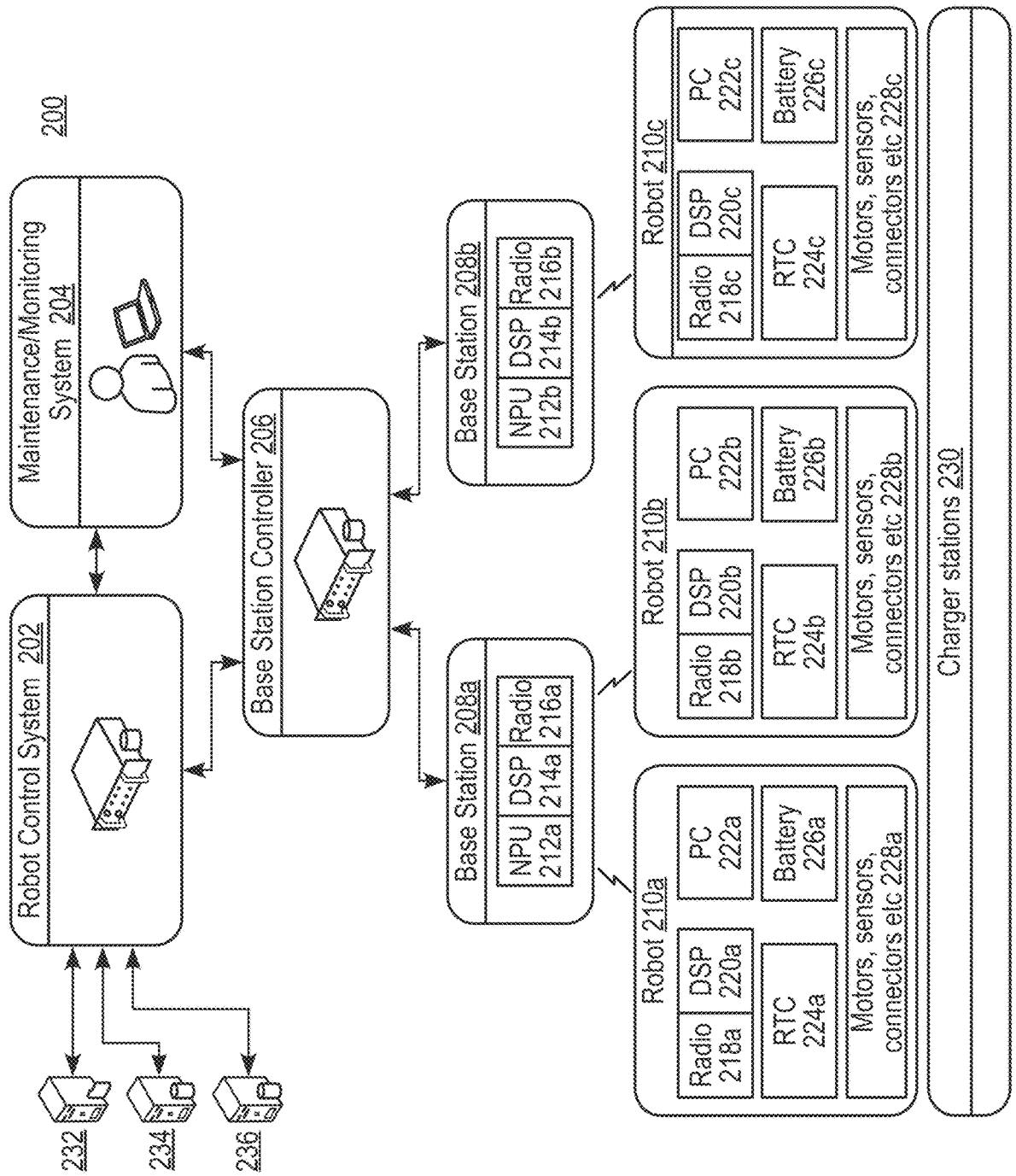
FIG. 2 provides a sample block diagram of a warehouse management system, according to some aspects of the invention.

The system in one possible embodiment is shown in FIG. 2, which illustrates a sample block diagram of a warehouse management system according to some embodiments.

FIG. 2 shows a schematic diagram is provided of sample fully- and semi-automatic goods storage and retrieval systems, according to some embodiments. FIG. 2 is provided at a high level, illustrating an example implementation. Various implementations of the system 200 may involve more or less components and FIG. 2 are provided as examples.

The system 200 can include a robot control system 202; a maintenance/monitoring system 204; a base station controller 206; one or more base stations 208*a* and 208*b*; one or more robots 210*a*, 210*b* and 210*c*, and one or more charger stations 230. While only two base stations 208*a* and 208*b*, and three robots 210*a*, 210*b* and 210*c* are illustrated, it should be understood that that there may be more, or less robots and base stations in other embodiments of the system.

The system 200 may further comprise a broadband Wi-Fi 250, which enables real-time or near real-time wireless communication between Base Stations 208*a* and 208*b* and robots 210*a*, 210*b* and 210*c*.

There may be one or more warehouse management systems (WMS) 232, order management systems 234 and one or more information management systems 236.

The warehouse management systems 232 may contain information such as items required for an order, stock keeping units (SKUs) in the warehouse, expected/predicted orders, items missing on orders, when an order is to be loaded on a transporter, expiry dates on items, what items are in which container, whether items are fragile or big and bulky, etc.

The robot control system 202 may be configured to control the navigation/routing of robots, including, but not limited to, moving from one location to another, collision avoidance, optimization of movement paths, control of activities to be performed, etc. The robot control system 202 may be implemented using one or more servers, each containing one or more processors configured based upon instructions stored upon one or more non-transitory computer-readable storage media. The robot control system 202 may be configured to send control messages, via base stations, to one or more robots, receive one or more updates, via base stations, from one or more robots, and communicate (via base stations) with one or more robots using a real or near-real time protocol. The robot control system 202 may receive information indicating robot location and availability from the base station controller 206.

In some embodiments, the servers may be comprised of high availability servers. In other embodiments, the servers may utilize a 'cloud computing' type platform for distributed computing.

One aspect is a robot control system that includes or links to a wireless communication system that is based on the communication link access method disclosed herein. Various possible aspects of implementation of the robot control system are described by way of example.

A control stop message may be broadcasted to the robots in a particular "control group" or individual terminals; potential benefits from broadcasting messages as opposed to sending individual messages may include improved communications through the use of multiple transmission slots and a potentially higher signal to noise ratio.

In some embodiments, the robot control system 202 may be configured to assign robots dynamically to different "control areas" as they move across the grid.

The maintenance/monitoring system (MMS) 204 may be configured to provide monitoring functions, including receiving alerts from one or more robots or one or more base stations, establishing connections to query robots. The MMS 204 may also provide an interface for the configuration of monitoring functions. The MMS 204 may interact with the Robot Control System 202 to indicate when certain robots should be recalled, or determine when an issue with the system has arisen (e.g. many clearances have been withdrawn, many paths have failed to resolve, or there are a number of idle robots beyond a predetermined number).

The base station controller 206 may store master routing information to map bots, base stations, and grids. In some embodiments, there may be one base station controller 206 per warehouse, but in other embodiments, there may be a plurality of base station controllers. The base station controller 206 may be designed to provide high availability. The base station controller may be configured to manage dynamic frequency selection and frequency allocation of the one or more base stations 208a and 208b.

Dynamic frequency selection, in some embodiments, may be handled by a dedicated radio frequency chain, which may include various elements for processing signals and identifying appropriate frequency ranges to use.

The base stations 208a and 208b may be organized as a pool of base stations, which may then be configured to be active, on standby or to monitor the system. Messages may be routed through a variety of communications means to/from robots, such as through the system 250. In other embodiments, the communications means may be any communications means, in some embodiments, the communications means may be a radio frequency link such as those falling under wireless standard 802.11. The base stations 208a and 208b may further include processing units 212a, 212b, digital signal processors 214a, 214b, and radios 216a, 216b.

A function of a base station can be to provide wireless communication links to the robots/terminals on a particular grid served by a particular robot control system 202. A base station can perform one or more of the following functions (but are not limited to):

support thin pipe communications for robot/terminal control support fat pipe communications for robot/terminal management accept base station configuration data from the base station controller and configure itself according to the instruction accept downlink thin pipe data from the wired network and route it to the correct robot/terminal over the wireless network accept uplink thin pipe data, over the wireless network, and route it to the correct controller over the wired network communicate over the wired network using Ethernet communicate over the wireless network using the system wireless communication a base station radio frequency communication link frequency can be set by the base station controller when the base station is a standalone unit, the base station, can, by default, choose autonomously the frequency of operation cover approximately an area of various sizes, such as 120 m by 60 m, which may assume a diagonal distance of 135 m specific coverage can depend on the angular coverage of the base station antenna can be capable of being configured as a serving base station, a hot standby base station or as a spectrum monitor can be capable of being configured as operational or non-operational have two transceiver antenna ports support diversity reception have a single transmitter chain the base stations in a network can be synchronised in time to within a threshold (e.g. 1 us) of a master clock base stations can transmit and receive in synchronism at less than a guard band of 10 us robots/terminals/base stations can be synchronised in time with the robot control system 202 to within ±5 ms for messages signal to the robot/terminals, connected to that base station, to cease transmission prior to the base station ceasing its own transmission change the operating frequency as instructed by the base station controller inform the robot/terminals of a frequency change using the broadcast communication link support (in conjunction with the base station controller) new robot/terminals being added to a grid served by the base station support (in conjunction with the base station controller) robot/terminals being removed from a grid served by the base station provide an input to accept a pulse per second (PPS) from another base station or an external PPS generator support lightweight directory access protocol (LDAP) for authorisation of administrative logins, or any other type of directory protocol.

for remote connection to the base station via secure shell (SSH) or a custom command line interface (CLI)

support a custom CLI for direct configuration and control have a number of status indicators, which for example, may be visible through the enclosure. Indicators may be configurable depending on use.

have a reset button, accessible from outside the enclosure, to reset the base station have a reset button, accessible from outside the enclosure, the state of which is readable by software enable it to restore the base station to its factory default settings periodically report performance information to the base station controller at a level of detail requested by the base station controller be capable of operating as active or standby instance in 2N redundancy mode.

2N redundancy means one active and one standby base station support failover or switchover between active or standby if a third party arbiter is present (base station controller)

Switchover is a controlled process were both nodes are still responsive. Failover is a recovery process when an active node fails to respond support switchover between active or standby if a third party arbiter is not present.

The one or more robots 210*a*, 210*b*, and 210*c* may be configured to move around the grid and to perform operations or tasks. Operations may include moving a container from one stack to another, going to a charging station to recharge, etc. The one or more robots may be assigned to communicate with the one or more base stations 208*a* and 208*b*. In some embodiments, each of the one or more robots only communicates with one base station at a given time.

The one or more robots 210*a*, 210*b*, and 210*c* may not all be the same type of robot. There may be different robots with various shapes, designs and purposes, for example, there may be a cantilever robot, a bridge robot, a winching robot, etc.

In some embodiments, the one or more robots 210*a*, 210*b* and 210*c* have winches on them which may be used to retain a container for movement from one position on the grid to another.

The robots 210*a*, 210*b* and 210*c* may have radios 218*a*, 218*b*, 218*c*, digital signal processors 220*a*, 220*b*, 220*c*, processors 222*a*, 222*b*, 222*c*, real time controllers 224*a*, 224*b*, 224*c*, batteries 226*a*, 226*b*, 226*c* and motors, sensors, connectors, etc., 228*a*, 228*b*, 228*c*.

The one or more charger stations 230 may be configured to provide power to charge batteries on the one or more robots 210*a*, 210*b* and 210*c*. The one or more charger stations 230 may further be configured to provide high speed data access to robot, and several stations may be placed around the grid for use by the one or more robots 210*a*, 210*b* and 210*c*.

5.0 Applications and Other Implementations

The following section describes various other applications and potential implementations for the system. The descriptions are for illustrative, non-limiting purposes and the system may be utilized in a variety of other applications and implementations, according to some embodiments.

5.1 Crowd Sourced Data

In some embodiments, the system may be configured to crowd source various data including operational data, performance data, analytics metrics and so on, in order to gain insight and general business intelligence based on the data related to operations of the system. For example, one or more terminals may continuously store and/or transmit metrics regarding route planning or obstacles on a map, and such intelligence may be collected and processed at base station, or a central server, and decisions may be subsequently determined and distributed to one or more terminals or other devices on the network.

In some embodiments, this crowd-sourced information may be utilized to map various properties of terminals over a period of time. For example, the flow of people may be mapped as they move around a location. The mapping of the flow of people may be useful for determining bottlenecks in the movement of people in subway stations, or the flow of people in a music festival/exhibition space, for example. People may be tracked using an embedded device, such as a wristband.

In some embodiments, the terminals may be utilized to provide voting capabilities to one or more people using the terminals. The votes may be sent individually to the base stations, and/or the votes may be aggregated together by various terminals and then sent up in aggregate to the base stations. Voting may be used in various contexts and applications, for example, voting at a game show, voting at a concert, voting for political parties, etc.

Where voting is used in a context where the accurate transmission of votes may be of heightened importance (e.g. voting for political parties), the system may be configured to improve accuracy and reliability using methods described throughout the specification. In some embodiments, the system may be further configured to provide an additional layer of security to votes through, for example, authentication, scrambling, encryption, etc. In some embodiments, metadata may be associated with the votes and transmitted alongside the votes, such as location data, time of vote, identity of voter, etc.

This information may be utilized for various purposes, such as safety monitoring, event planning, flow optimisation, targeted advertising, demographics research, etc.

The crowd-sourced information may be comprised of various properties of the terminals, and is not limited simply to position data. For example, signal data (such as spectral characteristics, receive/transmit power, signal to noise ratio, etc.) may be crowd-sourced for various purposes, such as troubleshooting, mapping purposes, identification of areas of poor or good signal quality, etc.

5.2 Listening on Terminal Transmissions

In some embodiments, a terminal may be configured to snoop or listen to any other terminal's data transmission; requiring a one-to-many communication path with respect to a given time slot in a subframe, as described below. In another example, with respect to multiple time slots it can also be a many-to-many transmission system. That is, there can be groups of terminals formed and the messages to be transmitted can be tagged with the specific group to which the message is intended. The system may be configured in various ways, and communications could be received and/or transmitted in a one to many arrangement, and various time/frequency/tile arrangements may be selected to implement these embodiments.

5.3 Configuration of Time Slots

In some embodiments, the time slots can be configured statically or dynamically. That is, a given slot may be reserved for a specific terminal to send a message to another specific terminal or group of terminals. This may allow automated sender/receiver confirmation without having specifically to put a destination slot in the message.

5.4 Positioning Through Peer Communication

In some embodiments, positioning of terminals may be achieved through peer communication: 1) each terminal can have a sticker, tag, or QR code on one or more of its four sides with appropriate identification information; 2) each terminal can also have a webcam or a type of image sensor on some of its four sides, where the webcam or sensor can detect and analyze the sticker or tag on a side of other robots in its vicinity; 3) therefore, each terminal may be able to detect and identify which other terminals may be in the same row or column, or in the same area, as itself. In this case, if a terminal is, for any reason, lost or cannot communicate with the base station, a terminal can listen in to the messages of nearby terminals to determine where the other terminals may be located and hence where itself may be located. Stereo webcams can further enable depth information to be extracted, if needed.

The same type of communication scheme can provide means for terminals or devices to gain further detail on the status of other terminals/devices around them by listening to surrounding or far transmissions. These devices may be of the same nature, or they may perform very different tasks.

In some embodiments, in a similar manner for both uplink and downlink communications, additional tasks and/or procedural calls may be undertaken by a device in response to information transmitted by other devices, even though the specified target (e.g. destination terminal) for this information is not the device listening to the information. Hence, an element of autonomy may be established among the devices or terminals. Emergency stops in sudden and dangerous conditions can be dealt with when the devices can autonomously determine where or how to avoid an obstacle encountered by a peer terminal or device.

In another embodiment, a device can sanity-check its operation, state space machine and current task or instruction by monitoring the traffic to and from other devices. For example, for a mobile terminal, it may listen to sets of movement instructions transmitted to other mobile terminals from the base station, so that the mobile terminal can sanity-check for incidents like collision avoidance. This can also be applied to safety and security applications.

Where the application and/or message from a base station involves the collection of data by one or more terminals or mobile devices, other devices may take the same action in an opportunistic and peer-to-peer manner, sometimes depending on each device's CPU load and/or feature set.

This may add an element of efficiency to the communication scheme where the required data is already available on one or more devices, should the system be polling all devices for data or to transmit data.

In some embodiments, there may also be a crowd-sourced business intelligence or data mining aspect to the system so that even if the data is not transmitted to a particular device or base station for further analysis, it can still be entered into the logs and analyzed later.

5.5 Applications in Residential/Office Environments

In one embodiment, the system may be deployed to enable and configure intelligent control and monitoring of household appliances, devices and sensors (e.g. a "smart home network"). Each appliance or sensor in a home may be a terminal connected to a central base station or server, which may or may not be within the physical periphery of a home. The appliances being connected to the base station may be, for example, one or more of a TV, a fridge, a camera, an air conditioner, a humidifier, a boiler, a heater, a printer, a dishwasher, a washer, a dryer, a computer or laptop, and so on. The sensors being connected to the base station may be, for example, one or more of a temperature sensor, a door sensor, an alarm sensor, a carbon dioxide sensor, a light sensor, a valve pressure sensor and so on. Other devices may also be connected to the smart home network, such as a remote control, a smart phone, or a tablet computer (such as an iPad™, and/or tablet computers operating on the Android™ platform). Intelligent or smart control and monitoring of all these devices and appliances in a smart home network may depend on reliable communication links in real-time or near real-time.

The system in this case may enable all kinds of devices, appliances, sensors and etc. to be connected wirelessly in a single network. These devices, appliances and sensors may communicate with one or other and generate or transmit a great amount of data at any given point in time. In one instance, cloud storage and computing may be implemented in order to store and process a large amount of data from one or more of the connected devices, appliance and sensors in a smart home network.

Each of these connected devices, appliances, sensors can be a node or a terminal (similar to a robot as described in the warehouse embodiment above) in the communication network, and can be assigned one or more thin pipes or one or more fat pipes to send and receive data packets via data bursts, as described elsewhere in this disclosure. The potential advantages of the system is that it can enable each of the nodes or terminals to communicate with a base station or server, and with each other, simultaneously or near simultaneously, in a contention-free communication link, and/or with minimal loss of packets.

For example, a temperature sensor may determine that it is currently at 27 degrees Celsius in a living room and therefore there is no need for indoor heating to be on. The temperature sensor may be configured to directly contact and send a message to the heater's controller component to shut it off, in the event it is on. This process may be automatic and in real-time or near real-time, using the system. Meanwhile, a monitoring unit or controller may be able to access, log and store all communication data between all nodes and terminals.

In another embodiment, all the appliances, devices and sensors can monitor each other's transmissions, and then can autonomously take the appropriate action based on the transmitted data and/or status of the appliances, devices and sensors around them. For example, an alarm device may be automatically activated if the door entry device is triggered. Or the motion sensors may be disarmed if the master bedroom door is opened, and so on. Centralizing the decision-making process on a server connected to the base station may not be required.

5.6 Applications in Vehicles

In another embodiment, the system may be deployed to enable and configure driverless or self-driving cars (also known as "autonomous vehicles") on the road. Each of these self-driving cars may be a terminal connected to a central base station or server on a cloud, and may be able to communicate with each other in order to determine the best routing in view of data from other self-driving cars as well as data from the central base station.

In addition, there may be a variety of sensors, devices and other technical units in a self-driving car that are essential for safe and efficient operation of the car. For example, speedometer, accelerometer, break sensor, cameras, radar, lidar, GPS, computer vision, speaker, microphone, safety belt detector and so on. The self-driving cars can detect multiple distinct objects simultaneously, recognize when it may be in risk of hitting other objects (e.g. curbs, cars, or pedestrians), and further reroute its own path in view of a reasonable or high probability of collision.

Further, the system could be utilized to control communications of various objects within a car. For example, various sensors and safety features could also communicate within the environment of a car (e.g. an accelerometer detects a high impulse force and indicates to other devices to brace for impact and prepare for a collision).

For example, the radar, lidar and the camera in a self-driving car can work in an interoperable manner to determine the car's position and its relative distance to other stationary or moving objects nearby within a certain vicinity in real-time or near real-time. This may require that sensors and device to communicate with each other in an efficient and reliable manner.

The system can be configured to enable various sensors, devices or other terminals in a self-driving car to relay and/or receive, in real time or near real time, information to/from a decision-making logic or control centre, and then transmit the routing or movement decisions back to other self-driving cars or other vehicles on the road, traffic lights, and other devices. Since the exchange of data between the terminals (and between the terminals and the control centre) may be at a sufficient speed and through a contention-free and resilient communication link as provided by the system, the decisions may potentially be rendered in real-time or near real-time, and thus may enable the self-driving cars to be able to avoid collisions or run a red light. In some example, the decision-making logic or control centre may be installed within a self-driving car itself. In other examples, the decision-making logic may be in a different car, or on a cloud-type implementation.

In another embodiment, the system can be configured to further enable each self-driving car to download a new map or an updated version of traffic light schedule from a central database or a peer vehicle on the road close to it.

Sensors and/or devices may also be connected using wires, and the system may be configured to provide pipes of various sizes and to allocate them accordingly. As a sample implementation, the thin pipe could for instance keep transmitting "all OK" or "not OK", the latter of which would prompt a slowing of the vehicle, followed by more detailed information in the fat pipe to help a central unit to decide how to respond.

An "emergency" message in the thin pipe could also prompt braking while the fat pipe gives information about the emergency to help the central controller decide what kind of additional reaction to prompt ("move left" or "move right").

There may further be issues regarding false positives, and the communication system could be utilized with logic to help identify false positives, with readings from various sensors, or duplicated sensors, for example.

5.6.1 Vehicle Roaming

The system may also be utilized to perform roaming based upon the location of a vehicle. For example, if one were travelling on the M1 motorway, the vehicle may be connected to the M1 base station, while if the vehicle were the crossing M25 road, a vehicle may be within range of its base station even as the vehicle is driven under the M1. At the intersection, cutover may happen at a precise physical location. This information may be utilized to facilitate traffic control measures, such as a traffic overriding system on either of those roads.

5.6.2 Base Station Roaming

In some embodiments, the base station controller or any other suitable control system may be configured to utilize location information received from terminals and combine the location information of the coverage areas of base stations to instruct the terminals to utilize different base stations ("roaming").

In a conventional wireless system, roaming is conducted based on an appraisal of the spectral conditions that a terminal is subjected to (e.g. signal to noise ratio, packet error, power of received signal).

In contrast, the system may be configured to initiate roaming based on the position of the terminal, potentially among other factors. Such a system may then be able to take advantage a priori knowledge of the coverage areas.

5.7 Military Applications

In some embodiments, the system may be deployed to control and monitor drones and other intelligent weapons. The various elements of military technology may require communications amongst one another, or with a central system. The embodiments and techniques described above may provide an efficient and effective means of establishing these communication links, with information being transmitted potentially indicative of information such as troop positioning, camera data, friend or foe information, instructions from command, automated movement/pathfinding data, target strike locations, etc. The communication links may be implemented using a variety of technologies, such as satellite links, etc. The communication links may further be hardened, encrypted and/or configured for increased resiliency, in particular, in the event of encountering electronic countermeasures, interference, electromagnetic pulses, etc. The system may further be configured to detect and/or respond to signals mimicking or masquerading signals from the system.

5.8 Home Alarms

With respect to systems to secure/monitor facilities, such as a home alarm system, major costs are incurred due to false positives. Having several sensors and knowing with a higher degree of confidence that an event registered on several sensors simultaneously, or not, could help prevent false positives and the associated expensive visits by a security guard or other actions taken.

Additionally, many alarm systems come with several cameras which, when triggered, will send video via the alarm controller to the security company. In some scenarios, it may be beneficial to use much more than three such cameras per apartment, and there may be many apartments within the reach of a base station (or there may be interference between base stations if not managed properly) Given that spectrum is likely to be in short supply, the system, especially the fat pipe features, may be utilized for the video transmissions. As surveillance video is typically of sufficiently high resolution to identify perpetrators, so it may be likely that there will be an increased number of cameras of higher quality and therefore have higher bandwidth needs as cameras get cheaper and better.

Intelligence in the camera, in conjunction with other sensors would transmit frequent signals over the thin pipe and only if something "interesting" (as can be variously defined) occurs, would the fat pipe be used to transmit video.

In another embodiment, the system can alternatively be configured or designed to monitor sensors attached to a large number of people in a small space, such as a theatre or stadium. The output from these sensors can then be used to alter aspects of the venue (sound, images, events etc.) with a very short delay.

In another embodiment, the system can also be configured to monitor sensors in a large industrial facility, such as an oil refinery, where a combination of wireless communications and long life batteries (potentially attached to solar cells) can radically reduce the cost and time required to equip such a facility with all the sensors required.

In another embodiment, the system can also be configured to monitor sensors used in seismic surveys. In large scale seismographic surveying, many thousands of geophones (seismic receivers) may be employed for any one survey. These may be connected together using cables for communications and power supply. The system can be configured to wirelessly monitor a plethora of geophones where a combination of wireless communications and batteries (potentially attached to solar cells) can potentially simplify the process of conducting seismographic surveys where many sensors are operating simultaneously.

5.9 Wearable and Handheld Devices

In some embodiments, the system may be comprised of one or more wearable devices and/or handheld devices that act as one or more terminals. Wearable devices may include various types of wearable devices, for example, wristbands, headgear, brain sensing devices, glasses, armbands, clothing, shoes, etc. Handheld devices may include various types of handheld devices, for example, handheld terminals, remote controls, handheld game consoles, etc.

In some embodiments, the wearable and/or handheld devices may have various sensors, such as accelerometers, gyroscopes, magnetometers, battery level indicators, microphones, global positioning system (GPS) locators, wireless, cameras, near field communications devices, proximity sensors, etc.

In some embodiments, the wearable and/or handheld devices may have the ability to sense bio-metric data through various biometric sensors, such as heart rate, skin resistance, brain activity, temperature, fingerprint, iris recognition, eye activity, oxygen saturation, olfactory inputs, etc.

Sensory data may be collected in real-time, near-real time, in batch, etc. The sensory data may also be communicated to various devices synchronously or asynchronously.

The system may be configured to provide communications with the one or more wearable devices and/or one or more handheld devices. The wearable and/or the handheld devices may communicate among each other and/or communicate with various base stations. The wearable and/or handheld devices, in some embodiments, may also provide various sensory data through the one or more communication links. The system may allocate different types of communication links depending on the particular needs of the data being transmitted, and in some embodiments, data from the same wearable and/or handheld device may be transferred over different communication links. For example, the system may be configured to transmit video data through a high bandwidth communication link, and status update messages through a low bandwidth communication link with low latency.

In some embodiments, there may be other types of terminals that may also interoperate with the wearable and/or handheld devices, such as devices for collating and/or displaying information received from a plurality of wearable and/or handheld devices.

As an illustrative, non-limiting example, a potential application of such an implementation would be the use of the system at events of various sizes. The communication system may be utilized to provide one or more communication links to the one or more wearable and/or handheld devices. These devices, for example, may be used by one or more individuals for tasks such as submitting votes, sending messages, submitting media, submitting confectionary orders, receiving information, various crowdsourcing activities, etc.

Another example use of the system may be in restaurants where one or more patrons may utilize one more handheld terminals to submit food and beverage orders, request service, pay bills, submit food pictures/video, submit audio/video reviews, etc.

The system may be used in various applications in conjunction with bio-metric sensory data, such as for use in a restaurant, where the wearable and/or handheld devices may be used to sense one or more bio-metric properties associated with the customers (e.g. heart rate, skin resistance, brain activity, temperature), and use these one or more bio-metric properties to control various elements within the restaurant, such as the music, temperature, humidity, lighting, etc.

In some embodiments, various sensors on participants may be utilized in conjunction with the communications capability of the system to provide control inputs to various aspects of an entertainment venue or entertainment complex. One or more sensors may provide inputs, and inputs may also be combined in various ways (e.g. accelerometer data is combined with gyroscopic data).

For example, in an entertainment venue such as a night club, or a large arena, one or more sensors connected with wearable and/or handheld devices associated with one or more participants may be used to control various aspects of the entertainment, such as light shows, video displays, etc. The sensory inputs may be used individually (e.g. a wearable device is moved up, a light moves up) and/or in aggregate (e.g. thirty people raise their wearable device, then the lights move up).

A potential advantage of using the system with wearable and/or handheld devices is that the one or more communication links may be adjustable by a communication manager to adapt to various environmental and/or communications needs.

Issues encountered by existing cellular technologies being overloaded by a large number of requests to initiate communication links may be alleviated and/or avoided through using the system, according to some embodiments.

For example, a large number of contention-free, low latency, low bandwidth communication links may be established, which may be especially useful where there is a large number of densely spaced devices engaged in communications in a particular period of time.

5.10 Near Real or Real Time Control Applications

In some embodiments, the system may be configured for use with various near real or real time control applications, where one or more communication links may be established with one or more terminals that are interconnected with various elements. Examples of terminals interconnected with various elements may include the wearable and/or handheld devices described above at Section 5.9. For example, the system may be configured for use with a light show, a fireworks display, a water fountain show, etc. In these embodiments, the system may provide one or more communication links to coordinate and control the actions of the one or more terminals (e.g. sending control information to indicate that a light should be turned on, pointed in a particular direction, activated with a particular energy or particular colour).

In some embodiments, the one or more terminals may also be configured to provide information back to a control system, so that the control system may be able to monitor and/or troubleshoot the operation of the terminals. For example, in the context of a light show, the terminal may indicate that an attached servomotor controlling the directionality of a light is malfunctioning.

For example, the system may be configured for use with a light show, a fireworks display, a water fountain show, etc. In these embodiments, the system may provide one or more communication links to coordinate and control the actions of the one or more terminals (e.g. sending control information to indicate that a light should be turned on, pointed in a particular direction, activated with a particular energy or particular colour).

In some embodiments, the one or more terminals may also be configured to provide information back to a control system, so that the control system may be able to monitor and/or troubleshoot the operation of the terminals. For example, in the context of a light show, the terminal may indicate that an attached servomotor controlling the directionality of a light is malfunctioning.

5.11 Applications with Everyday Objects

In some embodiments, the system may be configured to provide a communications network for use with one or more connected devices, such as those connected devices considered under the "Internet of Things".

In the context of the "Internet of Things", a number of everyday household, outdoor, manufacturing and workplace devices will increasingly require the ability to communicate with various networks. For example, these connected devices may include, for example, a refrigerator with the ability to receive instructions and/or the ability to indicate that it is running low on milk, a water pipe with various sensors attached, a light fixture that is able to receive commands, etc.

A challenge with existing wireless and cellular networks and infrastructure is that existing networks and infrastructure are designed to provide communications primarily for personal computing devices and/or large servers.

These connected devices typically considered under the "Internet of Things" often require low-bandwidth and low latency connections with various networks. Accordingly, the existing wireless and cellular networks and infrastructure may be poorly equipped to service the needs of these connected devices.

In contrast, the communication links provided by the system may be configured to provide one or more communication links that have been adjusted to efficiently service the particular needs of these connected devices.

5.12 Miscellaneous Applications

The system may be employed in many other applications according to some embodiments. For example, sensors may be embedded in deep mine shafts that report rock stability information on a real time basis, where the sensors both talk to each other and talk to the base station.

Furthermore, medical uses may be envisaged such as micro-sensors being located in a patient's veins that record blood flow and other medical information and communicate this to a cardiologist's module acting as a base station.

There are also other scenarios that may be considered according to certain aspects of the invention. These may include sensors embedded in packaging of high-value items, where the sensors send a message when the package is opened. Uses for this application may include medical equipment utilized in hospitals (for example stents, balloons) supplied on consignment by the manufacturer, the hospital being charged only for the number used. Another embodiment may be for use with envelopes containing high value or highly confidential documents, the sender being advised when or if the envelope is opened.

It will be appreciated that these embodiments are not limiting and that any application requiring communication between a large number of terminal units and at least one base station in a physical area may be envisaged. The physical area can be scaled according to the use and the number of base stations can be increased as required but the ability of the system to allow large scale whilst maintaining a high density of terminal units is maintained.

6.0 Hardware and Other Implementation Details

The following section provides description of some hardware that may be used to implement the system, according to some embodiments. The described hardware is provided for illustrative, non-limiting purposes, and it may be understood that various elements may be modified, omitted, added, etc. Other related aspect of operating possible hardware components of the communication system are also described in this section.

The system can be of a point to multipoint communications system operating in the unlicensed 5470 to 5725 MHz frequency band. Other frequency bands may be used. In some embodiments, one or more frequency bands are used by the system, including those that may not be adjacent to one another.

A single base station using a 10 MHz communication link allocation may be configured to connect in a time division duplex, time division multiple access technique to a number of terminals in a real or near real time manner.

Figure 16:
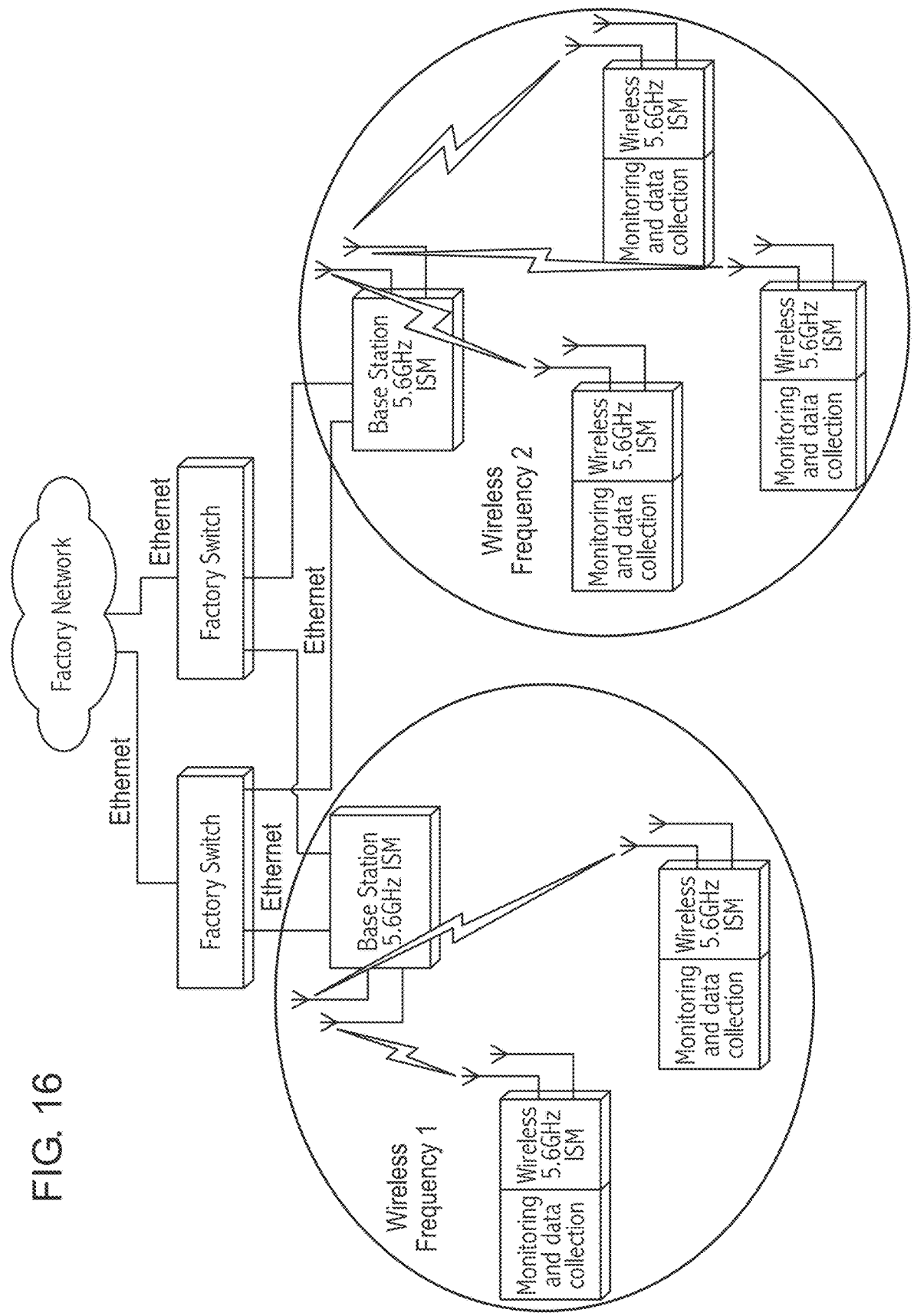
FIG. 16 shows a sample radio system, according to some aspects of the invention.

Referring now to FIG. 16, the radio system can be arranged as a number of fixed base stations each of which is operating in a star formation connecting to a large number of mobile or terminal stations. Other formations, such as ring formations, are also possible, according to some embodiments. For these formations, the system may require various adaptations.

The mobile stations may move around and can have a maximum range of up to a specific value (e.g. 150 m). In one embodiment, the base stations, when powered on, can search the frequency band for a clear communication link before communication is attempted.

During operation, the base station can continue to monitor for both in-band signal interference (e.g. radar) and other users of the band. The mobile station can optionally also monitor for radar and other users in the band and move frequency, if required.

A system in a factory may use one or more base stations to cover the required area.

In some embodiments, roaming may be allowed between coverage areas.

In some embodiments, single frequency network techniques may be utilized to extend coverage.

System Synchronisation

Overall system synchronisation may be required so that:

The terminal is frequency locked to the base station to the order 50 parts per billion.

Base stations transmit at substantially the same time and receive at the substantially same time at a sufficient level of accuracy If a terminal needs to transfer quickly from one grid to another, having the base stations synchronized may help simplify the task The architecture of the terminal may include a master oscillator which locks to the serving base station from a received signal.

The base stations may be supplied with a distributed synchronisation signal received from a master timing unit. The distributed synchronisation signal may be a star topology, but other topologies may be utilized, such as rings, chains, etc.

The system may be configured to use synchronous Ethernet (SyncE) and distributed pulse per second to tie the frequencies of the base stations together, and IEEE1588v2 precision time protocol (PTP) to align frame timings providing this approach provides the µs time alignment of the base stations.

To allow the system to be economical in smaller installations that cannot carry the cost of SyncE and PTP network equipment, a base station may have an input connector for a simple 1PPS signal from a Building Integrated Timing Supply (BITS) timing source. The base station may also have an output connector for the 1PPS signal that it is using. In this way, base stations can be daisy-chained to keep them in sync, though such a system may require manual intervention (to reconfigure cables) in the event of any base station failure.

Radar Detection

The base station can optionally support a radar detection mechanism.

There can be two types of radar detection, in channel and out of channel detection.

- For out of channel detection the implementation of the radar detection will be as a signal branch off one of the receiver chains at the IF frequency which is filtered and amplified before being converted to a digital signal for processing. This assumes that the radar signal can never be powerful enough to saturate the RF front end.
- For in channel detection the received signal from one or both of the diversity receiver chains is analysed for the presence of radar signal.
- In some embodiments, the system can detect radar transmissions and intelligently switch communication link to avoid any existing or predicted interference.

There may be more than one architecture under consideration for radar detection:

- Detection in the base station only.
- Detection in the base station with supplementary detection in the terminals signalled to the base station.
- A completely separate device for radar detection.

Optional radar detection may be designed so that radio transmission may be ceased or paused in the event that there is interference of any sort occurring.

Dynamic frequency selection may not be necessary provided that the entities transmit below a certain power threshold. The terminals may operate below this threshold so the terminals may or may not implement a radar detection scheme, this can be handled by the base station which transmit a higher power.

Operation at Lower Temperatures

Some performance degradation is expected to occur when operating in a freezer zone at −28 C or any other industrial freezer applications.

Radio DC Powering

The specific DC powering follows a philosophy of:

Where possible no switching regulators are used in the vicinity of the analogue signal chains.

Phase locked loops (PLLs) may have addition linear Low DropOut regulators to minimize the effect of power supply noise on the local oscillators.

Radio PCB Arrangement

The radio printed circuit board (PCBs) used in the base station and terminals will be different. Both may comprise a main PCB for the intermediate frequency (IF) and baseband (and digital) sections of the design and small high quality radio frequency (RF) PCB daughter board soldered to the main board, on which the radio frequency sections are mounted, or may be mounted as a high quality RF layer as the top and bottom layer of a multi layer PCB.

Radio Local Oscillator Arrangement

The radio may have two local oscillators, in some embodiments. The first may convert between RF and IF frequencies and the second may convert between IF and baseband frequencies, where baseband may not necessarily be centered around DC.

Radio Signal Conversion

The 2 receiver chains and the radar monitor chain may drive a dual I/Q Analog Digital Converter (ADC) before being passed to the baseband digital signal processor. The sampling rate for the system may be any suitable sampling rate, such as 15.36M samples/s and the dynamic range of the ADCs may depend on how much power control is implemented. The sample rate for the radar detector may be continuous in the receive subframe.

The transmitter chain may accept digits from the baseband and convert this to the analog domain at a suitable sampling rate, such as (15.36M samples/s). The sinc X frequency shape introduced by the Digital Analog Converter (DAC) can be pre-compensated prior to the signal being presented to the dual I/Q DACs.

General RF Architecture

In one aspect of the communication system, both the base station and the terminal implement a general radio frequency architecture which may include some or all of the following:

Dual receiver chains

A single radar detection receiver chain

A single transmitter chain

Dual antennas

Analog to Digital conversion at the end of each receiver chain

Digital to analog conversion at the start of the transmitter chain

Figure 17A:
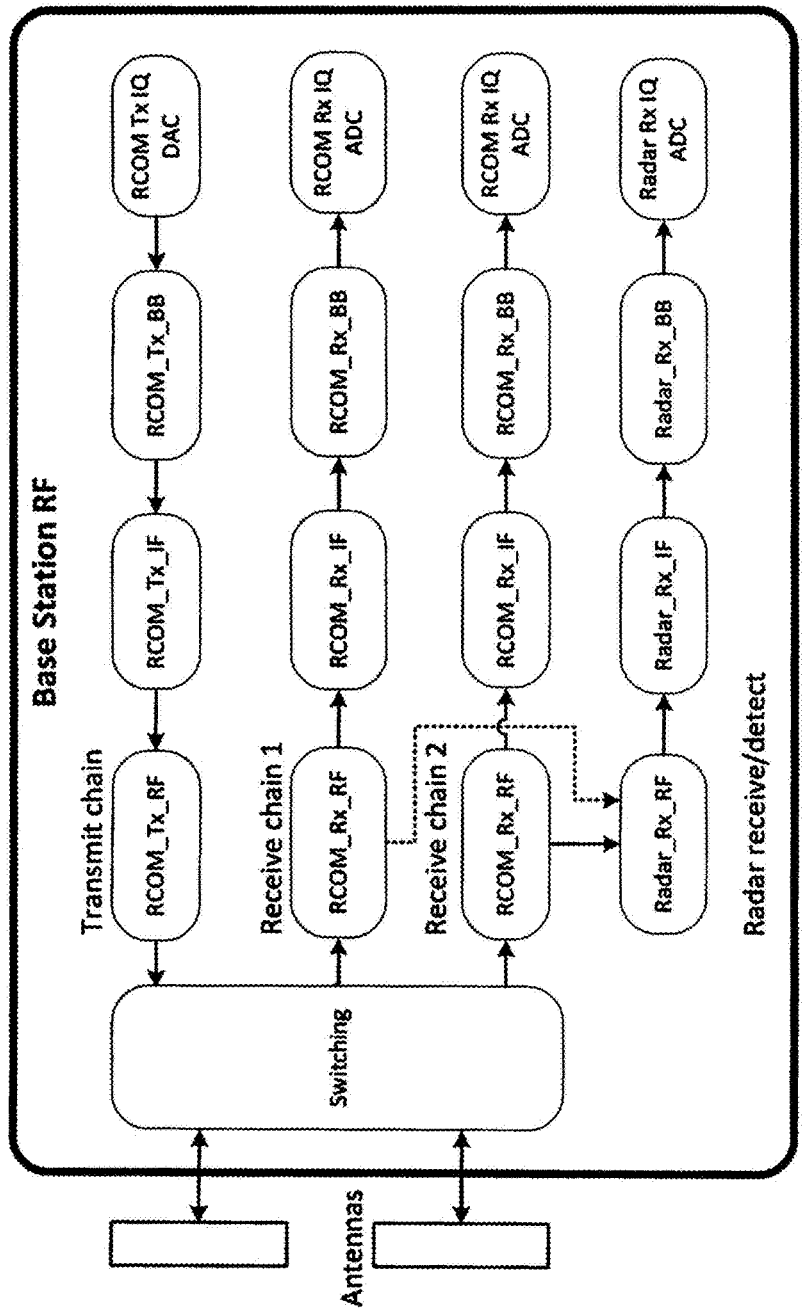
FIG. 17a shows a general base station and radio frequency architecture, according to some aspects of the invention.

Referring now to FIG. 17a, which shows a general base station and terminal architecture according to some aspects, the radar detection is shown as a branch off the receiver chain, and the configuration can also be a completely separate receiver chain for out of channel radar detection.

Figure 17B:
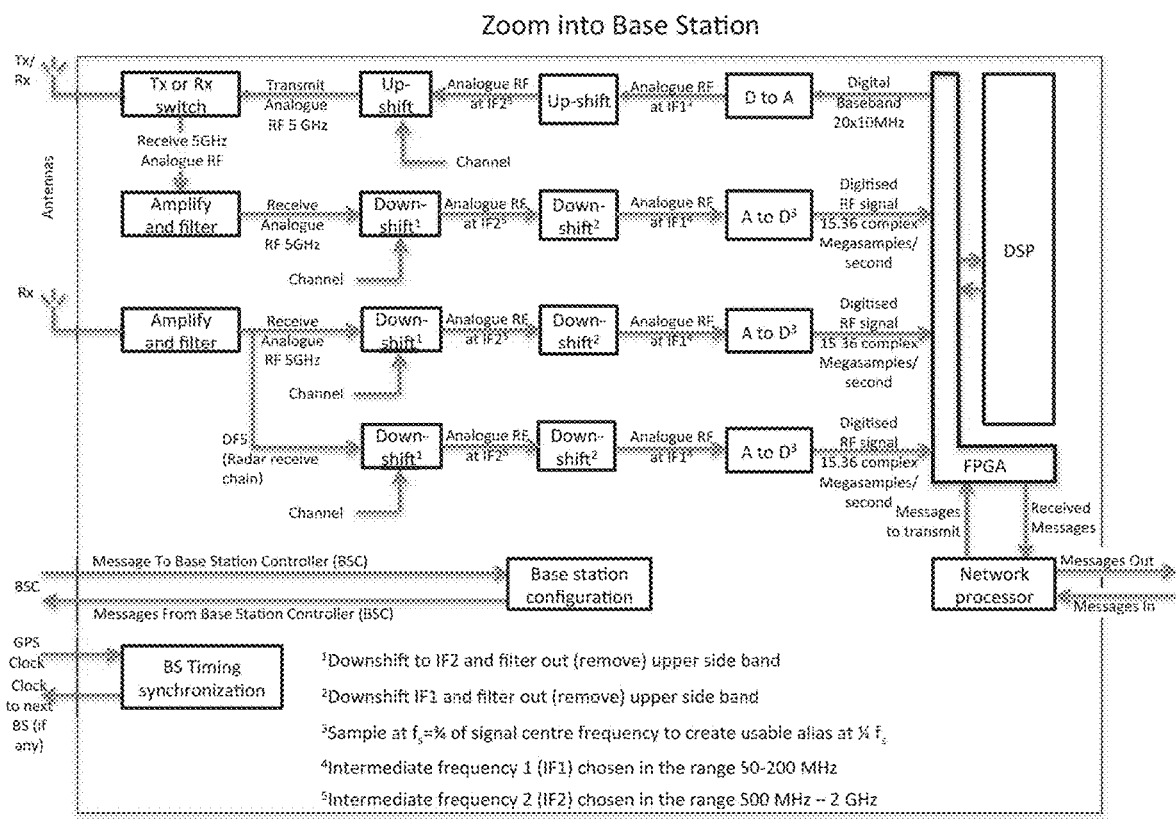
FIG. 17b shows a specific embodiment of the general base station and radio frequency architecture of FIG. 17a according to some aspects of the invention.

FIG. 17b shows a specific embodiment of the base station and terminal architecture including specific values where appropriate. It will be appreciated that this is an example only of the invention and that any suitable components or values of said components may be used as appropriate.

Base Station Radio Architecture

The base station electronics may be comprised of a single board for the baseband and radio. Gigabit Ethernet may be used as the interconnection technology both between the base station and the base station controller, and within the base station board itself.

The external link to the base station controller may use standard RJ45 modular connectors and transformers (these may be integrated into a single package) plus Gigabit Ethernet physical layers (PHYs). The PHY may convert the line signals to an reduced gigabit media independent interface (RGMII) interface, and this may be the signaling system that is used within the board.

Antenna Arrangement

In some embodiments, one or more antennas may be used. For example, two antennas may be used to obtain spatial diversity on the receive chain. The antennas can be high gain sectored antennas capable of covering between 90 and 180 degree coverage.

The physical arrangement of the antennas and base station hardware may be such that the connections to the antenna are as short as possible. This introduces, ideally, no more than 0.5 dB additional loss at 5.6 GHz.

Uplink Power Control

The base station receiver may simultaneously receive signals that originate from terminals that are at a minimum range of, for example, 1 metre and not faded, and, for example, a maximum range of 135 m and faded.

Alternative coding levels may allow the radio to recover signals 6 dB smaller than the nominal sensitivity (but with a reduction in the number of supported terminals per base station) and this dynamic range drives the system to need up link power control. If a high specification ADC is used in the conversion process the power control can be coarse in nature and could be implemented using downlink received signal strength (RSSI) or and/or physical position and approximate know range to set the uplink power.

In one embodiment, a basic transmission power control scheme based on received signal strength (RSSI) may be implemented as follows, assuming terminals each has a battery type power source and thus power consumption may need to be carefully monitored and adjusted to preserve power whenever possible.

There can be a pre-determined minimum RSSI level (RSSmin) at which correct reception of a packet is still achieved despite path loss and fading. The Base Station can determine the level of power in a data burst sent by a terminal. Once a RSSI associated with a received signal/burst is determined, the difference between the minimum RSSI and the RSSI of the received signal can be further determined so that corrective steps regarding transmit power may be taken, if any. For example, for each packet, the base station or a terminal can compute Px (path loss)=Transmitted Power −Received RSSI; and optimal transmit power between sender and receiver can then be Pop=Px+RSSmin.

In another embodiment, a means to exploit the use of down tilting an antenna to ease potential power control challenges. The down tiling of the antenna may help with, for example, frequency reuse.

Uplink Maximum Signal Level

The approximate maximum signal level is shown in the table in FIG. 18 and can be as high as 23 dBm, according to some embodiments.

Note the final value of uplink equivalent isotropically radiated power (EIRP) may for example be 19.5 dBm, for the uplink from a terminal up to a base station.

This signal level may suggest that power control will be required.

Uplink Minimum Signal Level

The approximate minimum signal uplink signal level is shown in the table in FIG. 19, according to some embodiments, and the receiver sensitivity is −101 dBm, based on an uplink signal of 30 bins and thus about 450 kHz bandwidth. An additional 6 dB is allowed giving a minimum signal of −107 dm.

Base Station Communications Receiver

The base station receiver may be a dual conversion superheterodyne receiver with a RF frequency of 5470 to 5725 MHz, a first IF frequency (the specific frequency of which is driven by the availability of off the shelf filters and mixer performance) and a final IQ baseband gain section. The IF frequency bandwidth is nominally 10 MHz and there is no AGC control.

The architecture uses two parallel receiver chains both simultaneously receiving the uplink signal. Each receiver has a gain path which:

Filters the RF band
Provides gain at RF
Coverts the signal down to an IF
Provides gain and splits the signal at IF, one path for the signal and the other path for radar detection
Provides channel filtering at IF
Converts the signal down to baseband as In phase and Quadrature components or as a real only signal, the exact method will be decided during the design phase
Provides further channel filtering and gain at baseband
Provides ADC functionality
With no inherent AGC allowed because of the near/far signal requirements a method of adjusting gain on manufacture and temperature compensation will be required At a system level the receiver architecture design may encompass the following:

A near/far signal range of −107 dBm to −23 dBm
A nominal noise figure of about 8 dB based on initial calculation.
A high IP3 and, in general, high linearity to deal with the assumption that the system can use adjacent communication links An indicative top level architecture for the receiver chain is shown in FIG. 20, according to some embodiments.

Base Station Radar Monitor

The base station monitor may provide sufficient analog gain to boost the received signal from a value of −60 dBm at the antenna connector to a level suitable for the chosen ADC. The exact configuration and complexity of the radar detection circuitry may be driven by the European Telecommunications Standards Institute (ETSI) and Federal Communications Commission (FCC) requirements and the need to both monitor for in-band radar and for available alternative communication links near simultaneously.

Base Station Communications Transmitter

The base station transmitter follows a similar structure to the receiver but in reverse order of baseband signals modulated to the IF then filtered and up converted to RF.

A direct up conversion receiver could be employed however, typical specifications for carrier break through may be poor and a single IF up conversion stage may provide a suitable option.

The transmitter power output may be controlled to keep within the specified range. Part of this is accomplished with a temperature controlled attenuator, however the variation between manufactured devices may be such that a power detector at the transmitter chain output may be required.

An indicative top level architecture is shown in FIG. 21, a sample transmitter block and level diagram.

The nominal power at the antenna connector of +16 dBm power may be available at the antenna connector which, when coupled with an antenna gain of at least +9 dBi (a sectored antenna), produces an equivalent isotropically radiated power (EIRP) of >+24 dBm. For example, a maximum allowed output by the applicable regulations can be +24 dBm.

Transmitter Signal Peak to Mean Ratio

The transmitter architecture may support a peak to mean power envelope of 13 dB which is what expected from the OFDM signal.

Base Station Radio Baseband

Figure 22:
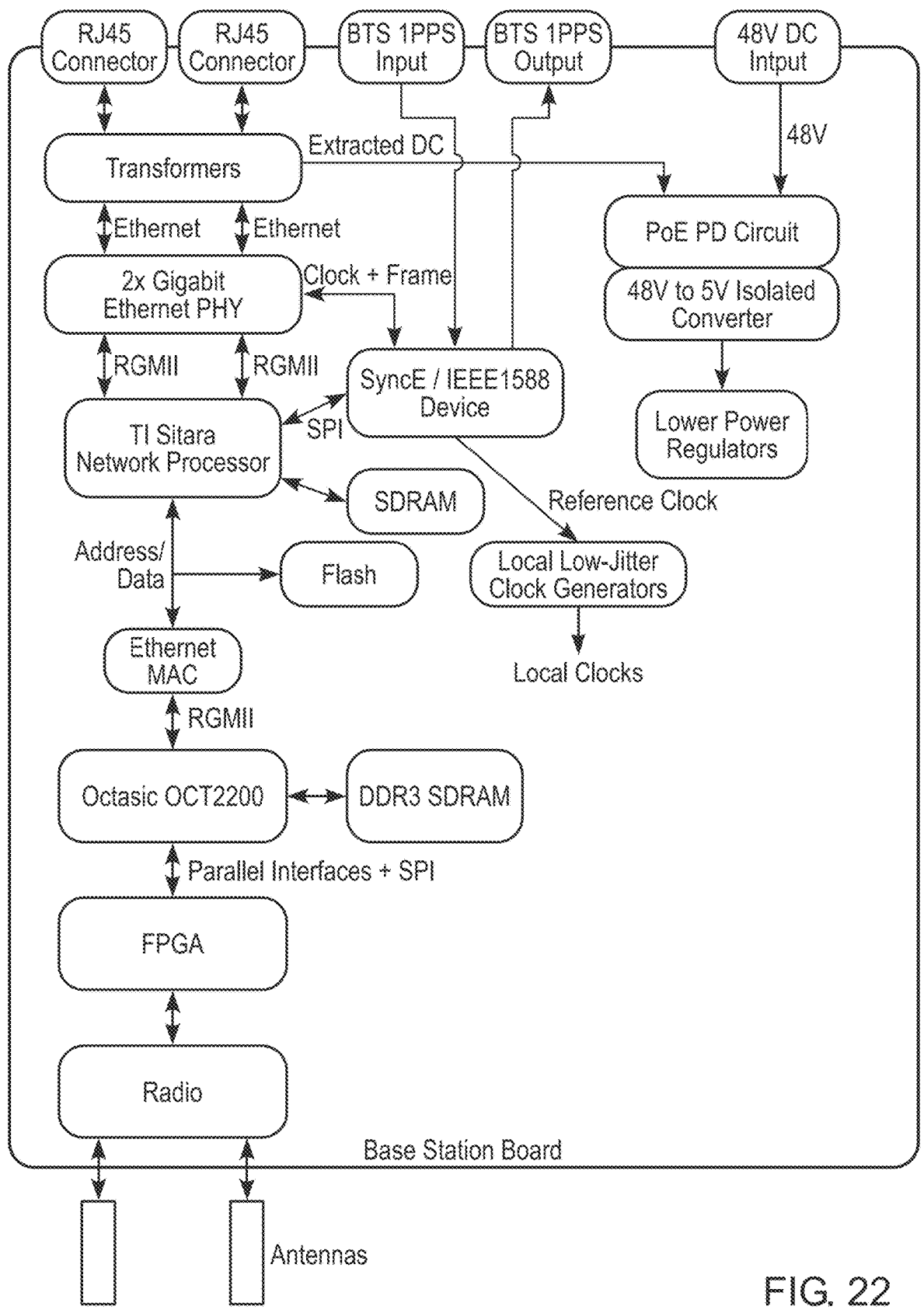
FIG. 22 shows an exemplary base station block diagram according to some aspects of the invention.

Referring now to FIG. 22, which shows an exemplary base station block diagram.

Digital Signal Processing (DSP) Function

The DSP function may be provided by any suitable device, such as an Octasic™ OCT2224WE-BCN, with 256 MB DDR3 SDRAM (two 16-bit wide 1 Gb chips) and suitable memory, such as 16 Gb NAND Flash memory.

Field Programmable Gate Array (FPGA)

There may be an FPGA in the signal paths between the radio circuits and the digital signal processor (DSP). The FPGA may include any logic needed to match the electrical interfaces and could also be used to off-load high-speed digital signal processing that cannot be handled by the DSP software.

Ethernet Connections

Gigabit Ethernet may be used as the interconnection technology between the base station and the base station controller. The two external links to the base station controller may use standard RJ45 modular connectors and transformers (these may be integrated into a single package) plus a dual Gigabit Ethernet PHY with Synchronous Ethernet (SyncE) and IEEE1588v2 Precision Time Protocol (PTP) support. The PHY converts the line signals to RGMII interfaces to a network processor.

Base Station Timing

All base stations within the system need to be kept in time and frequency synchronisation so that the radio interface works correctly. The base station may support two independent ways of maintaining timing: over the Ethernet links using SyncE plus PTP; or via a coax cable carrying a 1PPS (pulse per second) signal from a BITS (Building Integrated Timing Supply). Other methods of maintaining timing may also be utilized.

The local 1PPS signal may be fed out to a BITS 1PPS output port, regardless of whether the Base Station is locked via PTP or the BITS input. BITS input and output signals may be connected via 500 BNC connectors.

A single-chip clock synchroniser, such as the Microsemi ZL30342, is used to produce clocks and frame signals that are synchronised to the master reference source. This device is controlled by software running on the Network Processor, via an SPI or I2C interface.

The various low-jitter clocks required by the system are derived from the master clock frequency by specialised clock generator chips.

Power Supply

There are various for powering the Base Station, some examples may include:

Via the Ethernet link to the base station controller, using Power over Ethernet (PoE)

From a local 48V DC power supply

The first option may be more convenient from a wiring point of view, as the base station location will only need a Cat6 cabling, though there will be a cost-penalty because of the need to use power over Ethernet (PoE) power-sourcing in the network.

The 48V DC power input may be useful for lab-based testing and to allow flexibility in field-deployment, for example, in very small systems.

The base station can accept power fed via PoE from either from the DC input socket. The 48V DC input may take precedence over PoE—if it is present the PoE 'signature' may be modified to disable the PoE power source. The PoE supplies are controlled by software on the network processor, which may ensure that power is taken from the active, rather than standby, link.

There are various power levels that can be supplied via PoE; the Base Station is expected to fit within the highest widely-available power levels from supplies conforming to IEEE802.3at (PoE+). This feeds 30 W into the line, and the resulting expected power at the Base Station is 25.5 W.

Higher power levels may be available using proprietary PoE standards, but power sourcing equipment to these standards is not readily available. If it turns out that the Base Station requires more power than PoE+can provide, then the 48V DC input will always need to be used.

Power over Ethernet may use a high voltage (48V nominal) in order to minimise current over the data cables. This will be converted by an isolated switching-converter to a 5V 'mid-rail'. The 5V rail will be fed to various 'point of load' converters to produce the low-voltage rails used by the digital circuitry on the board. Power fed to analogue circuits will use series chokes or low-dropout regulators to prevent switching noise from affecting performance.

Base Station Network Processor

The network processor may be an ARM Cortex-A8 based processor from TI's Sitara range. This may provide two reduced gigabit media independent interface (RGMII) ports, which are used for the main and standby links to the Base Station Controller. Other devices may also be utilized.

A third Ethernet link may be needed to act as the traffic path to the Octasic™ DSP. This may be provided by a 100 Mb media access control layer (MAC) located in the FPGA and driven by the network processor over its address and data buses.

The network processor boots from its local flash memory and may then load the FPGA and Octasic™ DSP.

Robot Radio Architecture

Robot Communications Receiver

The receiver functionality may be similar to the base station except that in place of a fixed gain receiver an automatic gain control (AGC) is now used to set the signal levels into the ADCs.

Robot Uplink Power Control

The transmitter may be able to control the uplink signal such that where ever the terminal/robot is on the grid the transmitter power is such that the signal received at the base station is of the order −60 dBm.

Robot Radar Monitor

In some embodiments, a terminal may transmit at a power level that is below the power level that requires the use of radar detection on the terminal so that base station is capable of detecting radar interference and initiating a change in frequency.

Robot Communications Transmitter

The transmitter functionality may be virtually identical to the base station except that it transmits less absolute power over the narrower bandwidth and also transmits a lower spectral density as compared to the base station transmitter. The base station receiver however has a higher antenna gain antenna which compensates for the lower terminal transmitter power.

Robot Radio Baseband

Figure 23A:
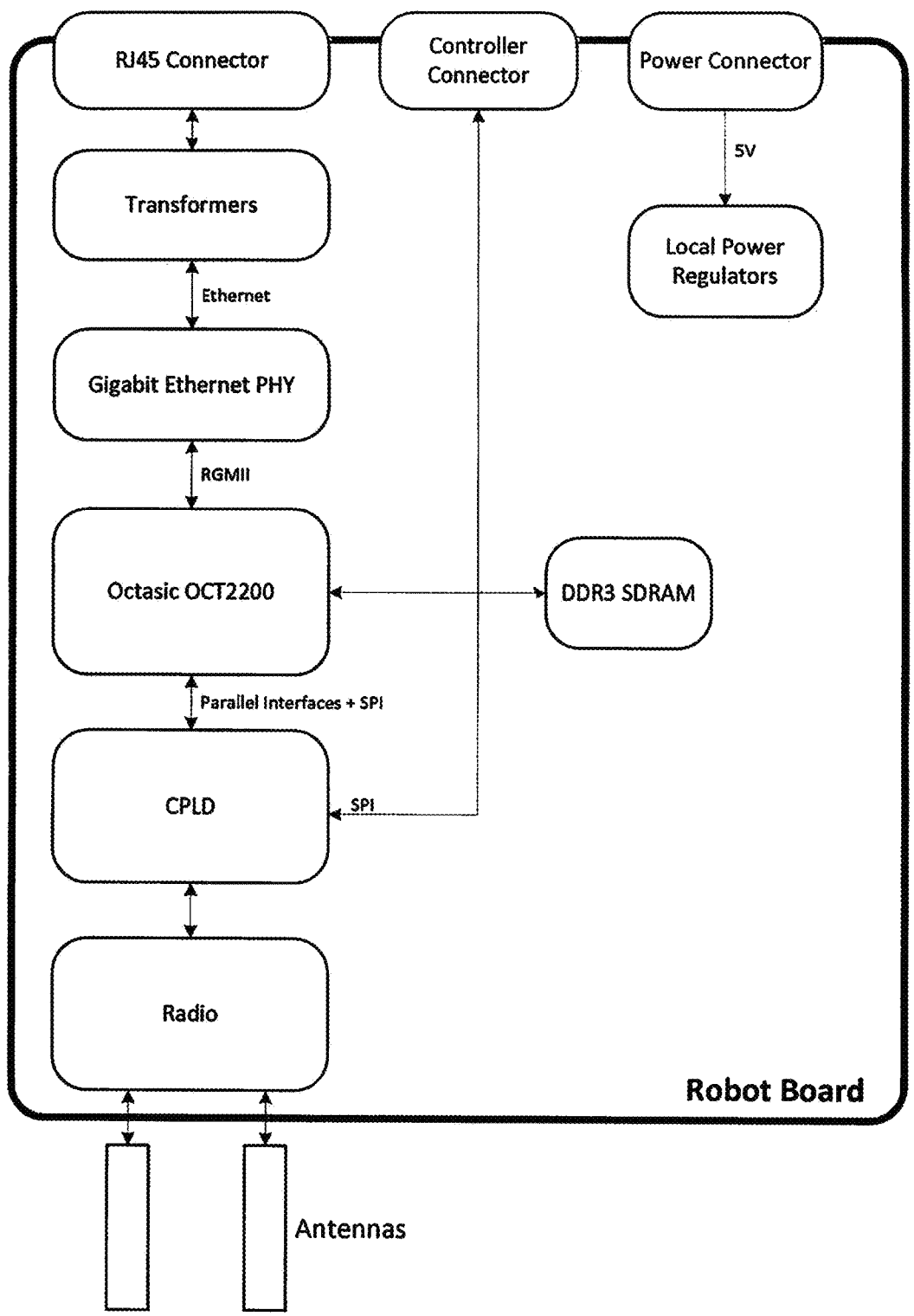
FIG. 23a shows an exemplary robot communications board block diagram according to some aspects of the invention.

Referring now FIG. 23a, which shows an exemplary robot communications board block diagram according to some aspects, the robot radio baseband circuitry is effectively a cut-down version of the base station design. It may differ from the base station board in the following ways:

No Network Processor, so the Ethernet link comes directly from the Octasic DSP via a standard Ethernet PHY No Synchronous Ethernet/IEEE1588v2 (or timing strobe), as all timing comes over the air.

No Power over Ethernet (all power is from a terminal's battery)

Simplified radio interface, so FPGA replaced by cheaper complex programmable logic device (CPLD)

Additional serial peripheral interface (SPI) link from DSP to robot controller board, via CPLD.

Figure 23B:
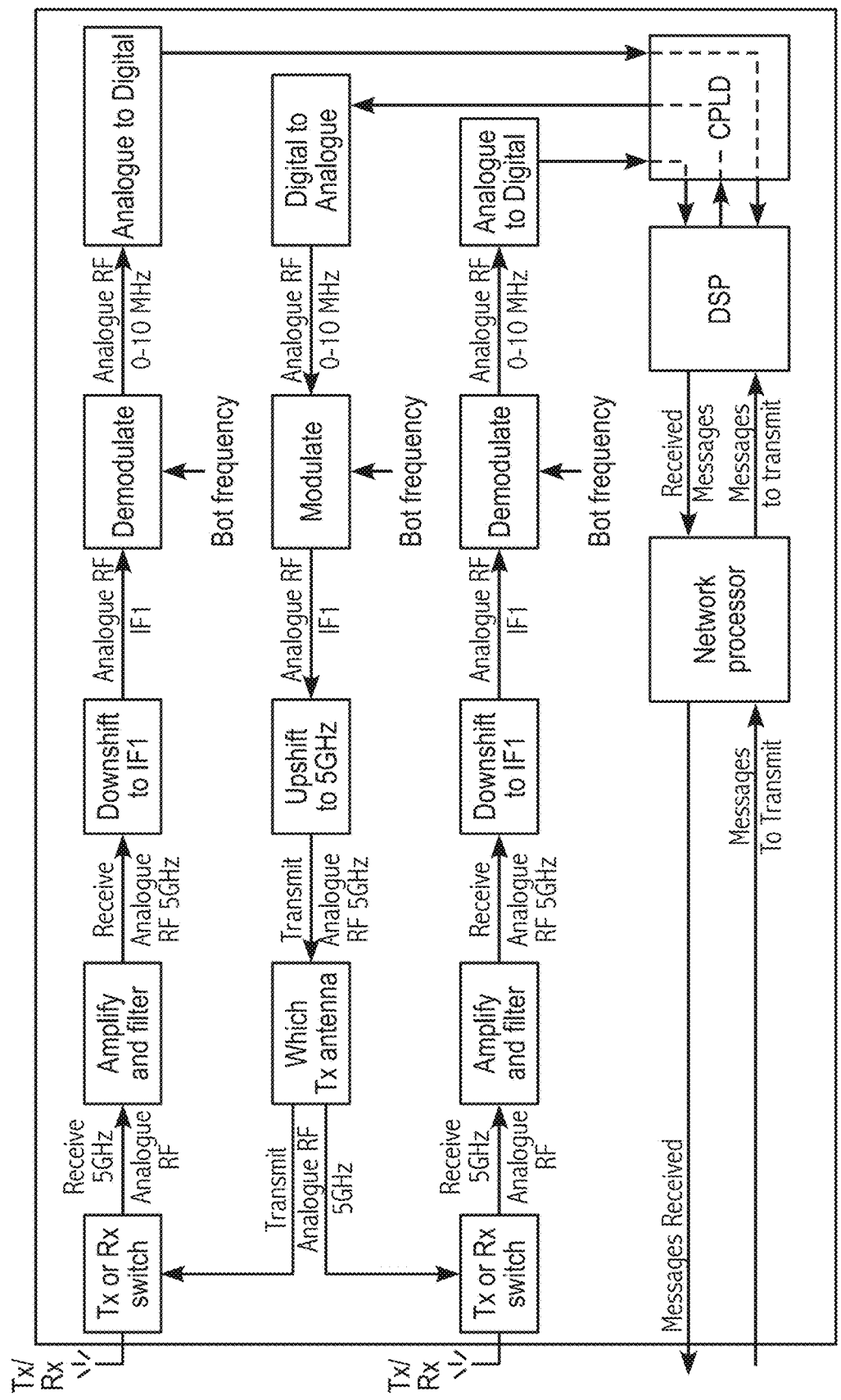
FIG. 23b shows a specific embodiment of the robot communications board block diagram of FIG. 23a according to some aspects of the invention.

FIG. 23b shows a specific example of the robot communications board block diagram of FIG. 23a. It will be appreciated that this diagram relates to a specific embodiment only and any suitable robot communications board may be used in accordance with aspects of the invention described above.

Software Architecture

The following section provides a sample, non limiting description of various software elements that may be used to implement some embodiments, as well as related processing elements and their operation. The communication link access technologies described herein may be implemented using network components but also can be implemented using software, for example using software based networking approaches. What follows are possible aspects of software based implementation of the communication system described herein.

While specific details may be provided, it should be understood that there may be variations in implementation and that various elements may be omitted, modified, and/or added.

Overview

The software layers can provide two abstracted communication links between devices connectable to a network, devices may include various types that may include terminals, robots, handheld devices, wearable devices, or any apparatus that may have the capability to communicate data.

There may be one or more thin pipes—the thin pipes may provide communications between at least one base station and terminals, for example for control and monitoring of terminal activity. In some embodiments, terminals may have dedicated thin pipe connections.

There may be one or more fat pipes—the fat pipes may provide communications between an operator, or maintenance system, and terminals for various purposes, such as administrative access.

Fat pipes may be allocated as required and may have dedicated bandwidth resources until the connection is released. The link layer may help ensure that data is transferred reliably.

A control communication link may allow the base station to identify itself and transmit any common configuration or command information to the terminals.

Protocol software may be distributed over the base station controller, base station, terminals, etc.

Protocols The protocols stacks for real-time control messages (thin pipe) and for administration and maintenance (fat pipe) may vary.

Real-Time Control Protocols

Figure 12:
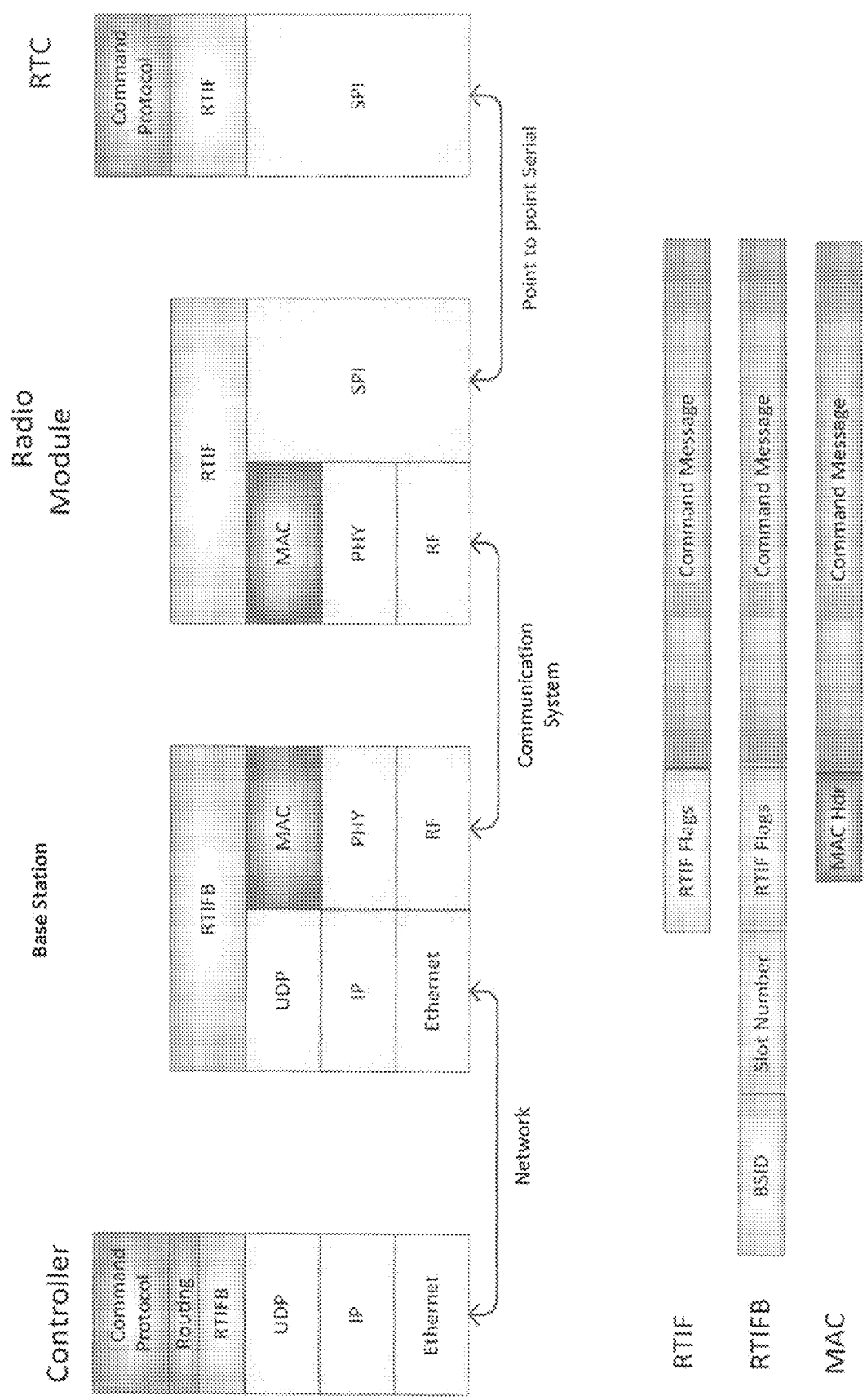
FIG. 12 shows real-time control protocols, according to some aspects of the invention.

Referring now to FIG. 12, one or more real-time control protocols can provide transport of the terminal position and command messages over dedicated thin pipes, according to some embodiments. Messages can be encapsulated in a media access control (MAC) frame over the connection, for all other connections, the messages may be encapsulated in a variant of Real-Time Interface (RTIF) frame. The two variants differ in the addressing mode. Between the terminal radio and robot control, addressing may be implicit because a single point to point connection exists. On the connection between base stations and a base station controller, the address may comprise the base station identity (BSID) and the slot number used for the communication link.

A routing function in a control system, such as one on a base station controller, may provide mapping between the robot name and the BSID and one or more slot number. In some embodiments, the base station controller provides a reliable source of the routing information and may be configured to update whenever a terminal/robot is added to or removed.

Administration/Maintenance Interface

The underlying transport mechanism for these connections may be one or more fat pipe connections. In some embodiments, each base station supports a limited number of concurrent Fat Pipes (1-4 depending upon base station configuration). The base station may provide an application programmable interface (API) to enable the base station controller to dynamically create and release Fat Pipe connections to the terminal/robot. At the terminal/robot end, a radio module may be configured to provide a similar API to the PC (a processor that may exist on a terminal/robot). Driver software in the base station controller and on the PC may use these APIs to provide a modem-like interface to TCPIP/UDP.

Each robot/terminal may be allocated a wireless IP address for administrative connections, and the network may be configured to route traffic to these addresses via the base station controller. When traffic for one of these addresses is received at the base station controller it may be configured to attempt to create a TCPIP/UDP connection to the corresponding PC.

Figure 13:
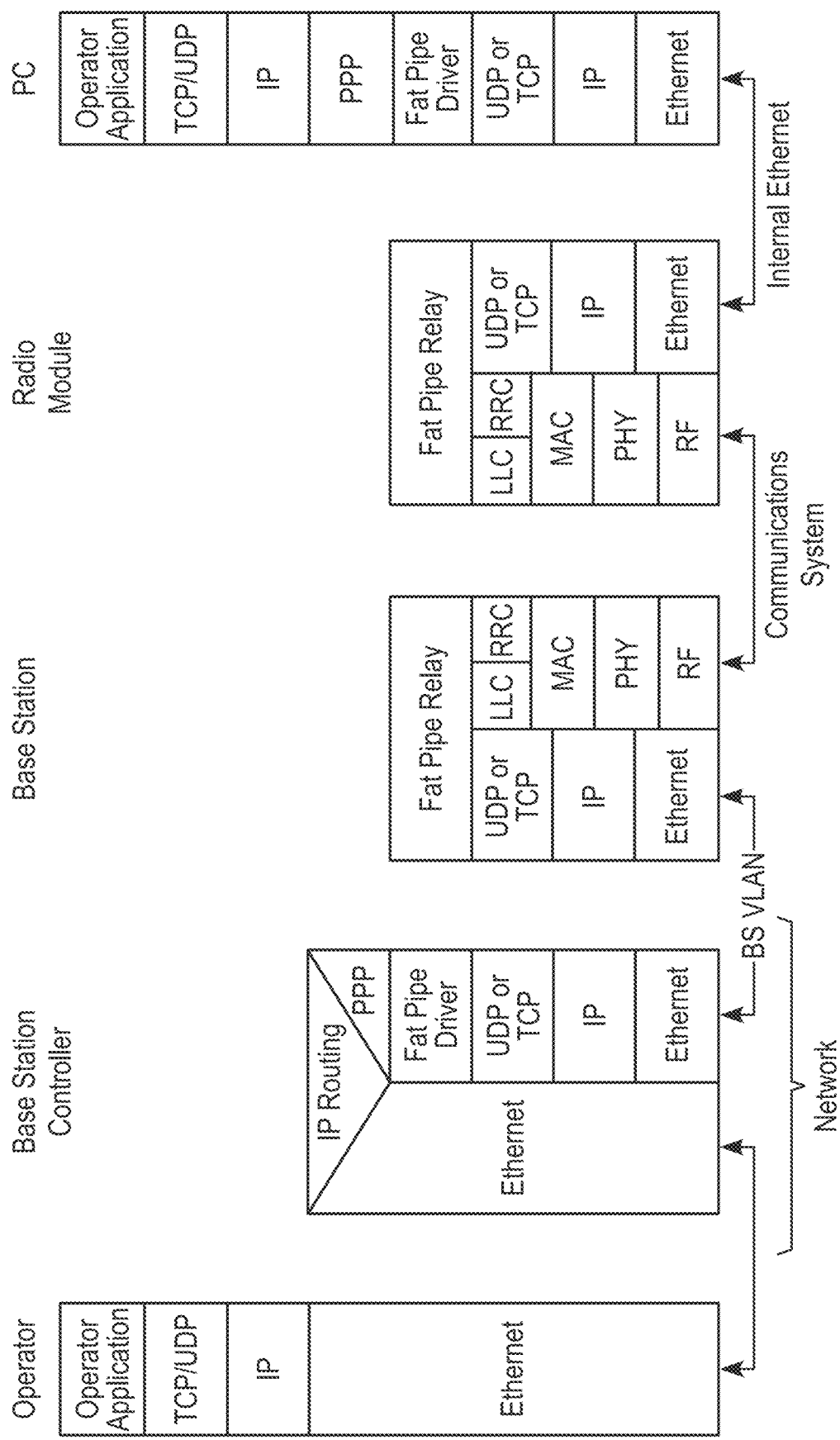
FIG. 13 shows fat pipe protocol stacks, according to some aspects of the invention.

FIG. 13 shows fat pipe protocol stacks, according to some embodiments. Fat pipe connections can also be initiated by a terminal/robot. The Radio module (which may exist on a terminal/robot) may be configured to use a fat pipe request flag in the MAC header on a thin pipe. When this is detected, the base station notifies the fat pipe driver on the base station controller, and, if resources are available, the base station controller will create a fat pipe connection.

The LLC (Logical Link Control) can provide a reliable stream connection for the tunneled traffic.

The RRC (Radio Resource Control) can provide radio communication link management functions.

The MAC layer multiplexes all of the services requiring access to the physical layer data interface.

Processing Elements

In one embodiment, protocol software can be distributed across a number of elements.

Base Station Controller

Figure 14:
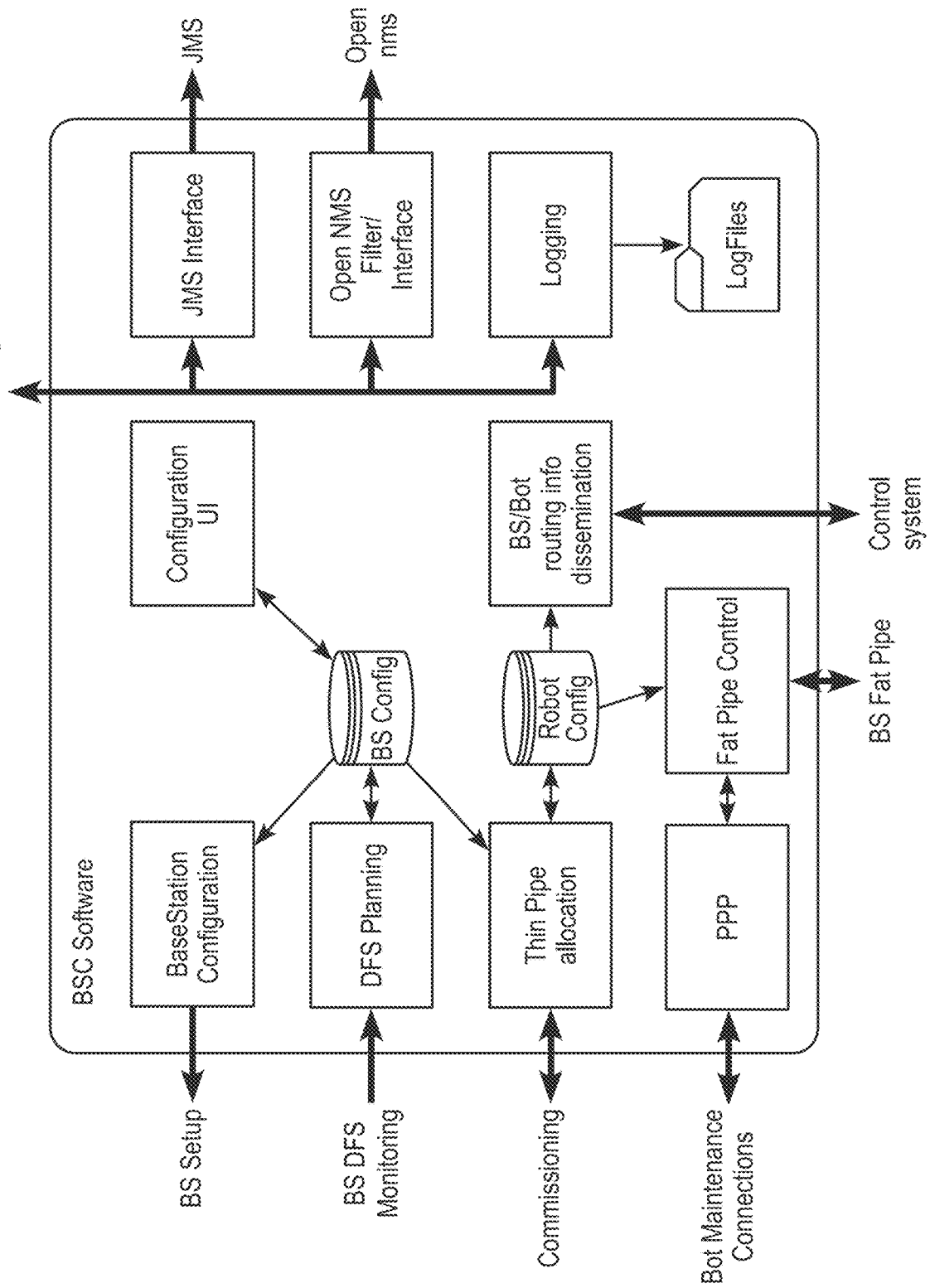
FIG. 14 shows a sample block diagram of base station controller modules, according to some aspects of the invention.

Referring now to FIG. 14, the base station controller can be a high availability cluster of commodity Intel servers running Linux. In some embodiments, there may only one be one base station controller in each warehouse and the base station controller may be configured to provide some of the following functionality, the following list being a non-limiting example list.

Figure 15A:
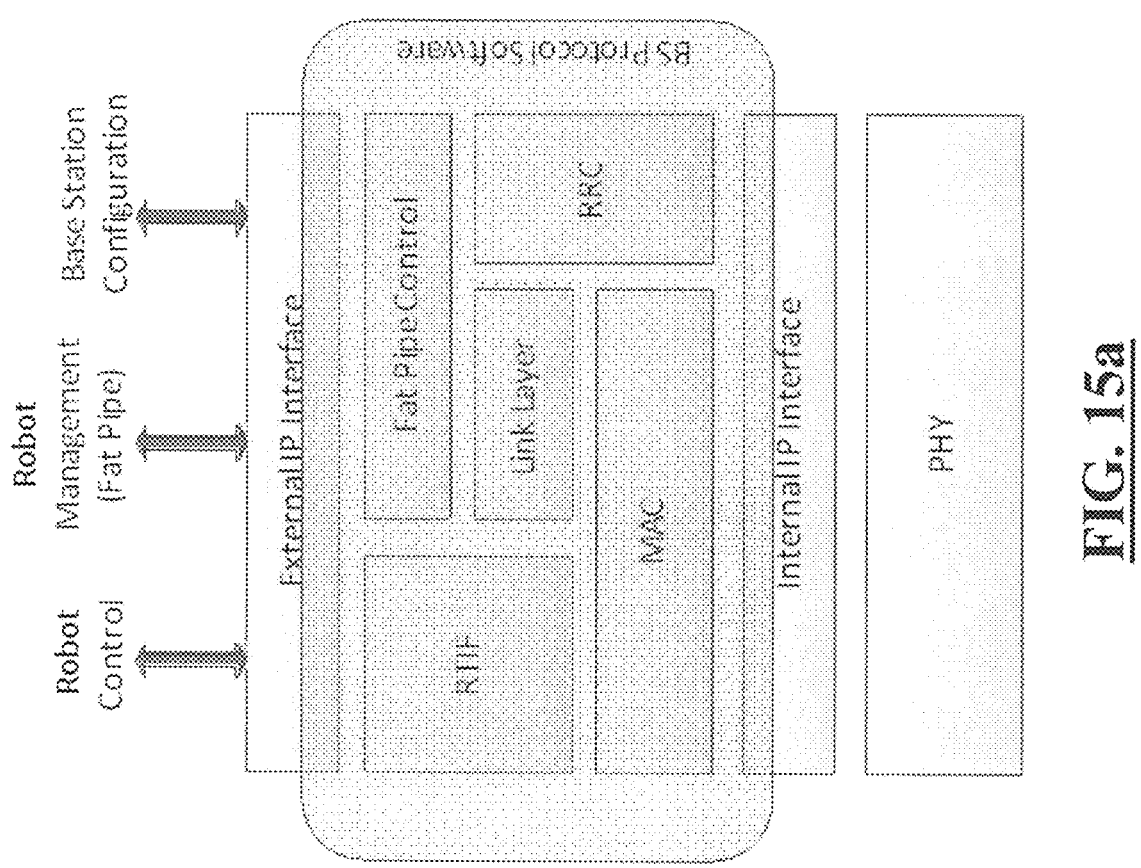
FIG. 15a shows a sample block diagram of base station modules, according to some aspects of the invention.

Base stations commissioning and configuration
Base station frequency planning
Terminal/robot communication link allocation
Distribution of terminal/robot routing information
Fat pipe termination
Monitoring and logging functions Base Station Referring now to FIG. 15a, at the base station end, the protocol modules can run on a dedicated Linux-based Network Processor, according to some embodiments. The network processor may include two Gigabit Ethernet interfaces to allow 'dual-homed' (active+standby) links to the base station controller. An optical interface may also be provided. A third Ethernet interface may be used to communicate with the PHY running on the Octasic™ DSP.

Radio Module and PC

Figure 15B:
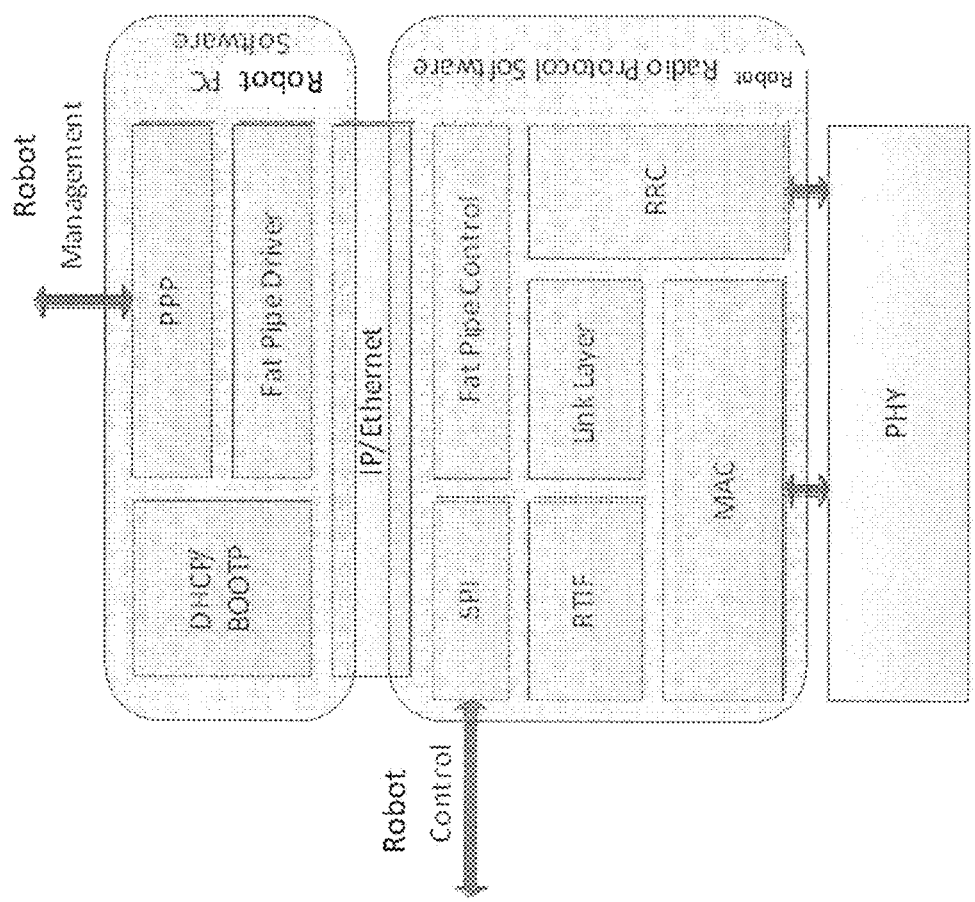
FIG. 15b shows another sample block diagram of terminal/robot modules, according to other aspects of the invention.

Referring now to FIG. 15b, at the terminal/robot end of the link protocol modules can be run on both the radio module and an embedded personal computer (PC), according to some embodiments.

In some embodiments, the PC can run Linux and may have a fat pipe driver that is similar to the one on the base station controller to terminate the connection at the terminal/robot end. The PC can also act as a boot server for the radio module.

The protocol layers at the radio module may be the peers of the software modules on the base station.

The radio module and Linux PC may communicate over an Ethernet link; this link may carry all fat pipe traffic, as well as duplicated thin pipe traffic (for monitoring/analysis). The Linux PC may also run a service which continuously communicates with the Real Time Controller retrieving current status and sensor values, and makes this available via an API to custom scripts/programs running on the Linux PC.

Thin pipe traffic from the radio module may be routed over a serial peripheral interface (SPI) link to the real time controller, response messages coming back up the same link.

Real Time Controller

The final processing element is the real time controller. This may be an embedded processor responsible for all the normal running/operation of the terminal/robot and may be connected via two SPI interfaces to the radio module and the Linux PC.

All thin pipe traffic may be routed to this module, which may decode, act upon and respond to the various messages, in turn sending traffic back up the thin pipe to the Radio Module.

Status information may be sent back across the second SPI link to the Linux PC to be made available for various uses, such as custom processing. This link may also allow some independent control of the terminal/robot, subject to it being placed in a non-operational mode, according to some embodiments.

Software Functions

Radio Resource Control (RRC)

The available radio resources can be divided into a matrix of tiles, these may also be vertically split 3 groups:

Common control communication links

Thin Pipes

Fat Pipes

The common control communication link can occupy the first column of tiles; the common control communication link may use a more resilient coding scheme than other communication links. In the downlink direction, the common control communication link can be used to broadcast information about the base station, messages or commands applicable to all robots/terminals (e.g. base station frequency changes or an emergency stop) and/or to messages directed to a single terminal/robot (e.g. fat pipe allocation). In the uplink direction, the common control communication links can be split into a number of high resilience uplink communication links.

The remaining tiles may be used for dedicated connections to the robots/terminals. The split of allocation of bandwidth between thin and fat pipes may be configured by the base station controller, and may be expected to remain static during normal operation, according to some embodiments.

In some embodiments, the effect of packet loss may be mitigated by a base station or a terminal; retransmitting the last transmitted packet until a new packet needs to be sent. Such a packet may contain for example instructions from base station to terminal.

In another embodiment, a means of trading the capacity of the system for additional data resilience may be provided. For example, multiple transmissions may be configured for a data packet.

In another example, duplicate mode of thin pipe data bursts (as described elsewhere in this disclosure) may be utilized as opposed to normal mode, potentially providing better data resilience.

Each thin pipe can communicate a pair of tiles (or four tiles for more robust operation at half the capacity), once every multi-frame. Thin pipes can be numbered and each terminal/robot may be allocated a thin pipe number when it is first introduced to the system. In one embodiment, the thin pipe number (TPN) may consist of the following fields:

Multi frame offset (0-4)

Time-slot (1-19)

Tile offset (0-19)

In one embodiment, prior to be introduced to the system or a base station, a terminal/robot can be used with a factory set ID (the terminal/robot's identification). The terminal ID can be manually or automatically loaded into a base station controller and the terminal/robot may then become available to use. The base station ID and corresponding thin pipe can then be set by the base station controller (by a suitable algorithm) and the terminal/robot can be subsequently configured.

A tile offset can refer to an axis shown in FIG. 9a, according to some embodiments. As previously described, there can be 40 tiles in total and two tiles can be used for each thin pipe. The two tiles used can be symmetrical about the dashed horizontal line shown in FIG. 9a so a tile offset number can refer to a pair of symmetrically placed tiles and thus only 20 tile offset numbers are required. In some embodiment, the tile offset number can reference a hopping sequence (described elsewhere herein) or an absolute offset from the centre dashed line.

In another embodiment, a terminal/robot can receive its configuration data including a base station ID and TPN (thin pipe number). It can then listen for the broadcast burst across communication links. Within this burst may be a number of time slots around DC (the centre frequency) which are used to tune the local oscillators. The terminal/robot can tune into these communication links or timeslots. Once this is complete, the terminal/robot can process the data received via the broadcast burst. If the received data include the correct base station ID, then it can begin transmitting and receiving data on its thin pipe number or thin pipe. If not, then the terminal/robot can move to a different communication link and the process can start again, and continues until the terminal/robot detects the correct base station ID in the broadcast burst.

In another embodiment, the terminal/robot does not need to hunt between frequencies to find the correct base station, as this can potentially slow down the joining process. A target frequency where a base station may reside can be pre-loaded in the terminal/robot's configuration data. This can expedite the terminal/robot's joining the network as the terminal/robot would know which frequency to listen or communicate to upon activation.

In some embodiments, a thin pipe number of a terminal/robot may be changed by a base station:

When a terminal/robot roams between base stations;

When a dynamic frequency selection instance is triggered;

When the frame becomes very populated (running out of capacity) and a number of terminals/robots are removed from service—thin pipe numbers may need to be re-assigned to one or more robots/terminals to group their transmissions together. This may be referred to as 'de-fragging' the spectrum. This may be done prior to changing the ratio between the allocation of bandwidth between thin pipes and fat pipes.

Fat pipes can be allocated when required by a network management system or an operator via the base station controller. The base station controller may be configured to coordinate requests for bandwidth and may reject requests if there is insufficient fat pipe resources available on the base station. Requests ma be forwarded to the base station where they are handled by RRC. RRC allocates blocks of tiles to the Fat pipe and updates the MAC and PHY configuration. The MAC layer informs the terminal/robot of the allocation over the common control communication link.

MAC

In some embodiments, there is a difference between the numbers of connections that can be handled by a base station as opposed to the terminal/robot module. For the terminal/robot this may be one or two, but for the base station it may be hundreds. In one possible aspect, a MAC layer multiplexes all of the data sources and provides data to the PHY in a synchronous manner. In the receive direction the communication system de-multiplexes data for LLC, RRC and RTIF.

Thin Pipes

Each thin pipe has an opportunity to transmit and receive a message every multi-frame. These communication links may be primarily for transferring real-time control and position information between the robots/terminals and base station or various control systems.

The MAC layer header can be kept to a minimum, and may contain at least the following information:

| Field | Description |
|---|---|
| Received OK: | Indicates that in the previous receive window it received a valid frame |
| MAC Message: | This message is for the MAC layer and not a real-time control message. |
| Fat Pipe Request | In terminal/robot to base station direction indicates that terminal has TCP/UDP data to send to the network |
| Seq Number | 5 bit counter, incremented for each RTIF message received from a terminal or a controller from a control system |

The sequence number is used to discard duplicate messages and allows missing messages to be counted.

The thin pipe payload can be up to 14 bytes. Messages shorter than this are with zero bytes.

MAC messages are only sent if there are no new or unacknowledged real-time control messages to send.

| MAC Message | Description |
|---|---|
| Fill Frame | Sent only by the base-station when the there is nothing else to send over the thin pipe |

In the receive direction, in one possible aspect, the MAC receives blocks and feeds them to a real-time interface tagged with the thin pipe number for the communication link they were received on.

The MAC can retain limited state for each connection including:

Unsent Messages
Message that was sent last frame
Count of multi-frames since the last good receive
Count of multi-frames since last confirmed transmit
Fat Pipes The physical layer (PHY) can support a small number of high speed 'fat pipe' connections at any one time, the actual number may represent a trade off with the total number of thin pipes.

The MAC layer may be configured provide the PHY with a block to transmit on each active fat pipe every 20 ms. This block may contain one or more MAC frames. If there is insufficient payload data to fill the entire block, then there may be one MAC Data frame followed by a MAC Fill frame.

In one embodiment, fat pipe allocation can be continuously advertised on control communication link. The radio may transmit on the fat pipe only if it successfully decodes the control communication link and its thin pipe number is identified in the fat pipe allocation.

Common Control Communication link The MAC provides the PHY with data to send on the broadcast communication link each frame.

Data can be split into public broadcast information, public announcements, directed broadcast information and so on.

Public Broadcast Information

Public broadcast information may be sent in every frame, the broadcast data may include:

Base station identity
Frame number
Communication link configuration
Fat Pipe allocations
Public Announcements Public announcements may be sent as required, such as:

Frequency change at frame N
Base station shutdown at frame N
Emergency announcement or broadcast asking all bots to stop
Directed Broadcast Information For directed broadcast information, each data packet can contain a terminal identity; all terminals/robots may receive it but only addressed terminal/robot with the terminal identity contained in the packet may need to process the data packet. These directed broadcast information may be sent as high integrity downlink messages (control communication link has greater resilience than regular thin pipes).

In the uplink direction, the communication link can be split into a number of high integrity blocks for terminals/robots to use in the event that they are unable to communicate on their regular thin pipe. In one embodiment, the radio module may only use this communication link if the count of multi-frames since last confirmed transmit is greater than a set value, such as 5. After the first transmission it can apply a random back-off before retrying. The base station can respond to any message received on the control communication link using the directed broadcast mechanism.

Real-Time Interface (RTIF)

There may be two variants of the RTIF protocol.

At the base station end the Real Time Interface Bundle (RTIFB) process can receive packets from the MAC layer, adds an RTIFB header containing the BSID and the slot number identified by the MAC.

The RTIFB is a collection of messages for individual terminals grouped together into a single message which is sent to/from the one or more base stations. A potential advantage with this approach is the conservation of wired Ethernet resources.

A number of these frames may be combined into a UDP packet which is then sent to a robot control system. Combining multiple messages into a single packet may reduce the network overhead of UDP packets. In the reverse direction, RTIF processes UDP packets sent to the RTIF port by splitting them into individual RTIFB frames and forwarding to the appropriate MAC queue for transmission.

The terminal/robot may, in some embodiments, be only interested in a single thin pipe connection, and packets received from the MAC can be sent to the real-time controller over an SPI connection. In the reverse direction the real-time controller, can be polled regularly over SPI, and any new messages received can be sent to the MAC layer for transmission.

Logical Link Control

This provides reliable data link connection over the fat pipe communication links.

The fat pipe physical layer can have interleaved transmit and receive functions and robust coding of the physical communication links which make it suitable for a Link Access Protocol-Channel D (LAPD) like protocol with a small window size (1 or 2) and simple acknowledgement.

The protocol software for the terminal/robot may be simpler than the equivalent entities at the base station end because it only has to manage one or two communication links.

Configuration

The base station controller can be the master repository for all terminal/robot and base station radio and routing configuration. When a base station is added to the system, it may be manually added to the base station controller, according to some embodiments. Other implementations are possible for example Other implementations are possible, for example, in one embodiment, the system may automatically configure a base station which is newly introduced to the system, where pre-determined configuration data may be derived during the commissioning of the system when new. In another embodiment, standby base stations may be installed and active, but may not be configured and therefore may take a passive role in the system. The base station controller can then commission and activate them at a later date. This may be advantageous to respond to increased capacity need, or to resolve an interruption in service caused by an outage or any other failure. In another embodiment, where the system is configured to avoid interference on various communication links, the base station controller can orchestrate the communication link allocation of its base stations based on the information gathered from base stations which are set up to act as dedicated sensors or in response to information available from existing normal base stations.

In some embodiments, when the terminal/robot is introduced to the system, a base station identity (BSID), a communication link number/frequency and/or thin pipe number (TPN) may be allocated by the base station controller. Where there is a single base station per communication link, a base station identity may not be necessary. Further, a base station controller may be aware of changes due to dynamic frequency selection, and the robots/terminals may be programmed accordingly.

This information may be stored on the terminal/robot, in any suitable module or in any other suitable place. The radio module can receive this configuration data as part of the boot process. If no configuration is available then the Radio is not activated, in one possible implementation. The radio module may scan for a base station broadcasting the correct identity may then receives additional configuration describing the communication link structures, etc. from the broadcast messages. This information may also be provided in various ways, such as during configuration when inducted.

Frequency Planning

In some embodiments, base stations may be configured to scan for radar and other interference, and this information may be reported to the base station controller. If radar is detected on a base station operating frequency, then the frequency may be moved as soon as possible. This can be coordinated by the base station controller to prevent multiple base stations selecting the same frequency. The base station may be configured to stop transmitting if it is not possible to select a new frequency within the time limits set for DFS.

Digital Signal Processing (DSP) Functions

On both base station and terminal/robot, the physical layer processing can be run in any suitable software/hardware implementation, such as in software on an OCT2224 W baseband processor. For example, this processor may have 24 cores and 6 hardware accelerators geared toward communications processing.

The following table shows the main functions on the OCT2224 W device on terminal/robot and base station. Each function maps onto a whole number of cores and accelerators. The table is provided for illustrative, non-limiting purposes only.

| Function | base station | Terminal/ Robot | Comment |
|---|---|---|---|
| MAC-PHY API | ✓ | ✓ | External (Ethernet) on the base station, internal (within DSP) on the terminal/robot |
| Modem Transmit | ✓ | ✓ | |
| Modem Receive | ✓ | ✓ | |
| Acquisition | | ✓ | Adjusting receive window to align with on air frame structure. Includes pulling of the VCXO |
| Radar detection | ✓ | | Radar detection may also be needed in the terminal/robot |
| IP stack | ✓ | ✓ | |
| DSP diagnostics | ✓ | ✓ | |

In addition, on the terminal/robot the MAC layer may be configured to run on the OCT2224 W alongside the PHY.

8.0 General

Features of the systems, devices, and methods described herein may be used in various combinations, and may also be used for the system and non-transitory computer-readable storage medium in various combinations.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, ultra mobile tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each program may be implemented in a high level procedural or object oriented programming or scripting language, or a combination thereof, to communicate with a computer system. However, alternatively the programs may be implemented in assembly or machine language, if desired. The language may be a compiled or interpreted language. Each such computer program may be stored on a storage media or a device (e.g., read only memory (ROM), magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. One should appreciate that the systems and methods described herein may transform electronic signals of various data objects into three dimensional representations for display on a tangible screen configured for three dimensional displays. One should appreciate that the systems and methods described herein involve interconnected networks of hardware devices configured to receive data using receivers, transmit data using transmitters, and transform electronic data signals for various three dimensional enhancements using particularly configured processors, where the three dimensional enhancements are for subsequent display on three dimensional adapted display screens.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The functionality described herein may also be accessed as an Internet service, for example by accessing the functions or features described from any manner of computer device, by the computer device accessing a server computer, a server farm or cloud service configured to implement said functions or features.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including an EGM, A Web TV, a Personal Digital Assistant (PDA), a smart phone, a tablet or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The system and method may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods as described herein need not reside on a single computer or processor, but may be distributed in a modular fashion amongst a number of different computers or processors to implement various aspects.

Computer-executable instructions may be in many forms, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Depending on the particular implementation and various associated factors such as the resources of the communications device, wireless network parameters, and other factors, different implementation architectures may be used for the present invention.

It should also be understood that the computer server may be implemented as one or more servers in any possible server architecture or configuration including for example in a distributed server architecture, a server farm, or a cloud based computing environment.

Wherever the system is described as receiving input from the user of the communications device, it is to be understood that the input may be received through activation of a physical key on the communications device, through interaction with a touch screen display of the communications device, through a voice command received at the communications device and processed by the system, through a user gesture observed and processed at the communications device, through physically moving the communications device in a predetermined gesture pattern including shaking the communications device, through receiving data from another local or remote communications device associated with the user, or through any other sensory interaction with the communications device or otherwise controlling the communications device.

Figure 24:
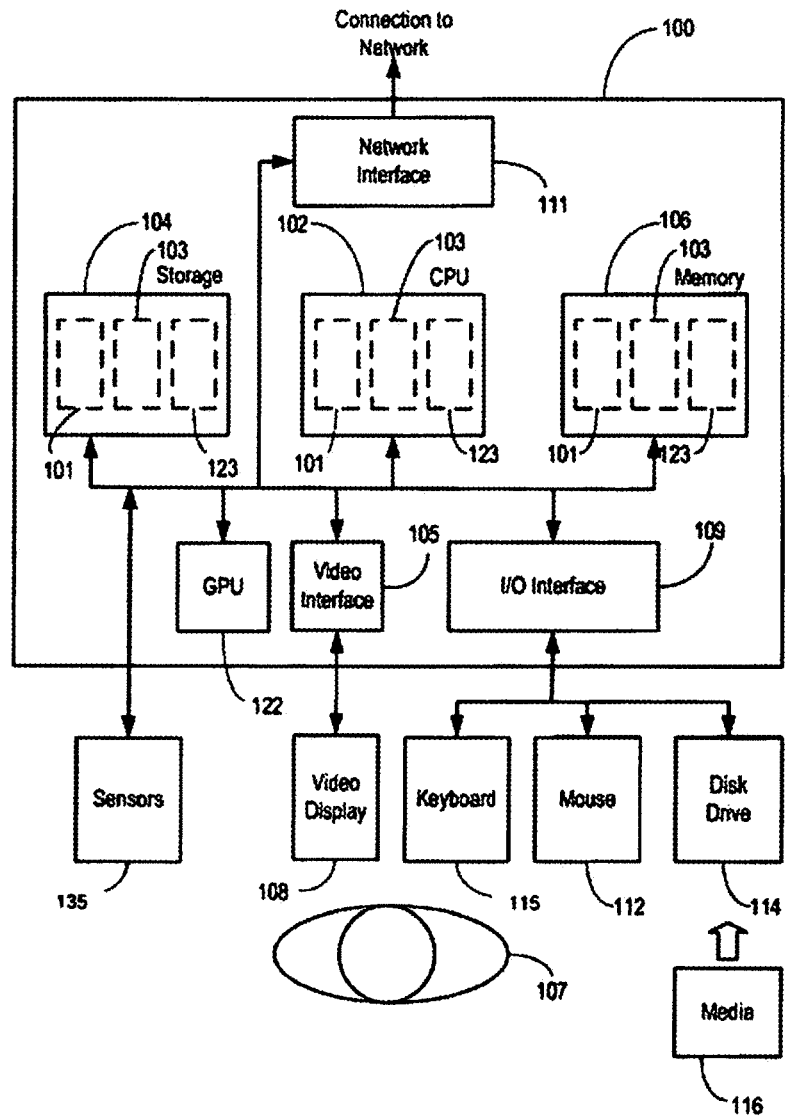
FIG. 24 illustrates an exemplary representative generic implementation of a computing device.

The present system and method may be practiced in various embodiments. A suitably configured computer device, and associated communications networks, devices, software and firmware may provide a platform for enabling one or more embodiments as described above. By way of example, FIG. 24 shows a generic computer device 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. Computer device 100 may further include a graphics processing unit (GPU) 122 which is operatively connected to CPU 102 and to memory 106 to offload intensive image processing calculations from CPU 102 and run these calculations in parallel with CPU 102. An operator 107 may interact with the computer device 100 using a video display 108 connected by a video interface 105, and various input/output devices such as a keyboard 115, mouse 112, and disk drive or solid state drive 114 connected by an I/O interface 109. In known manner, the mouse 112 may be configured to control movement of a cursor in the video display 108, and to operate various graphical user interface (GUI) controls appearing in the video display 108 with a mouse button. The disk drive or solid state drive 114 may be configured to accept computer readable media 116. The computer device 100 may form part of a network via a network interface 111, allowing the computer device 100 to communicate with other suitably configured data processing systems (not shown). One or more different types of sensors 135 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application.

The functionality described may be implemented to any mobile platform, including the iOS™ platform, ANDROID™, WINDOWS™ or BLACKBERRY™.

It will be appreciated by those skilled in the art that other variations of the embodiments described herein may also be practiced without departing from the scope. Other modifications are therefore possible.

In further aspects, the disclosure provides systems, devices, methods, and computer programming products, including non-transient machine-readable instruction sets, for use in implementing such methods and enabling the functionality described previously.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

Except to the extent explicitly stated or inherent within the processes described, including any optional steps or components thereof, no required order, sequence, or combination is intended or implied. As will be will be understood by those skilled in the relevant arts, with respect to both processes and any systems, devices, etc., described herein, a wide range of variations is possible, and even advantageous, in various circumstances, without departing from the scope of the invention, which is to be limited only by the claims.

What is claimed:

1. A communication system comprising:
   a communication network;
   one or more base stations;
   a plurality of remote terminal units;
   the one or more base stations and the plurality of remote terminal units being configured for transmitting and receiving data over a plurality of communication links; and
   a communication manager that is configured to define and manage said plurality of communication links of the communication network;
   wherein:
   the plurality of communication links include a plurality of low bandwidth communication links and one or more high bandwidth communication links; and
   the communication manager is configured for configuring the plurality of communication links with low bandwidth information and high bandwidth information that defines respective allocated communication resources, the low bandwidth information including a time slot to use for one or more of the plurality of low bandwidth communication links, and the low bandwidth information being initially allocated to and stored on each remote terminal unit prior to joining the communication network, and the high bandwidth information defining resources to use for the one or more high bandwidth communication links, which are allocated when requested over the communication network by one or more of the plurality of remote terminal units or the one or more base stations; and
   the communication manager is configured for defining a number of frequency and time slot tiles allocated to a communication link and a latency of any communication link, the number of tiles are grouped for transmission in a burst based on a location of the number of tiles in a frame, wherein the burst includes data which defines a burst type, the burst data is mapped to the communication link according to the burst type, and for at least one burst type the number of tiles are located in a frame that includes both an uplink transmission and a downlink transmission.

2. The communication system according to claim 1, in which the plurality of communication links are further adjustable by the communication manager, the communication manager comprising:
   means for adjusting at least one of:
   a. the data rate of each of the plurality of communication links;
   b. frequency bands utilized by each of the plurality of communication links;
   c. a channel within the frequency bands used by each of the plurality of communication links;
   d. a communication error resilience by each of the plurality of communication links, the error resilience being governed by:
      i. a predetermined coding scheme; and/or
      ii. use of a duplicate frequency mode;
   e. a number of terminal units communicating per base station;
   f. a type and characteristics of each of the plurality of communication links;
   g. a roaming method of terminal units changing between base stations;
   h. one or more back up channels to switch to in an event of a DFS (radar interference) event;
   i. monitoring and logging of radio performance;
   j. a tile frequency and time characteristics;
   k. which tiles are used for pilot signals; and/or
   l. a length of time before any one or more of a parameter of elements a. to k. are changed.

3. The communication system of claim 1 wherein the communication manager comprises means for allocating the frequency and time slot tiles for the plurality of communication links based on requirements of the communications system, whilst maintaining a specified latency.

4. The communication system of claim 1, wherein the low bandwidth information stored on each remote terminal unit includes one or more low bandwidth communication link numbers identifying one or more of a multi frame offset, the time slot and a tile offset to use for at least one of the low bandwidth communication links.

5. The communication system of claim 1, wherein the plurality of low bandwidth communication links are configured for communication within a predetermined latency range.

6. The communication system of claim 1, wherein the one or more high bandwidth communication links is configured for communication within a variable latency range.

7. The communication system of claim 1, wherein a number of the plurality of low bandwidth communication links and a number of the one or more high bandwidth communication links are adjustable during a start-up process of the one or more base stations.

8. The communication system of claim 1, wherein a number of the plurality of low bandwidth communication links and a number of the one or more high bandwidth communication links are adjustable in real-time or near real-time to respond to requirements for communication between the one or more base stations and the plurality of remote terminal units.

9. The communication system of claim 1, wherein a data packet included in the burst data sent by a first remote terminal unit of the plurality of remote terminal units through at least one of the low bandwidth communication links is transmitted at least twice, as a first data burst and a second data burst.

10. The communication system of claim 9, wherein the first data burst and the second data burst occupy one or more different frequencies.

11. The communication system of claim 1, the system comprising:
means of power control in which one or more of the plurality of remote terminal units setting a power at which it transmits depending on a strength of a signal received from the one or more base stations.

12. The communication system of claim 1, comprising: means for synchronising communications including fixed time frequency synchronisation.

13. The communication system according to claim 3, wherein allocation of the frequency and time slot tiles can be changed dynamically during operation.

14. The communication system of claim 3 in which the communication manager is configured to initially allocate frequency and time slot tiles and other configuration data to the plurality of remote terminal units and the one or more base stations over a fixed or wireless out of band connection.

15. The communication system of claim 1, wherein the latency of any communication link is adjustable by adjusting one of at least one parameter associated with the plurality of communication links, including frequency usage, tile characteristics, multiplexing/de-multiplexing techniques, timing and code usage.

16. The communication system of claim 2, wherein the tile characteristics, including a number and placement of pilots, are configurable by the communication manager.

17. The communication system of claim 1, wherein one or more of the plurality of communication links are configurable as emergency communication links.

18. The communication system of claim 1, wherein retransmission of existing data to one or more of the plurality of remote terminal units will continue until there is new data to be sent.

19. The communication system of claim 1, wherein the plurality of communication links include:
at least one contention-free communication link and at least one contended communication link.

20. The communication system of claim 1, further configured for transmission of data over the one or more high bandwidth communication links to one or more of the plurality of remote terminal units to be utilized for maintenance and troubleshooting.

21. The communication system of claim 1, further configured for dynamic frequency hopping techniques to be utilized to optimize one or more of the plurality of low bandwidth communication links.

22. The communication system of claim 1, further configured for dynamic frequency selection techniques to be utilized by the one or more base stations and to be handled by one or more dedicated radio frequency chains.

23. The communication system of claim 1, being further configured such that dynamic frequency selection techniques are utilized for radar detection and avoidance.

24. The communication system of claim 1, wherein frequency pairs (+f, −f) symmetric about a centre frequency f are allocated to a same remote terminal unit of the plurality of remote terminal units so that less unwanted interference occurs compared to allocating one frequency of the pair to a first remote terminal unit of the plurality of remote terminal units and allocating another frequency of the pair to a second remote terminal unit of the plurality of remote terminal units.

25. The communication system of claim 24, wherein the plurality of remote terminal units are located at different distances from a same base station of the one or more base stations, so that a leaked signal into −f from a first remote terminal unit of the plurality of terminal units close to the same base station interferes with an actual −f signal from a second remote terminal unit of the plurality of remote terminal units far from the same base station.

26. The communication system of claim 1 configured as a radio system which is implemented as a peripheral to a computer.

27. The communication system according to claim 1, wherein the one or more base stations and the plurality of remote terminal units are configured for transmitting and receiving control and monitoring data and terminal position and command data over the plurality of low bandwidth communication links.

28. The communication system according to claim 1, wherein the one or more base stations and the plurality of remote terminal units are configured for transmitting and receiving administration and maintenance data over the one or more high bandwidth communication links.

29. The communication system according to claim 1, wherein the plurality of low bandwidth communication links include a control communication link for broadcasting information, messages or commands applicable to all the plurality of remote terminal units, and
the communication manager, the one or more base stations and the plurality of remote terminal units are configured for broadcasting from the one or more base stations to the plurality of remote terminal units over the control communication link an allocation of a high bandwidth communication link to a specified one of the plurality of remote terminal units.

30. The communication system according to claim 1, wherein the plurality of remote terminal units are configured for making a request for allocation of a high bandwidth communication link, and the communication manager, the one or more base stations and the plurality of remote terminal units are configured for communicating the request for allocation of a high bandwidth communication link over at least one of the plurality of low bandwidth communication links.

31. A communication system comprising:
a communication network;
one or more base stations;
a plurality of remote terminal units;
the one or more base stations and the plurality of remote terminal units having means for transmitting and receiving data over a plurality of communication links; and
a communication manager that is configured to define and manage said plurality of communication links of the communication network;
wherein:
the plurality of communication links include a plurality of low bandwidth communication links and one or more high bandwidth communication links;
the communication manager is configured for configuring the plurality of communication links with low bandwidth information and high bandwidth information that defines respective allocated communication resources, the low bandwidth information including a time slot to use for one or more of the plurality of low bandwidth communication links, and the low bandwidth information being initially allocated to and stored on each remote terminal unit prior to joining the communication network, and the high bandwidth information defining resources to use for the one or more high bandwidth communication links, which are allocated when requested over the communication network by one or more of the plurality of remote terminal units or the one or more base stations; and the communication manager is configured for defining a number of frequency and time slot tiles allocated to a communication link and a latency of any communication link, the number of tiles are grouped for transmission in a burst based on a location of the number of tiles in a frame, wherein the burst includes data which defines a burst type, the burst data is mapped to the communication link according to the burst type, and for at least one burst type the number of tiles are located in a frame that includes both an uplink transmission and a downlink transmission, wherein the low bandwidth information including a time slot to use for at least one of the plurality of low bandwidth communication links is stored on each remote terminal unit prior to the respective remote terminal unit joining the communication network as part of a boot process.

32. The communication system of claim 31, wherein the communication manager is operable to configure or adjust dynamically a ratio between a number of the plurality of low bandwidth communication links and a number of the one or more high bandwidth communication links.

33. The communication system according to claim 31, wherein the one or more base stations and the plurality of remote terminal units are configured for transmitting and receiving control and monitoring data and terminal position and command data over the plurality of low bandwidth communication links.

34. The communication system according to claim 31, wherein the one or more base stations and the plurality of remote terminal units are configured for transmitting and receiving administration and maintenance data over the one or more high bandwidth communication links.

35. The communication system according to claim 31, wherein the plurality of low bandwidth communication links include a control communication link for broadcasting information, messages or commands applicable to all the plurality of remote terminal units, and the communication manager, the one or more base stations and the plurality of remote terminal units are configured for broadcasting from the one or more base stations to the plurality of remote terminal units over the control communication link an allocation of a high bandwidth communication link to a specified one of the plurality of remote terminal units.

36. The communication system according to claim 31, wherein the plurality of remote terminal units are configured for making a request for allocation of a high bandwidth communication link, and the communication manager, the one or more base stations and the plurality of remote terminal units are configured for communicating the request for allocation of a high bandwidth communication link over at least one of the plurality of low bandwidth communication links.

* * * * *